(12) United States Patent
Edge et al.

(10) Patent No.: US 12,041,578 B2
(45) Date of Patent: Jul. 16, 2024

(54) SYSTEM AND METHODS FOR SUPPORTING UPLINK AND DOWNLINK POSITIONING PROCEDURES IN A WIRELESS NETWORK

(71) Applicant: QUALCOMM Incorporated, San Diego, CA (US)

(72) Inventors: Stephen William Edge, Escondido, CA (US); Sven Fischer, Nuremberg (DE); Guttorm Ringstad Opshaug, Redwood City, CA (US); Naga Bhushan, San Diego, CA (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/669,504

(22) Filed: Oct. 30, 2019

(65) Prior Publication Data

US 2020/0137715 A1 Apr. 30, 2020

Related U.S. Application Data

(60) Provisional application No. 62/753,904, filed on Oct. 31, 2018, provisional application No. 62/754,572, (Continued)

(51) Int. Cl.
*H04W 24/10* (2009.01)
*H04L 5/00* (2006.01)
(Continued)

(52) U.S. Cl.
CPC ......... *H04W 64/006* (2013.01); *H04L 5/0051* (2013.01); *H04L 43/0864* (2013.01); *H04W 4/029* (2018.02); *H04W 24/10* (2013.01)

(58) Field of Classification Search
CPC ....... H04W 64/00; H04W 24/10; H04W 4/02; H04W 4/029; H04W 48/12; H04W 4/20;
(Continued)

(56) References Cited

U.S. PATENT DOCUMENTS 8,526,391 B2 9/2013 Issakov et al.
9,078,145 B2 * 7/2015 Issakov ..................... G01S 5/06
(Continued)

FOREIGN PATENT DOCUMENTS

CN 105992339 A 10/2016
CN 106031206 A 10/2016
(Continued)

OTHER PUBLICATIONS

"3rd Generation Partnership Project, Technical Specification Group Radio Access Network, NG-RAN, Architecture Description (Release 15)", 3GPP Draft, Draft 38401-F40, 3rd Generation Partnership Project (3GPP), Mobile Competence Centre, 650, Route Des Lucioles, F-06921 Sophia-Antipolis Cedex, France, Jan. 3, 2019 (Jan. 3, 2019), XP051576896, 40 pages, Retrieved from the Internet: URL: http://www.3gpp.org/ftp/tsg%5Fran/WG3%5Flu/Draft%5FSpecs/TSG%2DRAN82/Draft%5F38401%2Df40%2Ezip. [retrieved on Jan. 3, 2019] p. 7, section 3.1; p. 10, section 6.1.1; p. 16, section 8.2.1.1.
(Continued)

*Primary Examiner* — Joseph Arevalo
(74) *Attorney, Agent, or Firm* — Weaver Austin Villeneuve & Sampson LLP

(57) ABSTRACT

A position of a user equipment (UE) may be determined using downlink based solutions (e.g. OTDOA), uplink based solutions (e.g. UTDOA), or combined downlink and uplink based solutions (e.g. RTT). The serving gNBs may request neighboring gNBs to produce downlink reference signal transmissions to a target UE and/or measure uplink reference signal transmissions from the target UE. The serving
(Continued)

gNB may receive the uplink reference signal measurements from neighboring gNBs and obtain an own uplink reference signal measurement and forward to the UE or another network entity all the uplink reference signal measurements. The UE may use the uplink reference signal measurements, along with the UE's own downlink reference signal measurements to determine RTTs. The serving gNBs or another entity may keep the uplink reference signal measurements and may determine RTTs after receiving the downlink reference signal measurements from the UE.

16 Claims, 21 Drawing Sheets

Related U.S. Application Data filed on Nov. 1, 2018, provisional application No. 62/805,882, filed on Feb. 14, 2019, provisional application No. 62/825,779, filed on Mar. 28, 2019, provisional application No. 62/887,465, filed on Aug. 15, 2019, provisional application No. 62/805,945, filed on Feb. 14, 2019.

(51) Int. Cl.
*H04L 43/0864* (2022.01)
*H04W 4/029* (2018.01)
*H04W 64/00* (2009.01)

(58) Field of Classification Search
CPC ... H04W 64/003; H04W 84/042; H04W 4/80; H04W 72/0413; H04W 72/042; H04W 72/0453; H04W 88/023
USPC ....... 370/329, 231, 259, 332, 338, 252, 328, 370/335, 331, 336, 326
See application file for complete search history.

(56) References Cited

U.S. PATENT DOCUMENTS

| | | |
|---|---|---|
| 9,775,121 B1 * | 9/2017 | Cai .................. H04L 5/0048 |
| 10,735,159 B2 * | 8/2020 | Shao ................ H04L 5/0048 |
| 2008/0009243 A1 * | 1/2008 | Hart .................. H04W 52/46 455/67.13 |
| 2010/0331009 A1 | 12/2010 | Krishnamurthy et al. |
| 2011/0081933 A1 * | 4/2011 | Suh ................... H04W 64/00 455/509 |
| 2012/0115532 A1 * | 5/2012 | He .................... H04W 52/50 455/522 |
| 2012/0129551 A1 * | 5/2012 | Islam ................. G01S 13/878 455/456.1 |
| 2012/0258733 A1 | 10/2012 | Fischer et al. |
| 2012/0302254 A1 * | 11/2012 | Charbit ............... H04W 64/00 455/456.1 |
| 2013/0053077 A1 | 2/2013 | Barbieri et al. |
| 2014/0016621 A1 | 1/2014 | Zhang et al. |
| 2014/0274160 A1 | 9/2014 | Xiao et al. |
| 2015/0009845 A1 * | 1/2015 | Takano ............... H04W 52/46 370/336 |
| 2015/0133081 A1 * | 5/2015 | Griot ................. H04M 15/41 455/552.1 |
| 2015/0223185 A1 | 8/2015 | Harris et al. |
| 2015/0282133 A1 * | 10/2015 | Kakishima ........... H04L 5/0035 370/329 |
| 2015/0296359 A1 | 10/2015 | Edge |
| 2015/0304868 A1 * | 10/2015 | Yu .................... H04W 56/001 370/312 |
| 2015/0365790 A1 * | 12/2015 | Edge ................... G01S 1/20 455/404.2 |
| 2016/0081033 A1 * | 3/2016 | Ouchi ................. H04L 5/14 455/522 |
| 2016/0150432 A1 * | 5/2016 | Qin ................... H04W 24/08 370/252 |
| 2016/0205499 A1 | 7/2016 | Davydov et al. |
| 2016/0227373 A1 * | 8/2016 | Tsai ................... G01S 5/0072 |
| 2017/0033916 A1 * | 2/2017 | Stirling-Gallacher ................ H04W 72/0446 |
| 2017/0201926 A1 | 7/2017 | Krendzel et al. |
| 2018/0098314 A1 | 4/2018 | Rico Alvarino et al. |
| 2018/0123625 A1 * | 5/2018 | Lee ................... H04B 15/02 |
| 2018/0206063 A1 | 7/2018 | Frenger et al. |
| 2018/0262252 A1 * | 9/2018 | Oh .................... H04B 7/0626 |
| 2019/0014561 A1 * | 1/2019 | Takeda ................ H04L 5/0094 |
| 2019/0037338 A1 * | 1/2019 | Edge .................. H04W 4/02 |
| 2019/0090092 A1 | 3/2019 | Hwang et al. |
| 2019/0141694 A1 * | 5/2019 | Gupta ................. H04W 72/542 |
| 2019/0380056 A1 | 12/2019 | Lee et al. |
| 2020/0092737 A1 * | 3/2020 | Siomina .............. H04W 64/003 |
| 2020/0154240 A1 | 5/2020 | Edge et al. |
| 2020/0267508 A1 | 8/2020 | Fischer |
| 2021/0014900 A1 * | 1/2021 | Lei .................... H04W 4/70 |
| 2021/0119698 A1 * | 4/2021 | Atungsiri ............ H04B 7/2041 |
| 2021/0144612 A1 * | 5/2021 | Wei ................... H04W 16/28 |
| 2021/0218516 A1 * | 7/2021 | Chen .................. H04B 17/27 |
| 2021/0219254 A1 * | 7/2021 | Wang .................. H04J 3/0682 |
| 2021/0328747 A1 * | 10/2021 | Da .................... H04W 24/08 |
| 2021/0341562 A1 * | 11/2021 | Ernström ............ G01S 5/0036 |
| 2022/0386184 A1 * | 12/2022 | Li ..................... H04W 76/27 |
| 2022/0408220 A1 | 12/2022 | Edge et al. |

FOREIGN PATENT DOCUMENTS

| | | | |
|---|---|---|---|
| JP | 2009074974 A | | 4/2009 |
| JP | 2009528546 A | | 8/2009 |
| JP | 2013511233 | | 3/2013 |
| WO | 2012012561 A1 | | 1/2012 |
| WO | 2013029000 A1 | | 2/2013 |
| WO | 2015192113 A1 | | 12/2015 |
| WO | WO 2015180119 | | 12/2015 |
| WO | WO-2015192113 A1 | | 12/2015 |
| WO | 2017043867 A1 | | 3/2017 |
| WO | 2017172068 A1 | | 10/2017 |
| WO | WO-2017196510 A1 | | 11/2017 |
| WO | 2018028941 A1 | | 2/2018 |
| WO | 2018128452 A1 | | 7/2018 |
| WO | 2018159967 A1 | | 9/2018 |
| WO | WO-2019027540 A1 | | 2/2019 |
| WO | WO-2020073644 A1 | | 4/2020 |

OTHER PUBLICATIONS

Qualcomm Incorporated: "Local NR Positioning in NG-RAN", 3GPP Draft, 3GPP TSG-RAN WG3 Meeting #105, R3-193586 (Local LMF), 3rd Generation Partnership Project (3GPP), Mobile Competence Centre, 650, Route Des Lucioles, F-06921 Sophia-Antipolis Cedex, France, vol. RAN WG3, No. Ljubljana, Slovenia, Aug. 26, 2019-Aug. 30, 2019, Aug. 16, 2019 (Aug. 16, 2019), XP051769793, 32 pages, Retrieved from the Internet: URL: http://www.3gpp.org/ftp/tsg_ran/WG3_lu/TSGR3_105/Docs/R3-193586.zip. [retrieved on Aug. 16, 2019] the whole document.
Qualcomm Incorporated: "NG-RAN Positioning Architecture and Procedures", 3GPP Draft, 3GPP TSG-RAN WG2 Meeting #105, R2-1901370, (NG-RAN Positioning Architecture), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602729, 10 pages, Retrieved from the Internet: URL: http://www.3gpp.org/ftp/tsg%5Fran/WG2%5FRL2/TSGR2%5F105/Docs/R2%2D1901370%2Ezip. [retrieved on Feb. 15, 2019] the whole document.
Qualcomm Incorporated: "NG-RAN Positioning Architecture and Procedures", 3GPP Draft, R2-1817898, (NG-RAN Positioning Architecture), 3rd Generation Partnership Project (3GPP), Mobile Competence Centre, 650, Route Des Lucioles, F-06921 Sophia-Antipolis Cedex, France, vol. RAN WG2. No. Spokane, USA, Nov. 12, 2018-Nov. 16, 2018, Nov. 12, 2018 (Nov. 12, 2018), XP051557411,

(56) References Cited

OTHER PUBLICATIONS 17 pages, Retrieved from the Internet: URL: http://www.3gpp.org/ftp/Meetings%5F3GPP%5FSYNC/RAN2/Docs/R2%2D1817898%2Ezip. [retrieved on Nov. 12, 2018] paragraph [09.2]-paragraph [9.3.x.7.2].
International Search Report and Written Opinion—PCT/US2019/059076—ISA/EPO—Apr. 17, 2020.
Qualcomm Incorporated: "Combined Downlink and Uplink NR Positioning Procedures", 3GPP Draft, 3GPP TSG-RAN WG2 Meeting #82, R2-1817899, (Positioning Procedures), 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481785, pp. 1-18, Retrieved from the Internet: URL: https://www.3gpp.org/ftp/tsg_ran/wg2_rl2/TSGR2_104/Docs/R2-1817899.zip [retrieved on Nov. 2, 2018], Paragraphs [001]-[004], p. 4, Figures 1-5.
Qualcomm Incorporated: "On Demand Transmission of PRS for NR," 3GPP Draft, 3GPP TSG-RAN WG2 Meeting #104, R2-1817902_ (On Demand PRS), 3RD Generation Partnership Project (3GPP), Mobile Competence Centre, 650, Route Des Lucioles, F-06921, Sophia-Antipolis Cedex, France, vol. RAN WG2. No, Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip[retrieved on Nov. 12, 2018], the whole document, in combination with US20180217224A1, Sections 9.2.x.3 and 9.2.x.6;figures 9.2.x.3-1,9.2.x.6-1.
Trueposition: "UTDOA Architecture Options", 3GPP Draft, R2-112792, UTDOA Architecture, 3rd Generation Partnership Project (3GPP), Mobile Competence Centre, 650, Route Des Lucioles, F-06921 Sophia-Antipolis Cedex, France, vol. RAN WG2, No. Barcelona, Spain, May 9, 2011, May 3, 2011 (May 3, 2011), XP05095236, 9 pages, [retrieved on May 3, 2011] the whole document.
European Search Report—EP21214064—Search Authority—Munich—Apr. 4, 2022.
3GPP TS 38.401: "3rd Generation Partnership Project, Technical Specification Group Radio Access Network, NG-RAN, Architecture description (Release 15)", 3GPP, Mobile Competence Centre, 650, Route Des Lucioles, F-06921 Sophia-Antipolis Cedex, France, vol. Ran WG3, No. V15.4.0 (Dec. 2018), Jan. 8, 2019, pp. 1-40, XP051591620, para. [6.1.1], [6.1.2] para. [08.1]—para. [8.2.2.2] para. [8.6.1]—para. [08.7] para. [8.9.4] para. [8.9.6.1], [8.9.6.2].
Qualcomm Incorporated: "Considerations on NR Positioning Using PRS", 3GPP Draft, R1-1811287, 3GPP TSG-RAN WG1 Meeting #94bis, (OTDOA-RTT-PRS), 3rd Generation Partnership Project (3GPP), Mobile Competence Centre, 650, Route Des Lucioles ; F-06921 Sophia-Antipolis Cedex, France, vol. RAN WG1, No. Chengdu, CN; Oct. 8, 2018-Oct. 12, 2018, Sep. 29, 2018 (Sep. 29, 2018), XP051518690, 8 Pages, * chapters 2. 3.3. 3.5. 3.6. 4.
Taiwan Search Report—TW108139587—TIPO—Apr. 28, 2023.
European Search Report—EP23199506—Search Authority—Munich—Jan. 8, 2024.

* cited by examiner

SYSTEM AND METHODS FOR SUPPORTING UPLINK AND DOWNLINK POSITIONING PROCEDURES IN A WIRELESS NETWORK

CROSS-REFERENCE TO RELATED APPLICATIONS

This application claims the benefit of U.S. Provisional Application Nos. 62/753,904, entitled "SYSTEM AND METHODS FOR SUPPORTING NR POSITIONING PROCEDURES FOR DOWNLINK BASED, UPLINK BASED, AND DOWNLINK AND UPLINK BASED POSITIONING," filed Oct. 31, 2018, 62/754,572, entitled "SYSTEM AND METHODS FOR SUPPORTING NR POSITIONING PROCEDURES FOR DOWNLINK BASED, UPLINK BASED, AND DOWNLINK AND UPLINK BASED POSITIONING," filed Nov. 1, 2018, 62/805,882, entitled "SYSTEM AND METHODS FOR SUPPORTING UPLINK AND DOWNLINK POSITIONING PROCEDURES IN A WIRELESS NETWORK," filed Feb. 14, 2019, 62/805,945, entitled "ARCHITECTURE FOR SUPPORT OF HIGH-PERFORMANCE LOCATION SERVICES IN A NEXT GENERATION RADIO ACCESS NETWORK," filed Feb. 14, 2019, 62/825,779, entitled "SYSTEM AND METHODS FOR SUPPORTING UPLINK AND DOWNLINK POSITIONING PROCEDURES IN A WIRELESS NETWORK," filed Mar. 28, 2019, and 62/887,465, entitled "SYSTEM AND METHODS FOR SUPPORTING UPLINK AND DOWNLINK POSITIONING PROCEDURES IN A WIRELESS NETWORK," filed Aug. 15, 2019, which are assigned to the assignee thereof and which are expressly incorporated herein by reference in their entireties.

BACKGROUND OF THE DISCLOSURE

Field of the Disclosure

Aspects of the disclosure relate to position estimation procedures.

Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor.

Obtaining the location of a mobile device that is accessing a wireless (e.g. 5G) network may be useful for many applications including, for example, emergency calls, personal navigation, asset tracking, locating a friend or family member, etc. However, location of a mobile device can require the implementation of multiple position methods by different elements in a wireless network as well as by mobile devices. This may increase both the cost and complexity of wireless networks and mobile devices and may be a deterrent to supporting the most efficient and accurate position methods. It may therefore be desirable to improve the support of different position methods to better enable synergies and other means of reducing the cost and complexity of implementation.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A position of a user equipment (UE) may be determined using downlink based solutions (OTDOA), uplink based solutions (UTDOA), or combined downlink and uplink based solutions (RTT). The procedures offloads location support from Location Management Functions (LMFs), utilizing the gNBs and/or UE for location support. The serving gNBs may request neighboring gNBs produce downlink reference signal transmissions to a target UE and/or measure uplink reference signal transmissions from the target UE. The serving gNBs may receive the uplink reference signal measurements from neighboring gNBs and forward to the UE or another network entity, along with the serving gNBs own uplink reference signal measurement. The UE may use the uplink reference signal measurements, along with the UE's own downlink reference signal measurements to determine RTT. The serving gNBs may keep the uplink reference signal measurements and may determine RTT after receiving the downlink reference signal measurements from the UE.

In one aspect, a method for determining a position of a user equipment (UE) performed by the UE includes receiving from a serving gNBs assistance data for a plurality of gNBs, which includes the serving gNBs; transmitting to the plurality of gNBs uplink reference signals; receiving from the serving gNBs uplink reference signal measurements measured by each of the plurality of gNBs, wherein the serving gNBs received the uplink reference signal measurements from other gNBs in the plurality of gNBs; determining the position of the UE based on the uplink reference signal measurements measured by each of the plurality of gNBs and the assistance data for the plurality of the gNBs.

In one aspect, a user equipment (UE) configured for determining a position of the UE, includes an external interface configured to communicate with gNBs; at least one memory; and at least one processor coupled to the external interface and the at least one memory, the at least one processor configured to: receive via the external interface from a serving gNBs assistance data for a plurality of gNBs, which includes the serving gNBs; transmit via the external interface to the plurality of gNBs uplink reference signals; receive via the external interface from the serving gNBs uplink reference signal measurements measured by each of the plurality of gNBs, wherein the serving gNBs received the uplink reference signal measurements from other gNBs in the plurality of gNBs; and determine the position of the UE based on the uplink reference signal measurements measured by each of the plurality of gNBs and the assistance data for the plurality of the gNBs.

In one aspect, a method for determining a position of a user equipment (UE) performed by a serving gNBs for the UE includes receiving a location request for the UE from another entity; determining a plurality of neighbor gNBs; sending a request to each neighbor gNBs in the plurality of neighbor gNBs to increase downlink reference signal transmissions and to measure uplink reference signal transmissions from the UE; generating assistance data for the plurality of neighbor gNBs; transmitting the assistance data for the plurality of neighbor gNBs to the UE; receiving an uplink reference signal transmission from the UE; generating an uplink reference signal measurement for the uplink reference signal transmission; receiving one or more uplink reference signal measurements from each neighbor gNBs in the plurality of neighbor gNBs, wherein the one or more uplink reference signal measurements are generated from uplink reference signal transmissions from the UE to the neighbor gNBs; generating location information based on the uplink reference signal measurement from the serving gNBs and the one or more uplink reference signal measurements from the neighbor gNBs; and transmitting the location information to the other entity.

In one aspect, a gNBs configured for determining a position of a user equipment (UE) includes at least one external interface configured to communicate with the UE, with other gNBs and with entities in a wireless network; at least one memory; and at least one processor coupled to the at least one external interface and the at least one memory, the at least one processor configured to: receive a location request for the UE from another entity; determine a plurality of neighbor gNBs; send a request to each neighbor gNBs in the plurality of neighbor gNBs to increase downlink reference signal transmissions and to measure uplink reference signal transmissions from the UE; generate assistance data for the plurality of neighbor gNBs; transmit via the at least one external interface the assistance data for the plurality of neighbor gNBs to the UE; receive via the at least one external interface an uplink reference signal transmission from the UE; generate an uplink reference signal measurement for the uplink reference signal transmission; receive via the at least one external interface one or more uplink reference signal measurements from each neighbor gNBs in the plurality of neighbor gNBs, wherein the one or more uplink reference signal measurements are generated from uplink reference signal transmissions from the UE to the neighbor gNBs; generate location information based on the uplink reference signal measurement from the serving gNBs and the one or more uplink reference signal measurements from the neighbor gNBs; and transmit via the at least one external interface the location information to the other entity.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1A:
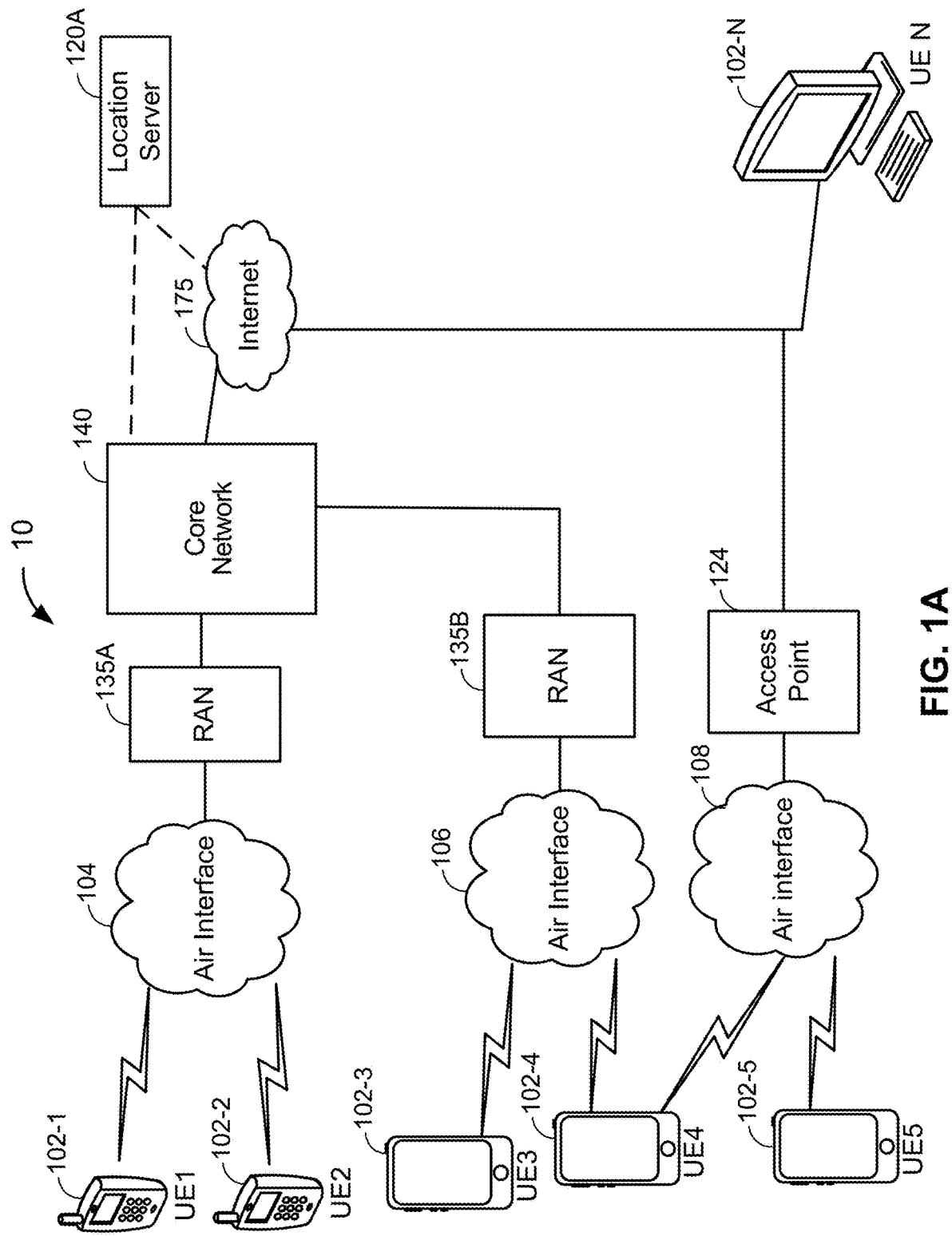
FIG. 1A illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 102-1, 102-2, 102-3, 102-4, 102-5, and 102-N of a UE are shown in FIG. 1A. A reference to a UE 102 then refers to any of UEs 102-1, 102-2, 102-3, 102-4, 102-5, and 102-N.

DETAILED DESCRIPTION

Disclosed are techniques for calculating a position of a UE, e.g., using OTDOA, UTDOA, AOD, AOA, or RTT. Radio access technology (RAT) dependent position solutions are possible that include downlink (DL) based solutions; downlink (DL) and uplink (UL) based solutions; and uplink (UL) based solutions, as discussed herein. An example of a DL based solution may be OTDOA positioning; an example of an UL based solution may be UTDOA. Round-Trip-Time (RTT) positioning is an example of a combined DL and UL based solution.

An NG-RAN positioning procedure may be applicable for DL based positioning methods, UL based positioning methods, and DL and UL based positioning methods, e.g., RTT based solutions. This procedure can be considered as a general case, where downlink-based (e.g., OTDOA) and uplink-based (e.g., UTDOA) positioning could be supported as special cases (e.g. subsets) of the procedure.

OTDOA and UTDOA positioning methods are based on time-of-arrival (TOA) measurements performed on downlink signals or uplink signals, respectively. Although these methods have been shown to be effective, they require precise base station time synchronization, which can be difficult to install and maintain.

Round-Trip-Time (RTT) positioning uses two-way time-of-arrival measurements and requires, in principle, no time synchronization between base stations. However, a coarse base station time synchronization may be desired in order to reduce interference and increase hearability from multiple transmission points. This time synchronization requirement may be similar to the synchronization requirements for Time Division Duplexing (TDD) (e.g., which may be microseconds level synchronization instead of nano-seconds as in case of OTDOA and UTDOA).

These techniques and other aspects are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A mobile device, also referred to herein as a UE, may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device", or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1A illustrates a high-level system architecture of a wireless communications system 10 in accordance with an aspect of the disclosure. The wireless communications system 10 contains UEs 1 to N (referenced as 102-1 to 102-5). The UEs 102-1 to 102-N can include cellular telephones, personal digital assistant (PDAs), pagers, a laptop computer, a tablet computer, a desktop computer, and so on. For example, in FIG. 1A, UE 102-1 and UE 102-2 are illustrated as cellular feature phones, UEs 102-3, 102-4, and 102-5 are illustrated as cellular touchscreen phones, or "smartphones," and UE 102-N is illustrated as a desktop computer, or personal computer (often referred to as a "PC"). Although only six UEs 102 are shown in FIG. 1A, the number of UEs 102 in wireless communications system 10 may be in the hundreds, thousands, or millions (e.g., N may be any number up to or greater than one million).

Referring to FIG. 1A, UEs 102-1 to 102-N are configured to communicate with one or more access networks (e.g., the RANs 135A and 135B, the access point 124, etc.) over a physical communications interface or layer, shown in FIG. 1A as air interfaces 104, 106, and 108 and/or a direct wired connection. The air interfaces 104 and 106 can comply with a given cellular communications protocol (e.g., Code Division Multiple Access (CDMA), Evolution-Data Optimized (E-VDO), Enhanced High Rate Packet Data (eHRPD), Global System for Mobile communications (GSM), Wideband CDMA (W-CDMA), Long Term Evolution (LTE), LTE Unlicensed (LTE-U), 5G New Radio (NR), etc.), while the air interface 108 can comply with a Wireless Local Area Network (WLAN) protocol (e.g., IEEE 802.11). Both RAN 135A and 135B may include a plurality of access points that serve UEs over air interfaces, such as the air interfaces 104 and 106. The access points in the RAN 135A and 135B can be referred to as access nodes (ANs), access points (APs), base stations (BSs), Node Bs, eNodeBs, gNBs, and so on. For example, an eNodeB (also referred to as an evolved NodeB) is typically a base station that supports wireless access by UEs 102 according to the LTE wireless interface defined by 3GPP. As another example, an NR NodeB, also referred to as a gNB or gNodeB, is typically a base station that supports wireless access by UEs 102 according to the 5G NR wireless interface. These access points can be terrestrial access points (or ground stations), or satellite access points.

Both RANs 135A and 135B are configured to connect to a core network 140 that can perform a variety of functions, including routing and connecting circuit switched (CS) calls between UEs 102 served by the RAN 135A/135B and other UEs 102 served by the RAN 135A/135B or UEs served by a different RAN altogether, and can also mediate an exchange of packet-switched (PS) data with external networks such as Internet 175 and external clients and servers.

The Internet 175 includes a number of routing agents and processing agents (not shown in FIG. 1A for the sake of convenience). In FIG. 1A, UE 102-N is shown as connecting to the Internet 175 directly (i.e., separate from the core network 140, such as over an Ethernet connection of WiFi or 802.11-based network). The Internet 175 can thereby function to route and connect packet-switched data communications between UE 102-N and UEs 102-1 to 102-5 via the core network 140.

Also shown in FIG. 1A is the access point 124 that is separate from the RANs 135A and 135B. The access point 124 may be connected to the Internet 175 independently of the core networks 140 (e.g., via an optical communication system such as FiOS, a cable modem, etc.). The air interface 108 may serve UE 102-4 or UE 102-5 over a local wireless connection, such as IEEE 802.11 in an example. UE 102-N is shown as a desktop computer with a wired connection to the Internet 175, such as a direct connection to a modem or router, which can correspond to the access point 124 itself in an example (e.g., for a WiFi router with both wired and wireless connectivity).

Referring to FIG. 1A, a location server 120A is shown as connected to the Internet 175 and the core network 140. The location server 120A can be implemented as a plurality of structurally separate servers, or alternately may each correspond to a single server. As will be described below in more detail, the location server 120A is configured to support one or more location services for UEs 102 that can connect to the location server 120A via the core network 140 and/or via the Internet 175.

An example of a protocol-specific implementation for the RANs 135A and 135B and the core network 140 is provided below with respect to FIG. 1B and FIG. 2 to help exemplify the wireless communications system 10 in more detail. In particular, the components of the RANs 135A and 135B and the core network 140 correspond to components associated with supporting packet-switched (PS) communications, whereby legacy circuit-switched (CS) components may also be present in these networks, but any legacy CS-specific components are not shown explicitly in FIG. 1B and FIG. 2.

Figure 1B:
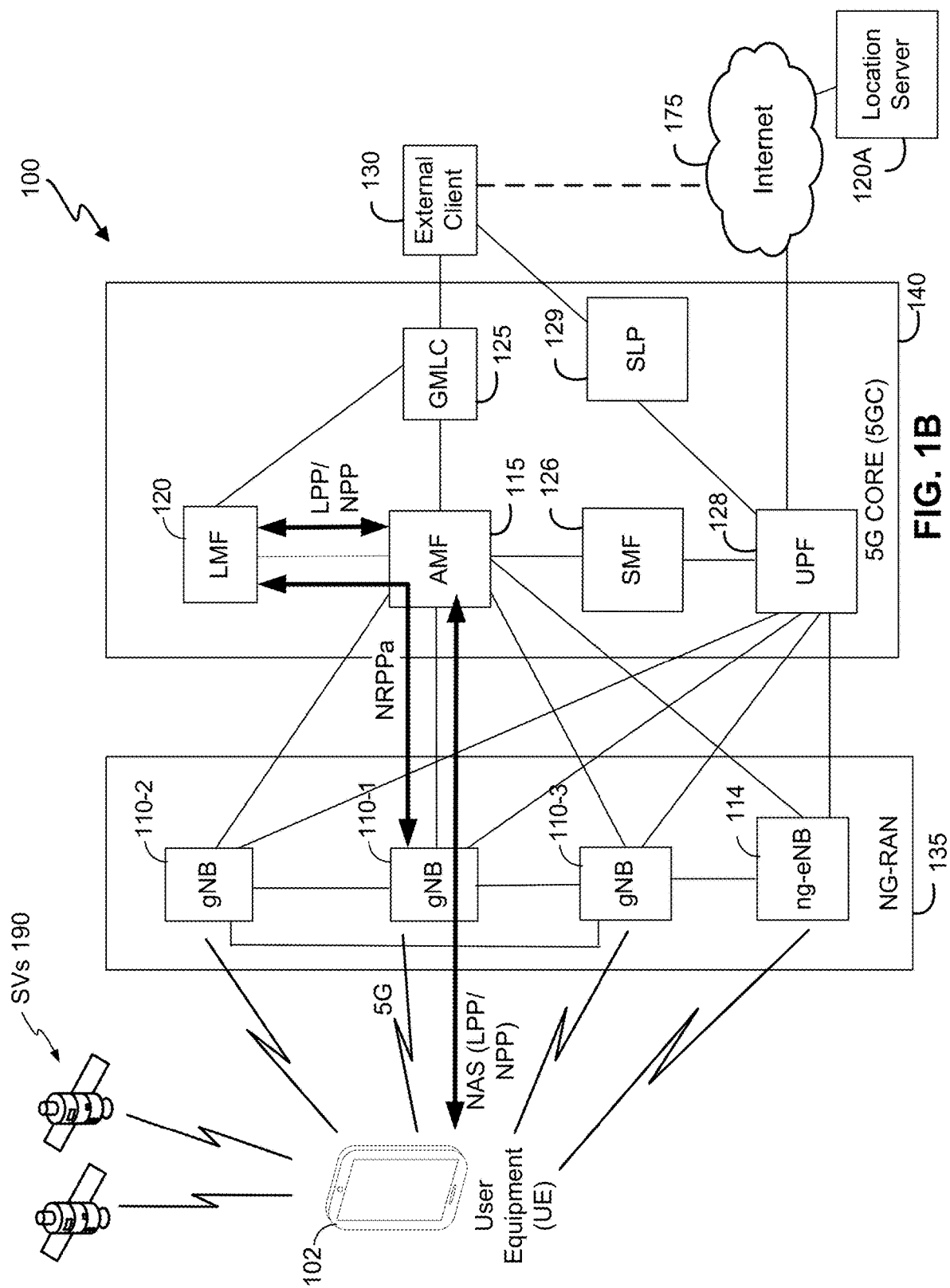
FIG. 1B illustrates the wireless communication system including a Next Generation (NG) Radio Access Network.

FIG. 1B shows a diagram of a communication system 100, according to an embodiment, which may be part of the communication system 10 shown in FIG. 1A. The communication system 100 may be configured to implement position determination for a UE using downlink-based solutions (e.g., OTDOA), uplink-based solutions (e.g., UTDOA), or combined downlink-based and uplink-based solutions (e.g., RTT). Here, the communication system 100 comprises a UE 102, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1B provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1B illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure and support RAT dependent position solutions including: downlink (DL) based solutions; downlink (DL) and uplink (UL) based solutions; and uplink (UL) based solutions.

The UE 102 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, tracking device, navigation device, Internet of Things (IoT) device, or some other portable or moveable device. Typically, though not necessarily, the UE 102 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), LTE, 5G New Radio (NR) (e.g., using the NG-RAN 135 and 5GC 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (via elements of 5GC 140 not shown in FIG. 1B, or possibly via a Gateway Mobile Location Center (GMLC) 125) and/or allow the external client 130 to receive location information regarding the UE 102 (e.g., via the GMLC 125).

The UE 102 may include a single entity or may include multiple entities such as in a personal area network where a user may employ audio, video and/or data I/O devices and/or body sensors and a separate wireline or wireless modem. An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1B comprise NR NodeBs, also referred to as gNBs, 110-1, 110-2 and 110-3 (collectively and generically referred to herein as gNBs 110). Pairs of gNBs 110 in NG-RAN 135 may be connected to one another—e.g. directly as shown in FIG. 1B or indirectly via other gNBs 110. Access to the 5G network is provided to UE 102 via wireless communication between the UE 102 and one or more of the gNBs 110, which may provide wireless communications access to the 5GC 140 on behalf of the UE 102 using 5G NR. 5G NR radio access may also be referred to as NR radio access or as 5G radio access and may be as defined by the Third Generation Partnership Project (3GPP). In FIG. 1B, the serving gNB for UE 102 is assumed to be gNB 110-1, although other gNBs (e.g. gNB 110-2 and/or gNB 110-3) may act as a serving gNB if UE 102 moves to another location or may act as a secondary gNB to provide additional throughout and bandwidth to UE 102.

Base stations (BSs) in the NG-RAN 135 shown in FIG. 1B may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 102. Some gNBs 110 (e.g. gNB 110-2) and/or ng-eNB 114 in FIG. 1B may be configured to function as positioning-only beacons, which may transmit signals (e.g. PRS signals) and/or may broadcast assistance data to assist positioning of UE 102 but may not receive signals from UE 102 or from other UEs. It is noted that while only one ng-eNB 114 is shown in FIG. 1B, some embodiments may include multiple ng-eNBs 114.

As will be discussed in greater detail below, in some embodiments, the gNBs 110 and/or ng-eNB 114 (alone or in combination with other modules/units of the communication system 100) may be configured, in response to receiving a request (e.g. from a UE 102 or LMF 120) for an increased quantity of location-related information (e.g., a Positioning Reference Signal (PRS) and/or location related assistance data), to transmit or broadcast the location-related information (e.g. PRS or assistance data) with an increased quantity of resources (e.g., higher bandwidth, longer duration and/or shorter periodicity in the case of PRS). As noted, while FIG. 1B depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 102, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1B. The methods and techniques described herein for support of RAT dependent position solutions (e.g. including downlink (DL) based solutions; downlink (DL) and uplink (UL) based solutions; and uplink (UL) based solutions) may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 102, including cell change and handover and may participate in supporting a signaling connection to the UE 102 and possibly data and voice bearers for the UE 102. The LMF 120 may support positioning of the UE 102 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), and/or other positioning procedures. The LMF 120 may also process location services requests for the UE 102, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 102's location) may be performed at the UE 102 (e.g., using signal measurements obtained by UE 102 for signals transmitted by wireless nodes such as gNBs 110 and ng-eNB 114, and assistance data provided to the UE 102, e.g. by LMF 120).

The Gateway Mobile Location Center (GMLC) 125 may support a location request for the UE 102 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 102) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1B though only one of these connections may be supported by 5GC 140 in some implementations.

A User Plane Function (UPF) 128 may support voice and data bearers for UE 102 and may enable UE 102 voice and data access to other networks such as the Internet 175. UPF 128 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 128 may be connected to SLP 129 to enable support of location of UE 102 using SUPL. SLP 129 may be further connected to or accessible from external client 130.

As illustrated, a Session Management Function (SMF) 126 connects the AMF 115 and the UPF 128. The SMF 126 may have the capability to control both a local and a central UPF within a PDU session. SMF 126 may manage the establishment, modification and release of PDU sessions for UE 102, perform IP address allocation and management for UE 102, act as a Dynamic Host Configuration Protocol (DHCP) server for UE 102, and select and control a UPF 128 on behalf of UE 102.

The external client 130 may be connected to the core network 140 via the GMLC 125 and/or the SLP 129. The external client 130 may optionally be connected to the core network 140 and/or to a location server 120A, which may be, e.g., an SLP, that is external to SGCN 140, via the Internet 175. The external client 130 may be a server, a web server, or a user device, such as a personal computer, a UE, etc.

As further illustrated in FIG. 1B, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. NRPPa messages may be transferred between a gNB 110 and the LMF 120, and/or between an ng-eNB 114 and the LMF 120, via the AMF 115. As further illustrated in FIG. 1B, LMF 120 and UE 102 may communicate using an LTE Positioning Protocol (LPP), which may be defined in 3GPP TS 36.355. LMF 120 and UE 102 may also or instead communicate using a New Radio Positioning Protocol (which may be referred to as NPP or NRPP), which may be the same as, similar to, or an extension of LPP. Here, LPP and/or NPP messages may be transferred between the UE 102 and the LMF 120 via the AMF 115 and a serving gNB 110-1 or serving ng-eNB 114 for UE 102. For example, LPP and/or NPP messages may be transferred between the LMF 120 and the AMF 115 using service operations based on the Hyper-Text Transfer Protocol (HTTP), and may be transferred between the AMF 115 and the UE 102 using a 5G Non-Access Stratum (NAS) protocol. The LPP and/or NPP protocol may be used to support positioning of UE 102 using UE assisted and/or UE based position methods such as A-GNSS, RTK, OTDOA, angle of arrival (AOA), angle of departure (AOD), and/or ECID. The NRPPa protocol may be used to support positioning of UE 102 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining PRS transmission from gNBs 110 and/or ng-eNB 114.

With a UE assisted position method, UE 102 may obtain location measurements and send the measurements to a location server (e.g. LMF 120 or SLP 129) for computation of a location estimate for UE 102. For example, the location measurements may include one or more of a Received Signal Strength Indication (RSSI), Round Trip signal propagation Time (RTT) (which may also be referred to more simply as Round Trip Time), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 102 may obtain location measurements (e.g. which may be the same as or similar to location measurements for a UE assisted position method) and may compute a location of UE 102 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or Time Of Arrival (TOA)) for signals transmitted by UE 102, and/or may receive measurements obtained by UE 102, and may send the measurements to a location server (e.g. LMF 120) for computation of a location estimate for UE 102.

Information provided by the gNBs 110 and/or ng-eNB 114 to the LMF 120 using NRPPa may include timing and configuration information for PRS transmission and location coordinates. The LMF 120 can then provide some or all of this information to the UE 102 as assistance data in an LPP and/or NPP message via the NG-RAN 135 and the 5GC 140.

An LPP or NPP message sent from the LMF 120 to the UE 102 may instruct the UE 102 to do any of a variety of things, depending on desired functionality. For example, the LPP or NPP message could contain an instruction for the UE 102 to obtain measurements for GNSS (or A-GNSS), WLAN, and/or OTDOA (or some other position method). In the case of OTDOA, the LPP or NPP message may instruct the UE 102 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 102 of a signal (e.g. a PRS signal) transmitted or broadcast by one gNB 110 and a similar signal transmitted by another gNB 110. The UE 102 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 102 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1B) in the 5GC 140. For example, the WLAN may support IEEE 802.11 WiFi access for UE 102 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPP A (LPPa, as defined in 3GPP TS 36.455) in place of NRPPa to send and receive location information to and from the eNBs in the E-UTRAN and may use LPP to support positioning of UE 102. In these other embodiments, RAT dependent position solutions (e.g. including downlink (DL) based solutions, downlink (DL) and uplink (UL) based solutions, and uplink (UL) based solutions) for a UE 102 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

To support certain position methods such as OTDOA or UTDOA and transmission or PRS or other signals used in positioning of a UE 102, base stations may be synchronized. In a synchronized NR network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same times as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNBs 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol.

In the case of on demand scheduling of PRS, base stations (BSs), such as gNBs 110 and ng-eNB 114 in communication system 100 or eNBs in an EPS, could each transmit a PRS using a low bandwidth and low duration of PRS on a continuous background basis (e.g., using 1 or 2 subframes per positioning occasion and 1.4 MHz bandwidth in the case of eNBs) and temporarily switch to high bandwidth (e.g. 20 MHz) and/or high duration (e.g., 6 subframes per positioning occasion) when requested by UE 102. To support fast switching between low and high PRS resource allocation, a UE 102 request for high PRS resource allocation could be sent using a Radio Resource Control (RRC) protocol to a serving BS for UE 102 (e.g. a serving gNB 110 or ng-eNB 114 for UE 102 access to NG-RAN 135 or a serving eNB for UE 102 access to E-UTRAN). The serving BS may be configured to transfer or communicate the request to neighboring BSs. The request for high PRS resource allocation could be combined with a request by UE 102 for measurement gaps in the case that PRS is transmitted for some cells using a different frequency and/or different RAT to those for the serving cell for UE 102. A location server (e.g. an SLP 129, an E-SMLC for EPS or LMF 120 for 5GC 140) could then provide the UE 102 with the background low resource PRS configuration for the reference and neighbor cells for OTDOA positioning and could also indicate whether switching to high PRS resource allocation was supported. Alternatively, this information could be provided to a UE 102 via periodic broadcast from a gNB 110 (e.g. broadcast in a positioning related SIB). In the case that switching to high PRS resource allocation was supported, the location server (or gNB 110 in the case of information transfer via broadcast) could indicate to the UE 102 the types of increased PRS resource allocation supported such as increased PRS bandwidth, increased PRS subframes per positioning occasion and/or availability of UL frequency for DL PRS transmission (e.g. where the UL frequency is temporarily reassigned to DL PRS transmission). For each supported type of increased PRS resource allocation, the location server (or gNB 110) could also indicate the available amounts of increased PRS resource allocation such as available (or maximum) PRS bandwidth values, available (or maximum) numbers of PRS subframes per positioning occasion and/or one or more DL PRS configurations available on an UL carrier frequency.

When switching to high PRS resource allocation is supported, the UE 102 could send an RRC protocol request to the serving BS (e.g. serving eNB for E-UTRAN access or serving gNB 110 or ng-eNB 114 for NG-RAN 135 access), and include, for example, the PRS frequencies the UE 102 is able to measure, the maximum PRS resource allocation the UE 102 can measure (e.g., the maximum PRS bandwidth and/or maximum number of subframes per PRS positioning occasion), whether the UE 102 supports measurements of PRS on an uplink frequency (e.g. an uplink frequency for Frequency Division Duplexing (FDD)), and/or whether measurement gaps are needed. For example, if the location server had indicated to the UE 102 the available amounts of increased PRS resource allocation, the UE 102 could indicate a maximum increased PRS resource allocation, within the available amounts, which the UE 102 is able to measure. The UE 102 may also include the identities of the reference and neighbor cells for OTDOA which may have been previously provided to the UE 102 by a location server (e.g. LMF 120) when requesting OTDOA RSTD, RSRP or Receive Time-Transmit Time (Rx-Tx) measurements from UE 102. The serving BS could then send a request for increased PRS resource allocation (e.g. higher PRS bandwidth, more subframes per PRS positioning occasion, and/or use of PRS broadcast using uplink frequency) to neighbor BSs for the reference and neighbor cells indicated by the UE 102 (and/or to other neighbor BSs able to support an increased allocation of PRS resources). The serving BS could also optionally send an RRC confirmation to the UE 102 to confirm that the UE 102 request for increased PRS resource allocation will be supported and could provide configuration parameters for the increased PRS transmission such as an increased PRS bandwidth, increased number of PRS subframes per positioning occasion, use of particular subframes and bandwidth for an UL frequency, and/or the identities of cells for which the increased PRS transmission will be supported. The UE 102 would then obtain PRS measurements using the increased PRS resource allocation.

Figure 2:
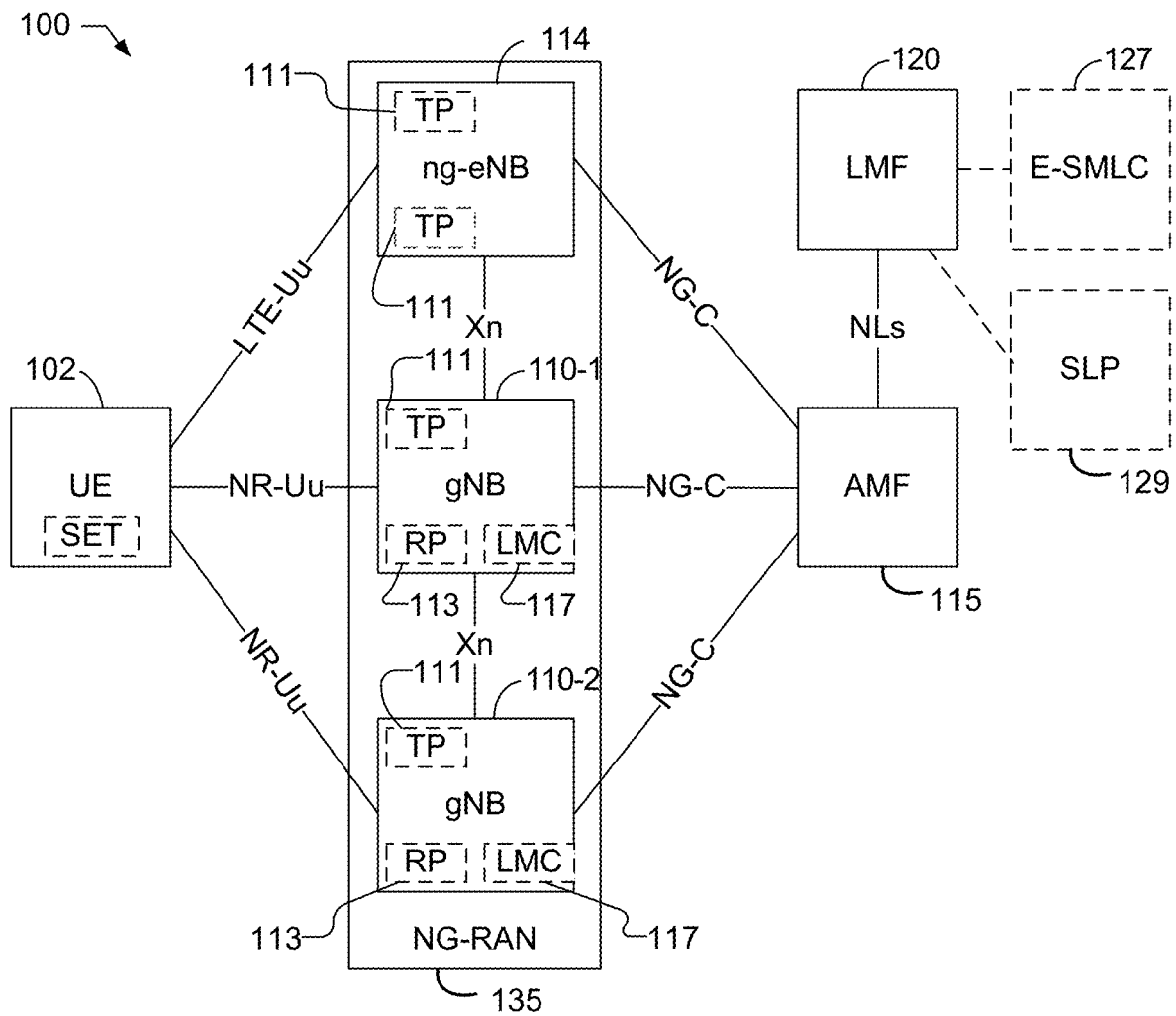
FIG. 2 illustrates a positioning architecture diagram of the communication system.

FIG. 2 shows a positioning architecture diagram applicable to communication system 10 in FIG. 1A and the communication system 100 in FIG. 1B, according to an embodiment. The positioning architecture shown in FIG. 2 can be a subset of the architecture shown in FIG. 1B that is applicable to NG-RAN 135, and shows additional elements in NG-RAN 135 not shown in FIG. 1B, and may be used to support NR RAT dependent position methods. As illustrated, the LMF 120 may be in communication with an Enhanced Serving Mobile Location Center (E-SMLC) 127 (e.g. which may be part of a separate EPC) and a Secure User Plane Location (SUPL) Location Platform (SLP) 129.

It should be noted that the gNBs 110 and ng-eNB 114 may not always both be present in the NG-RAN 135. Moreover, when both the gNBs 110 and ng-eNB 114 are present, the NG-C interface with the AMF 115 may only present for one of them.

As illustrated, a gNB 110 may be allowed to control one or more Transmission Points (TPs) 111, such as remote radio heads, or broadcast-only TPs for improved support of DL position methods such as OTDOA, AOD, RTT or ECID. Additionally, a gNB 110 may be allowed to control one or more Reception Points (RPs) 113, such as remote radio heads or internal Location Measurement Units (LMUs) for UL measurements for position methods such as Uplink Time Difference of Arrival (UTDOA), AOA, RTT or ECID. In some implementations, a TP 111 and RP 113 may be combined into a Transmission Reception Point (TRP) (not shown in FIG. 2) which performs the functions of both a TP 111 and an RP 113. A TP 111, RP 113 and/or a TRP may be part of or may comprise a Distributed Unit (DU, also referred to as gNB-DU) in a gNB 110 which manages UL and/or DL transmission and reception for one or more cells according to 5G NR. Further, a gNB 110 may include a Location Management Component (LMC) 117 (also referred to as a "local LMF"), which may be a location server (or location server function) enabled to support positioning of a target UE 102 in a serving gNB 110 or a neighboring gNB 110 for UE 102. Positioning of a UE 102 by an LMC 117 in a serving or neighboring gNB 110 can be used to provide a location service to a UE 102, serving AMF 115 or LMF 120 and to improve NG-RAN operation—e.g. by assisting with handover and distribution of UEs among available NG-RAN nodes.

An LMC 117 may support positioning of a UE 102 in a similar or identical manner to an LMF 120 and may support the same or similar position methods (e.g. OTDOA, RTT, AOD, AOA, UTDOA, ECID, A-GNSS, RTK). An LMC 17 may be part of a Central Unit (CU, also referred to as gNB-CU) in a gNB 110, where the CU may also manage and control the overall operation of the gNB 110 and serve as an endpoint for RRC communication with a UE 102, Xn communication with another gNB 110, NGAP communication with an AMF 154 and/or NRPPa communication with an LMF 120. Alternatively, LMC 117 may be a separate element in a gNB 110 and be connected to a CU in the gNB 110 (e.g. using an F1 interface). For example, the LMC 117 may request location measurements from the UE 102, e.g., using RRC or LPP, may manage UL location measurements by one or more gNBs 110 of the UE 102, and may provide cell database assistance data and/or UL location measurements to a UE 102 for position methods such as OTDOA, AOD and RTT. The LMC 117 may further manage static and dynamic scheduling of PRS broadcast and broadcast of assistance data by one or more gNBs 110, interact with neighboring gNBs 110 (e.g. using XnAP and NRPPa) to coordinate location support, e.g., exchange location measurements for a UE 102 or coordinate changes to PRS transmission. The LMC 117 may determine a location estimate for a UE 102. The LMC 117 may provide a location service capability to a serving AMF (e.g. using a Next Generation Application Protocol (NGAP)), provide a location service capability to an LMF 120 (e.g. using NRPPa), and provide a location service capability to a UE 102 (e.g. using RRC or LPP).

Peer level LMCs 117 may communicate using an Xn Application Protocol (XnAP) or a location specific protocol above XnAP in order to coordinate support of these functions, e.g. to enable continuing location of a UE 102 following a handover of UE 102 to a new serving gNB 110.

Thus, an LMC 117 may allow or support NG-RAN 135 determination of a UE 102 location which can be requested by the UE 102 (e.g. using RRC or LPP), by a serving AMF 154 (e.g., using NGAP), by another gNB 110 (e.g. using XnAP) or by an LMF 120 (e.g. using NRPPa). Such a capability could allow location support without the need for an LMF 120 (or GMLC 125 (shown in FIG. 1B) in the 5GC 140 and can also be used to reduce latency in position determination (since the NG-RAN 135 is closer to a UE 102 than an LMF 120) and offload location support from an LMF 120.

Time intervals of a communications resource in 5G NR (or LTE) may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms. A subframe may be further divided into slots where the slot duration and number of slots per subframe may depend on the numerology (including OFDM subcarrier spacing and symbol length). In 5G NR for example, slot length gets different depending on numerology; in general slot length gets shorter as subcarrier spacing gets wider. A slot may be composed of 14 OFDM symbols. Mini-slots may also be supported, which can be as small as 2 OFDM symbols and have variable length. In some cases, a slot may be the smallest scheduling unit of the wireless communications system 100, and may be referred to as a transmission time interval (TTI).

Figure 3:
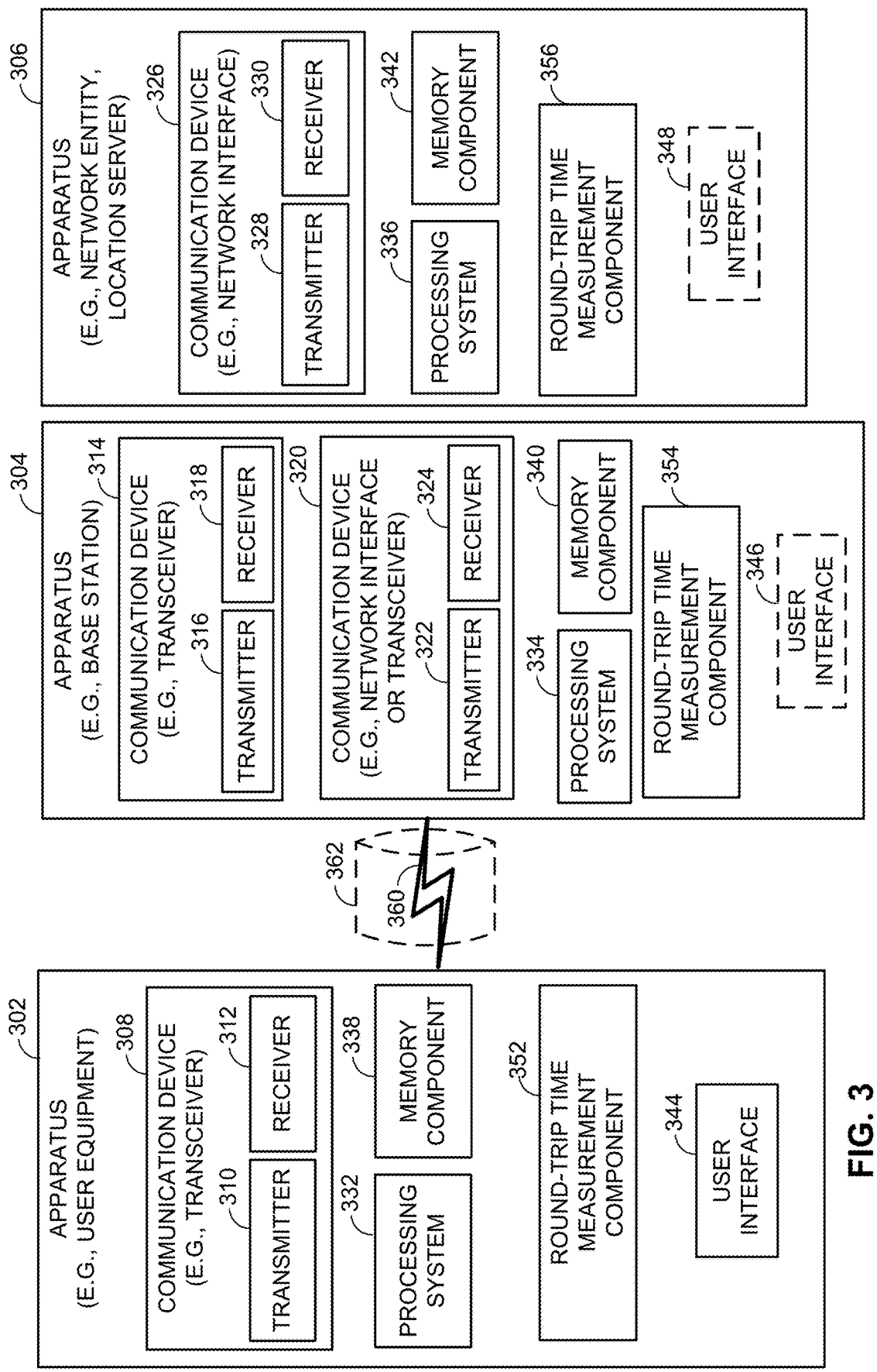
FIG. 3 is a simplified block diagram of several sample aspects of components that may be employed in wireless communication nodes and configured to support communication as taught herein.

FIG. 3 illustrates several sample components (represented by corresponding blocks) that may be incorporated into an apparatus 302, an apparatus 304, and an apparatus 306 (corresponding to, for example, a UE 102, a base station (e.g., a gNB 110), and a network entity or location server, respectively) to support the operations as disclosed herein. As an example, the apparatus 302 may correspond to a UE 102, the apparatus 304 may correspond to any of gNBs 110, and the apparatus 306 may correspond to the LMF 120, LMC 117, E-SMLC 127, SLP 129, or GMLC 125. It will be appreciated that the components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 each include at least one wireless communication device (represented by the communication devices 308 and 314) for communicating with other nodes via at least one designated radio access technology (RAT) (e.g., LTE, 5G NR). Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by the communication device 320 and the communication device 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 also include other components that may be used in conjunction with the operations as disclosed herein. The apparatus 302 includes a processing system 332 for providing functionality relating to, for example, RTT measurements in a licensed or unlicensed frequency band as disclosed herein and for providing other processing functionality. The apparatus 304 includes a processing system 334 for providing functionality relating to, for example, RTT measurements in a licensed or unlicensed frequency band as disclosed herein and for providing other processing functionality. The apparatus 306 includes a processing system 336 for providing functionality relating to, for example, RTT measurements in a licensed or unlicensed frequency band as disclosed herein and for providing other processing functionality. In an aspect, the processing systems 332, 334, and 336 may include, for example, one or more general purpose processors, multi-core processors, application-specific integrated circuits (ASICs), digital signal processors (DSPs), field programmable gate arrays (FPGA), or other programmable logic devices or processing circuitry.

The apparatuses 302, 304, and 306 include memory components 338, 340, and 342 (e.g., each including a memory device), respectively, for maintaining information (e.g., information indicative of reserved resources, thresholds, parameters, and so on). In addition, the apparatuses 302, 304, and 306 include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home gNBs, such as Home gNBs 110-1 in FIG. 2. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with (an)other RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by Wireless Local Area Network (WLAN) technologies, most notably IEEE 802.11x WLAN technologies generally referred to as "Wi-Fi," and LTE in unlicensed spectrum technologies generally referred to as "LTE-U" or "MuLTEFire."

Apparatus 302 may also include an RTT measurement component 352 that may be used to obtain location related measurements of signals (e.g., RTT or other signals) transmitted by a base station or AP (e.g., any of gNBs 110) according to techniques described herein. Location related measurements may include measurements of signal propagation time or RTT between a UE 102 and a base station or AP, such as any of gNBs 110.

Apparatus 304 and 306 may each include an RTT measurement component 354 and 356, respectively, which may be used to determine a location estimate for a UE 102 (e.g., apparatus 302), according to techniques described herein, based on location related measurements provided by the UE 102 and/or by a base station or AP, such as any of gNBs 110. Location related measurements obtained by the UE 102 may include measurements of signal propagation time or RTT between a UE 102 and a base station or AP, such as any of gNBs 110. Location related measurements obtained by any of gNBs 110 (e.g., apparatus 304) may include measurements of signal propagation time or RTT between the UE 102 and a base station or AP, such as any of gNBs 110.

Figure 4:
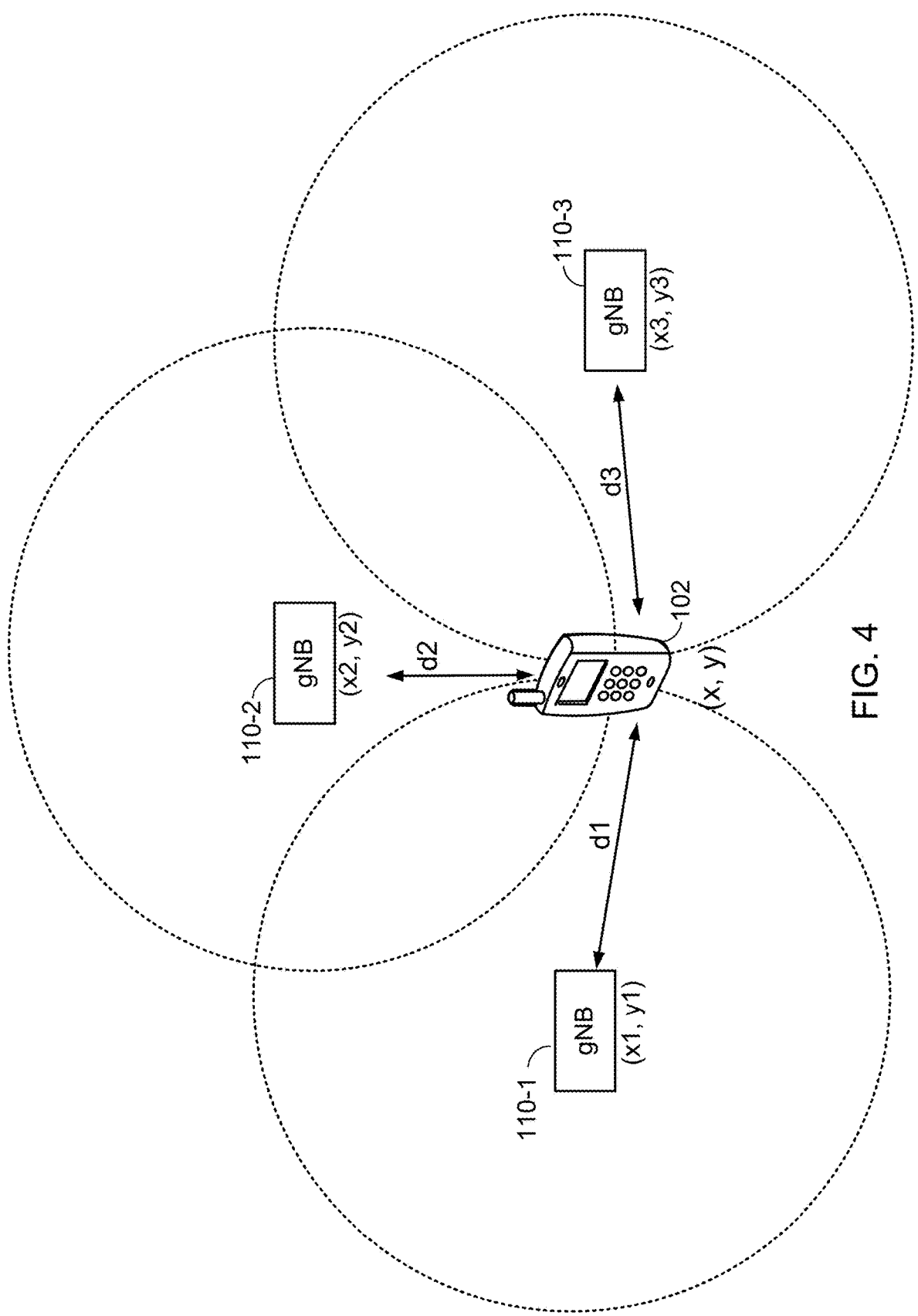
FIG. 4 is diagram illustrating an exemplary technique for determining a position of a mobile station using information obtained from a plurality of base stations.

A simplified environment is shown in FIG. 4 for illustrating an exemplary technique for determining a position of UE 102. The UE 102 may communicate wirelessly with a plurality of gNBs 110 using radio frequency (RF) signals and standardized protocols for the modulation of the RF signals and the exchanging of information packets. By extracting different types of information from the exchanged signals, and utilizing the layout of the network (i.e., the network geometry) the UE 102 may determine its position in a predefined reference coordinate system. As shown in FIG. 4, the UE 102 may specify its position (x, y) using a two-dimensional coordinate system; however, the aspects disclosed herein are not so limited, and may also be applicable to determining positions using a three-dimensional coordinate system, if the extra dimension is desired. Additionally, while three gNBs 110 are shown in FIG. 4, aspects may utilize additional gNBs.

In order to determine its position (x, y), the UE 102 may first need to determine the network geometry. The network geometry can include the positions of each of the gNBs 110 in a reference coordinate system ($(x_k, y_k)$, where k=1, 2, 3). The network geometry may be provided to the UE 102 in any manner, such as, for example, providing this information in beacon signals, providing the information using a dedicated server external on an external network, providing the information using uniform resource identifiers, etc.

The UE 102 may then determine a distance ($d_k$, where k=1, 2, 3) to each of the gNBs 110. As will be described in more detail below, there are a number of different approaches for estimating these distances ($d_k$) by exploiting different characteristics of the RF signals exchanged between the UE 102 and gNBs 110. Such characteristics may include, as will be discussed below, the round trip propagation time of the signals, and/or the strength of the signals (RSSI).

In other aspects, the distances ($d_k$) may in part be determined or refined using other sources of information that are not associated with the gNBs 110. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the UE 102 which can be used as a basis to provide rough estimates of relative position and/or direction (e.g., on-board accelerometers).

Once each distance is determined, the UE 102 can then solve for its position (x, y) by using a variety of known geometric techniques, such as, for example, trilateration. From FIG. 4, it can be seen that the position of the UE 102 ideally lies at the intersection of the circles drawn using dotted lines. Each circle being defined by radius $d_k$ and center ($x_k$, $y_k$), where k=1, 2, 3. In practice, the intersection of these circles may not lie at a single point due to the noise and other errors in the networking system.

Determining the distance between the UE 102 and each gNBs 110 may involve exploiting time information of the RF signals. In an aspect, determining the RTT of signals exchanged between the UE 102 and a gNBs 110 can be performed and converted to a distance ($d_k$). RTT techniques can measure the time between sending a data packet and receiving a response. These methods utilize calibration to remove any processing delays. In some environments, it may be assumed that the processing delays for the UE 102 and the gNBs 110 are the same. However, such an assumption may not be true in practice.

A position estimate (e.g., for a UE 102) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5A:
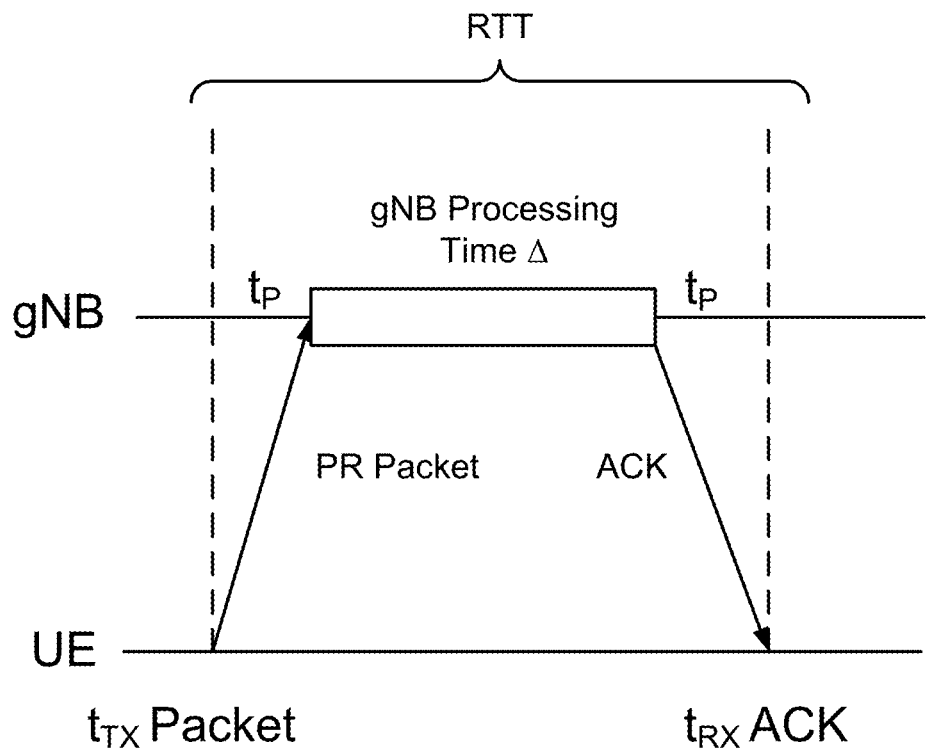
FIGS. 5A and 5B are diagrams showing exemplary timings within a RTT occurring during a wireless probe request and a response.
Figure 5B:
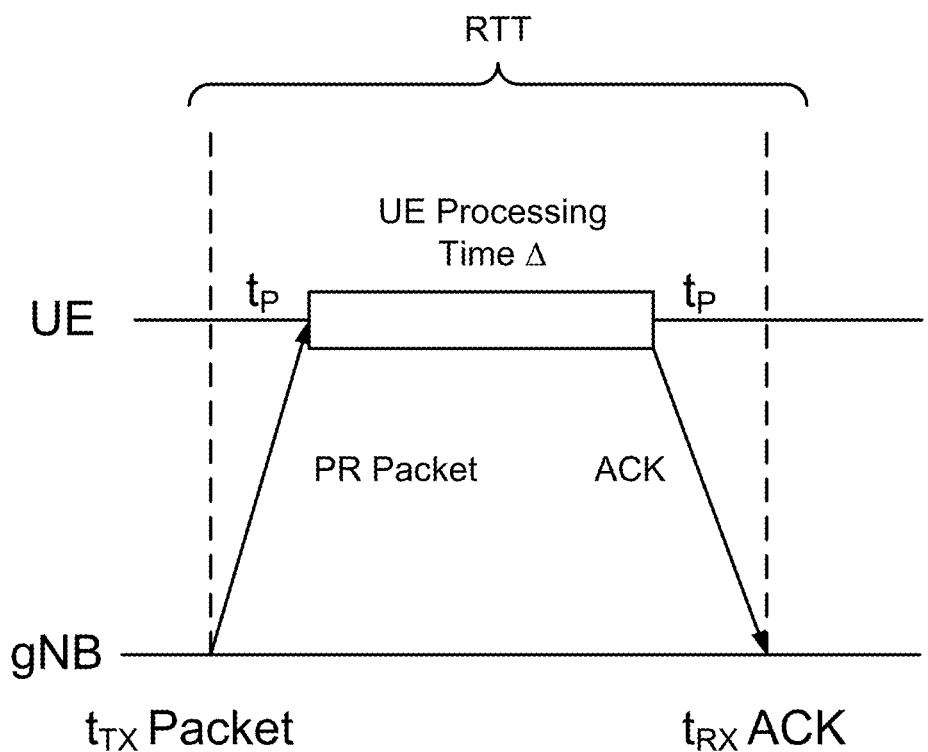

FIGS. 5A and 5B are diagrams showing exemplary timings within an RTT occurring during a wireless probe request and a response initiated by a UE 102 and a gNBs 110, respectively. In an aspect, the response may take the form of an acknowledgement packet (ACK); however, any type of response packet would be consistent with various aspects of the disclosure. For example, an RTS (request to send) transmit packet and/or CTS (clear to send) response packet may be suitable.

As illustrated in FIG. 5A, to measure the RTT with respect to a given gNBs (e.g., any of gNBs 110), the UE 102 may send a directed probe request, e.g., an uplink RTT reference signal, to gNBs, and record the time (timestamp) the probe request packet was sent ($t_{TX}$ Packet) as shown on the UE timeline. After a propagation time $t_p$ from the UE 102 to the gNBs, the gNBs will receive the packet. The gNBs may then process the directed probe request and may send an ACK back, e.g., a downlink RTT reference signal, to the UE 102 after some processing time Δ, sometimes referred to herein as a processing delay, as shown on the gNBs timeline in FIG. 5A. After a second propagation time $t_p$, the UE 102 may record the time (timestamp) the ACK packet was received ($t_{RX}$ ACK) as shown on the UE time line. The UE 102, or other entity, such as the location server, may then determine the total RTT as the time difference $t_{RX}$ ACK−$t_{TX}$ Packet. The net RTT, i.e., the two-way propagation time, may be determined based on the difference between the total RTT and the processing delay Δ.

FIG. 5B, is similar to FIG. 5A, but illustrates that to measure the RTT with respect to a UE, a gNBs (e.g., any of gNBs 110) may send a directed probe request, e.g., a downlink RTT reference signal, to the UE, and record the time (timestamp) the probe request packet was sent ($t_{TX}$ Packet) as shown on the gNB timeline. After a propagation time $t_p$ from the gNBs to the UE 102, the UE 102 will receive the packet. The UE 102 may then process the directed probe request and may send an ACK, e.g., an uplink RTT reference signal, back to the gNBs after some processing time Δ, e.g., the processing delay, as shown on the UE timeline in FIG. 5B. After a second propagation time $t_p$, the gNBs may record the time (timestamp) the ACK packet was received ($t_{RX}$ ACK) as shown on the gNB time line. The gNBs, or other entity such as the UE 102 or location server, may then determine the net RTT as the time difference $t_{RX}$ ACK−$t_{TX}$Packet. The net RTT, i.e., the two-way propagation time, may be determined based on the difference between the total RTT and the processing delay Δ.

Position location methods, such as observed time difference of arrival (OTDOA) and uplink time difference of arrival (UTDOA), currently used in cellular networks require fine (e.g., sub-microsecond) synchronization of timing across base-stations in the network. On the other hand, RTT-based methods only need coarse timing synchronization (within a cyclic prefix (CP) duration of the orthogonal frequency-division multiplexing (OFDM) symbols). The present disclosure describes procedures that can be implemented in a 5G NR network, exploiting its self-contained subframe structure.

In 5G NR, there is no requirement for precise timing synchronization across the network. Instead, it is sufficient to have (coarse) CP-level time-synchronization across gNBs. Coarse time-synchronization enables low-reuse of RTT Measurement signals, which mitigates intercell interference. Intercell interference mitigation ensures deep penetration of RTT signals, which enables multiple independent timing measurements across distinct gNBs, and hence more accurate positioning.

In a network-centric RTT estimation, the serving gNBs (one of gNBs 110) instructs the UE (e.g., UE 102) to look for RTT signals from one or more gNBs (one of more of gNBs 110). The one or more gNBs transmit RTT Measurement signals on low reuse resources, allocated by the network (e.g., location server 120). The UE records the arrival times Δt(i) of each RTT Measurement signal, relative to its current DL timing, and transmits a common or individual RTT Response message(s) to the one or more gNBs (when instructed by its serving gNBs). The RTT Response message directed at a particular gNBs includes, in its payload, the timestamp(s) (Δni)+TA), where Δt(i) denotes the arrival time of the RTT Measurement signal received from that gNB and TA denotes the uplink timing-adjust parameter of the UE. In the case of a common RTT Response message, the set of time-stamps (Δt(i)+TA) may be re-organized in other ways, well-known to a person of ordinary skill in the art. The network may allocate low reuse resources for the UE to transmit the RTT Response message(s). In any case, each gNBs that receives an RTT Response message records its arrival time ΔT(i), relative to the DL time-reference of the gNBs. The gNBs can compute RTT between the UE and itself by adding the timestamp value (Δt(i)+TA) to the arrival time ΔT(i). This computation may be performed either at the gNBs receiving of the RTT Response signal from the UE, or at a central location in the network.

Figure 6A:
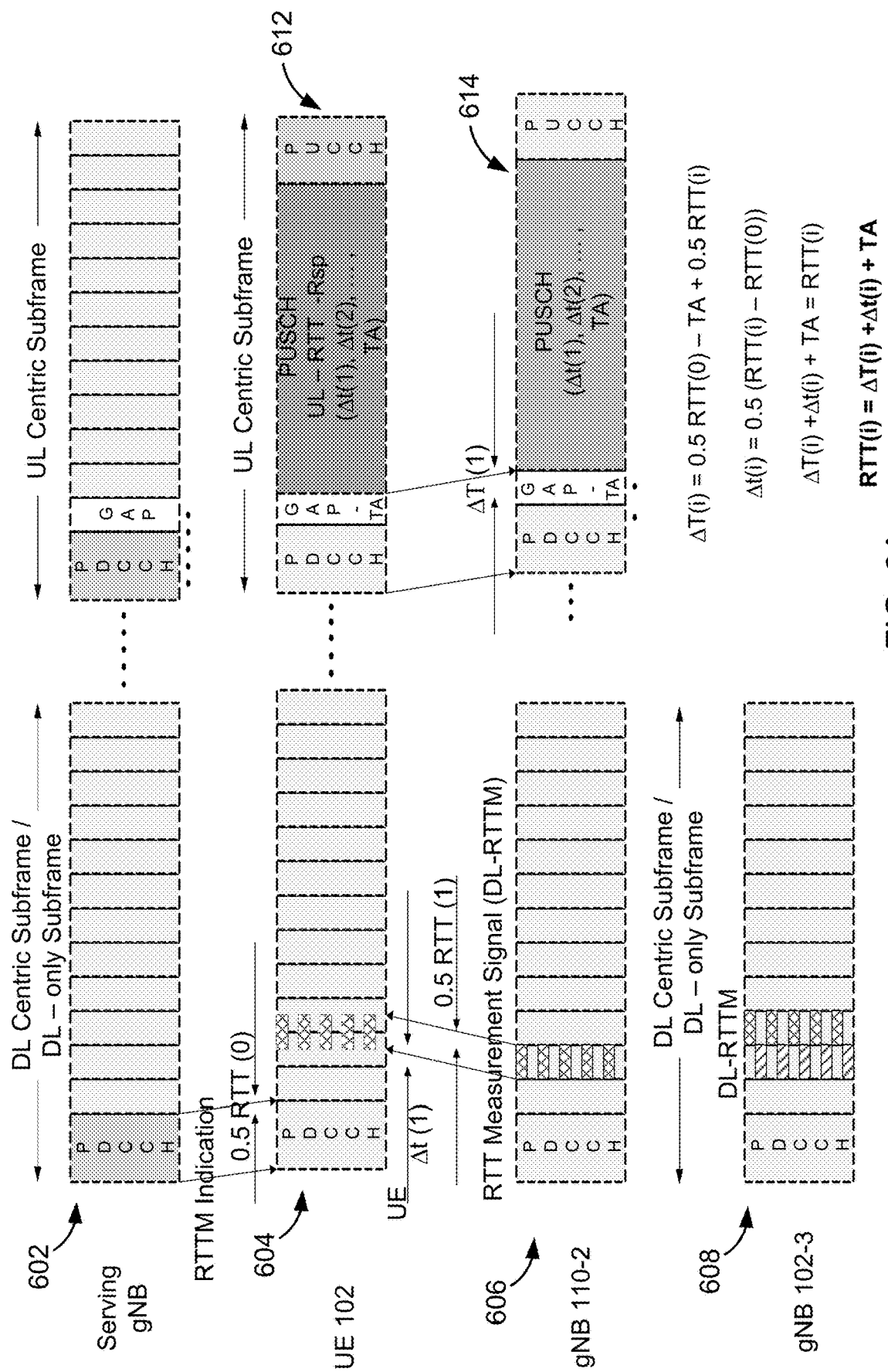
FIG. 6A illustrates an example of the network-centric RTT estimation according to an aspect of the disclosure.

FIG. 6A illustrates an example of a network-centric RTT estimation according to an aspect of the disclosure. As shown in FIG. 6A, on a downlink-centric/downlink-only subframe (at low duty-cycle) of the downlink (DL) sequence of subframes 602, the serving gNB (e.g. gNB 110-1) sends a control signal (e.g., on the physical downlink control channel (PDCCH)) to the UE 102, indicating to the UE 102 that one or more gNBs (gNBs 110 in the example of FIG. 6A) will be transmitting downlink RTT Measurement (RTTM) signal(s). During the downlink sequences of subframes 606 and 608, gNBs 110 transmit downlink RTT Measurement signals at specified symbols of the subframe, in a time division multiplexing (TDM) or frequency division multiplexing (FDM) fashion. The RTT Measurements transmitted by the gNBs 110 should be wideband signals to enable the UE 102 to make precise timing measurements. No other signals should be transmitted in or around the symbols associated with the RTT Measurements by any other gNBs in the neighborhood (resulting in low-reuse, interference avoidance, and deep penetration of RTT Measurements).

During downlink the sequence of subframes 604, the UE 102 measures the arrival time Δt(i) of each downlink RTT Measurement transmitted during the sequences of subframes 606 and 608 relative to its own downlink subframe timing (derived from the downlink signal received from the serving gNBs on the PDCCH). The UE 102 is instructed to report its RTT Measurements on the physical uplink shared channel (PUSCH) during a subsequent subframe, which it does during the uplink sequence of subframes 612. The report from the UE 102 includes the arrival times Δt(i) of each downlink RTT Measurement, as well as the UE 102's own uplink timing-adjust (TA) provided by the serving gNBs. Like the downlink RTT Measurements transmitted by the gNBs 110, the uplink RTT Measurements transmitted by the UE 102 should be wideband signals to enable the gNBs to make precise timing measurements.

Each gNB in the UE 102's neighborhood (i.e., within communication range of the UE 102; gNBs 110 in the example of FIG. 6A) receives the report from the UE 102 during the uplink sequence of subframes 614 and decodes it, and also records the arrival time ΔT(i) of the uplink (UL) signals from the UE 102, relative to its own system-time. The RTT may then be computed from the arrival time of the report from the UE 102, combined with timing information in the payload (i.e., the RTT Measurement report).

Note that the Timing Advance (TA), which should also be a wideband signal, is a parameter that accounts for the UE 102's distance from the serving gNBs. The TA enables all uplink signals from the UE 102 to arrive at the serving gNBs at the same time. The uplink TA enables the RTT Measurements to arrive exactly at the end of the gap.

A UE-centric RTT estimation is similar to the network-based method, except that the UE (e.g., UE 102) transmits RTT Measurement signal(s) (when instructed), which are received by multiple gNBs in the neighborhood of UE. Each gNBs responds with a RTT Response message, including the arrival time Δt(i) of the RTT Measurement signal from the UE in the message payload. The UE determines the arrival time ΔT(i) of the RTT Measurement message, decodes the RTT Response message and estimates, extracts the time-stamp Δt(i) embedded in the message, and computes the RTT for the responding gNBs, by adding the measured arrival-time ΔT(i), the extracted time-stamp Δt(i), and its own uplink-downlink timing-adjust value TA.

Figure 6B:
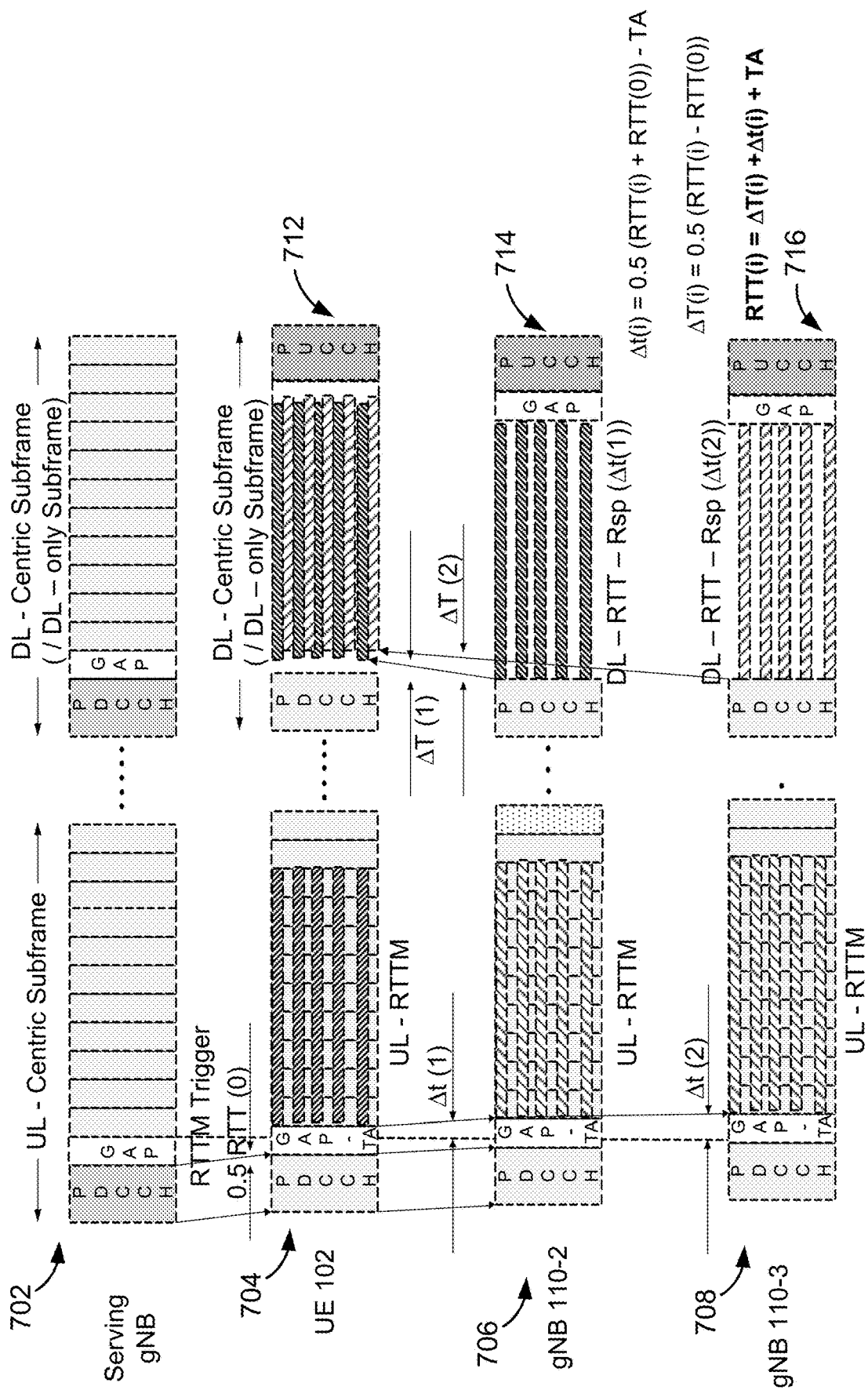
FIG. 6B illustrates an example of the UE-centric RTT estimation according to an aspect of the disclosure.

FIG. 6B illustrates an example of the UE-centric RTT estimation according to an aspect of the disclosure. On an uplink-centric (at low duty-cycle) subframe during the uplink sequence of subframes 702, the serving gNBs sends a control signal (e.g., on the PDCCH) to the UE 102, instructing the UE 102 (and any number of other UEs) to transmit an uplink RTT Measurement signal (UL-RTTM).

During the uplink sequence of subframes 704, the UE 102 transmits an RTT Measurement signal at specified resource blocks of the uplink data portion of the subframe, in a TDM or FDM fashion. The RTT Measurement signals should be wideband signals to enable more precise timing measurements. No other signals should be transmitted on the symbols associated with the uplink RTT Measurement signals by any UE in the neighborhood (resulting in low reuse, interference avoidance, and deep penetration of RTTM).

During the uplink sequences of subframes 706 and 708, each gNBs in the neighborhood (i.e., within communication range of the UE 102; gNBs 110 in the example of FIG. 6B) measures the arrival time Δt(i) of each uplink RTT Measurement signal relative to its own downlink sub-frame timing (assuming a synchronous deployment of the gNBs). The serving gNBs instructs the UE 102 to look for RTT Responses from the gNBs 110 on a subsequent subframe, which occurs during the downlink sequences of subframes 714 and 716. The RTT Response signal from each gNBs 110 includes the arrival times Δt(i) of the uplink RTT Measurement signal from the UE 102. The RTT Response signals should be wideband signals to enable the UE 102 to make precise timing measurements.

The UE 102, and each UE in the neighborhood (e.g., all UEs within communication range of the serving gNBs and gNBs 110), decodes the RTT Responses from the gNBs 110 during the downlink sequence of subframes 712, and also measures the arrival time ΔT(i) of the uplink signals from the gNBs 110, relative to its own (downlink) system-time.

The RTT may be computed from the arrival time of the downlink RTT Response at the UE 102, combined with timing information in the gNBs payload (downlink RTT Response), along with its own TA (provided by the serving gNBs). Any mismatch between inter-gNBs timing may be absorbed into 0.5 RTT(0); there is no requirement for precise timing synchronization across the gNBs 110.

The RTT estimation procedures disclosed herein can be extended to massive Multiple Input-Multiple Output (MIMO) and to extremely-high frequency (EHF) region of the spectrum, also known as millimeter wave (mmW) (generally, spectrum bands above 24 GHz) systems. In mmW band systems, as well as massive MIMO systems in any band, gNBs use transmission/reception beamforming to extend signal coverage to the cell edge.

"Beamforming" is a technique for focusing an RF signal in a specific direction. Traditionally, when a base station broadcasts an RF signal, it broadcasts the signal in all directions. With beamforming, the base station determines where a given target device (e.g., UE 102) is located (relative to the base station) and projects a stronger downlink RF signal in that specific direction, thereby providing a faster (in terms of data rate) and stronger RF signal for the receiving device(s). To change the directionality of the RF signal when transmitting, a base station can control the phase and relative amplitude of the RF signal at each transmitter. For example, a base station may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

The term "cell" refers to a logical communication entity used for communication with a base station (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area (e.g., a sector) over which the logical entity operates.

Figure 7:
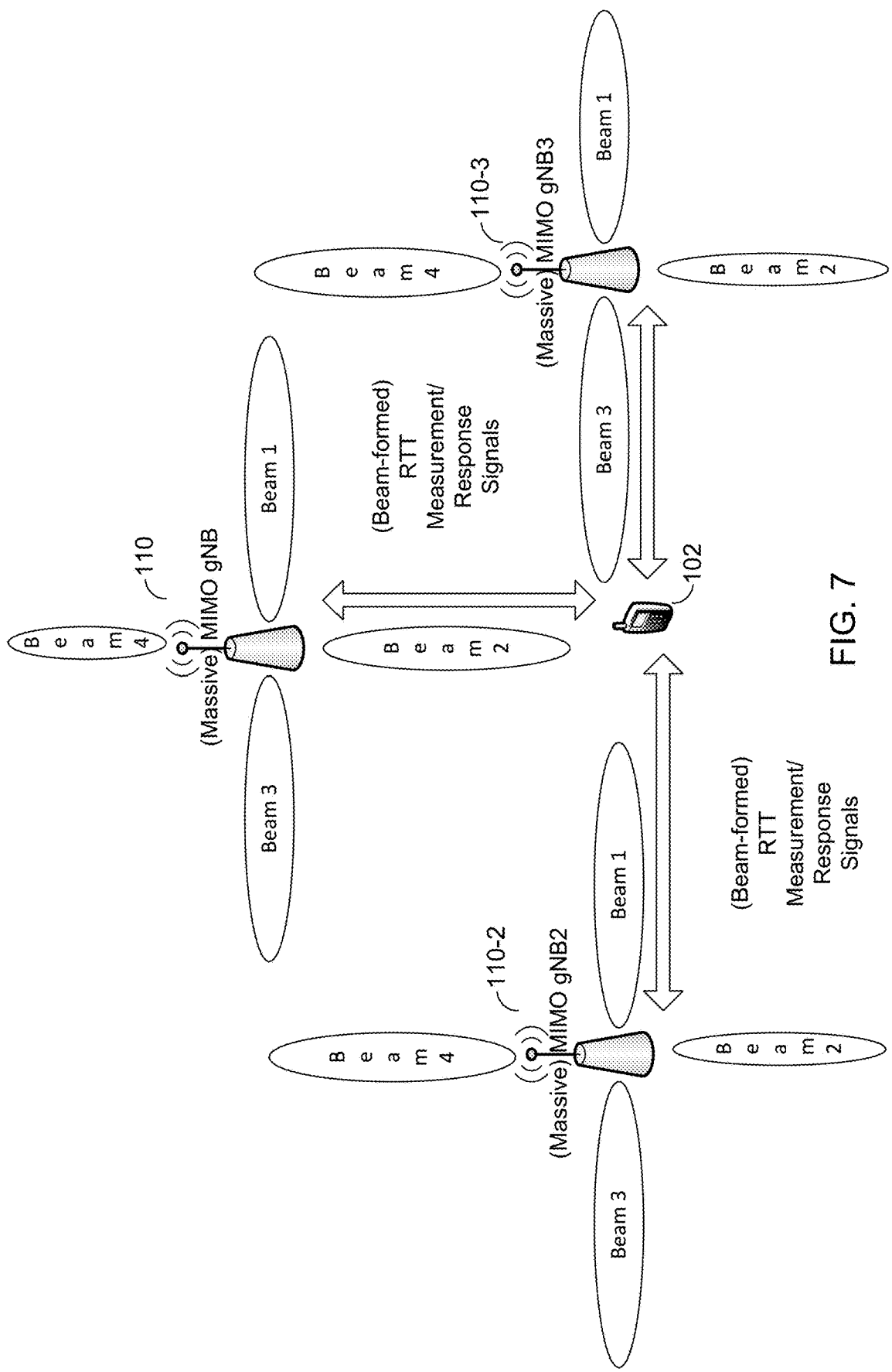
FIG. 7 illustrates an exemplary system in which the RTT estimation procedures disclosed herein are extended to massive Multiple Input-Multiple Output (MIMO) and millimeter wave (mmW) systems according to an aspect of the disclosure.

FIG. 7 illustrates an exemplary system in which the RTT estimation procedures disclosed herein are extended to massive MIMO and mmW systems according to an aspect of the disclosure. In the example of FIG. 7, gNBs 110 are massive MIMO gNBs. To perform the RTT estimation procedure described herein in massively beam-formed systems (e.g., MIMO, mmW), each physical gNB (e.g., gNBs 110) acts like a set of multiple "logical gNBs," transmitting its RTT Measurement or RTT Response signals on multiple beams (e.g., beams 1-4) on different time-frequency resources, in a TDM or FDM fashion. The RTT Measurement/Response signals may (implicitly or explicitly) carry information about the identity of the gNBs transmitting the signal, as well as the beam-index (e.g., 1-4) used to transmit them. The UE (e.g., UE 102) processes the RTT (Measurement/Response) signals received on the downlink, as if they were transmitted by different gNBs. In particular, it records or reports the beam index (or indices) on which the RTT signals were received, in addition to the timestamps (e.g., arrival times) described earlier.

During reception, the gNBs 110 record/report the beam index on which the RTT signals were received from the UE 102, and include that information in the RTT Response payload, along with the timestamps (e.g., arrival time) described earlier. In case the gNBs 110 have fewer RF chains than the number of receiver-beams it uses, the UE 102 may be commanded to repeat the RTT Measurement/ Response messages multiple times, so that the gNBs may sequentially cycle through the set of all receiver-beams that may be used to receive the RTT signals from the UE 102, based on its limited base-band processing capabilities. An RF chain may be a receiver chain or a transmitter chain, and is the hardware utilized to receive or transmit RF signals of a given frequency or set of frequencies. A device (e.g., a base station 110 or UE 102) may have multiple receiver/transmitter chains, and may thereby be able to transmit and/or receive RF signals on multiple frequencies at the same time.

In an aspect, in (massive) MIMO systems, either or both of the gNBs 110 and the UE 102 may repeat their RTT Measurement/Report signals multiple times. The different repetitions may use either the same or different transmission-beams. When a signal is repeated with the same transmission-beam, it is intended to support reception-beam-sweeping (in addition to coherent-combining if needed) at the receiving end-point (the UE 102 or a gNBs 110).

In an aspect, the angle-of-arrival/departure (at the gNBs 110) associated with the beam-index information may be used in conjunction with RTT estimates to compute the geographic position of the UE (RTT plus AOA/AOD based positioning).

Figure 8:
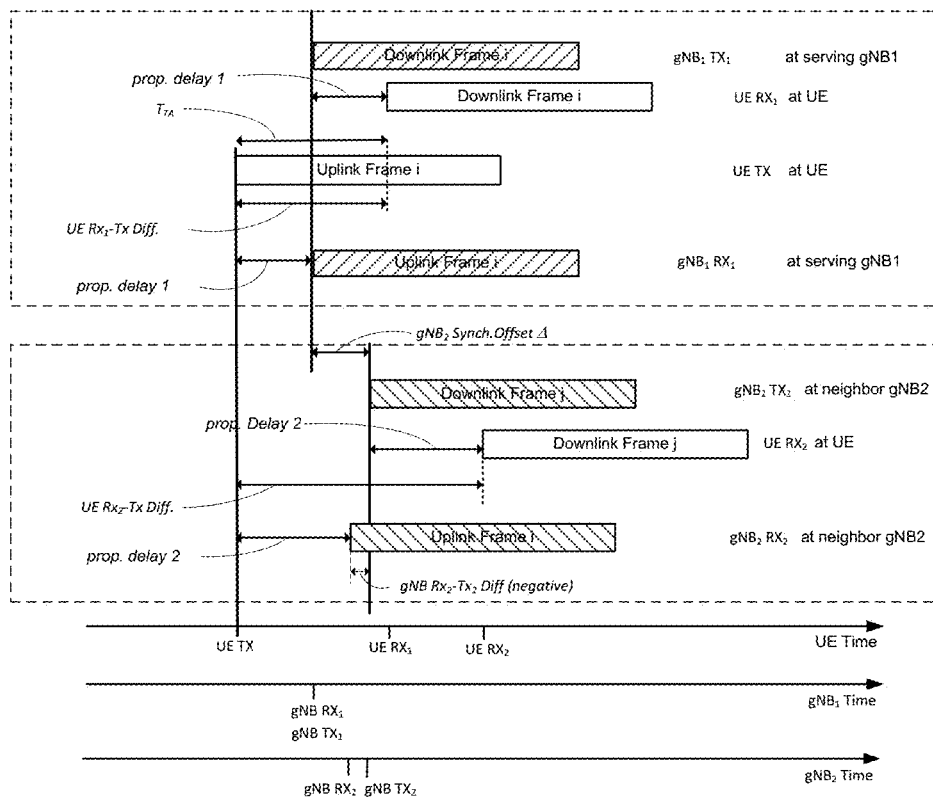
FIG. 8 illustrates an example timing diagram with two gNBs, showing the uplink-downlink timing relation for a serving gNB and the downlink timing relation for a neighbor gNB.

FIG. 8 illustrates an example timing diagram with two gNBs 110 (referred to in FIG. 8 as gNB (or gNB$_1$) and gNB$_2$ (or gNB2). The upper part of FIG. 8 shows the uplink-downlink timing relation for a serving gNB1, e.g., gNB 110-1. According to 3GPP TS 38.211, an uplink frame i for transmission from the UE starts $T_{TA}=(N_{TA}+N_{TAOffset})T_c$ before the start of the corresponding downlink frame at the UE, where $N_{TA}$ corresponds to the Timing Advance between downlink and uplink and $T_e$ is the basic time unit for NR. $N_{TAoffest}$ is a constant as defined in 3GPP TS 38.133. The $N_{TA}$ is typically determined such that the UL transmissions from the UEs in a cell are aligned. Therefore, the UE Rx-Tx Time Difference (Rx$_1$-Tx) ideally corresponds to twice the propagation delay 1 and the gNB Rx-Tx Time Difference would be zero in the example of FIG. 8. The same UE uplink frame i arrives at a neighbor gNB$_2$ the propagation delay 2 later. gNB$_2$ may have a synchronization offset Δ relative to the serving gNB$_1$ and records the TOA of the UE uplink frame i RX$_2$. The RTTs for gNB$_1$ and gNB$_2$ in this example could then be determined as:

$$RTT_1 = (UE\ Rx_1-Tx) + (gNB\ Rx_1-Tx_1) \quad \text{eq. 1}$$

$$RTT_2 = (UE\ Rx_2-Tx) + (gNB\ Rx_2-Tx_2). \quad \text{eq. 2}$$

FIG. 8 illustrates that the basic UE and gNB measurements are TOA measurements (e.g., UE RX$_1$, RX$_2$; and gNB RX$_1$, RX$_2$). Those measurements can be related to the appropriate TX time so that Rx-Tx time differences can be reported to determine RTT. FIG. 8 also illustrates that any synchronization offset Δ between gNBs does not impact the RTT calculation. It may, however, impact the TOA search window center at a neighbor gNB.

Figure 9:
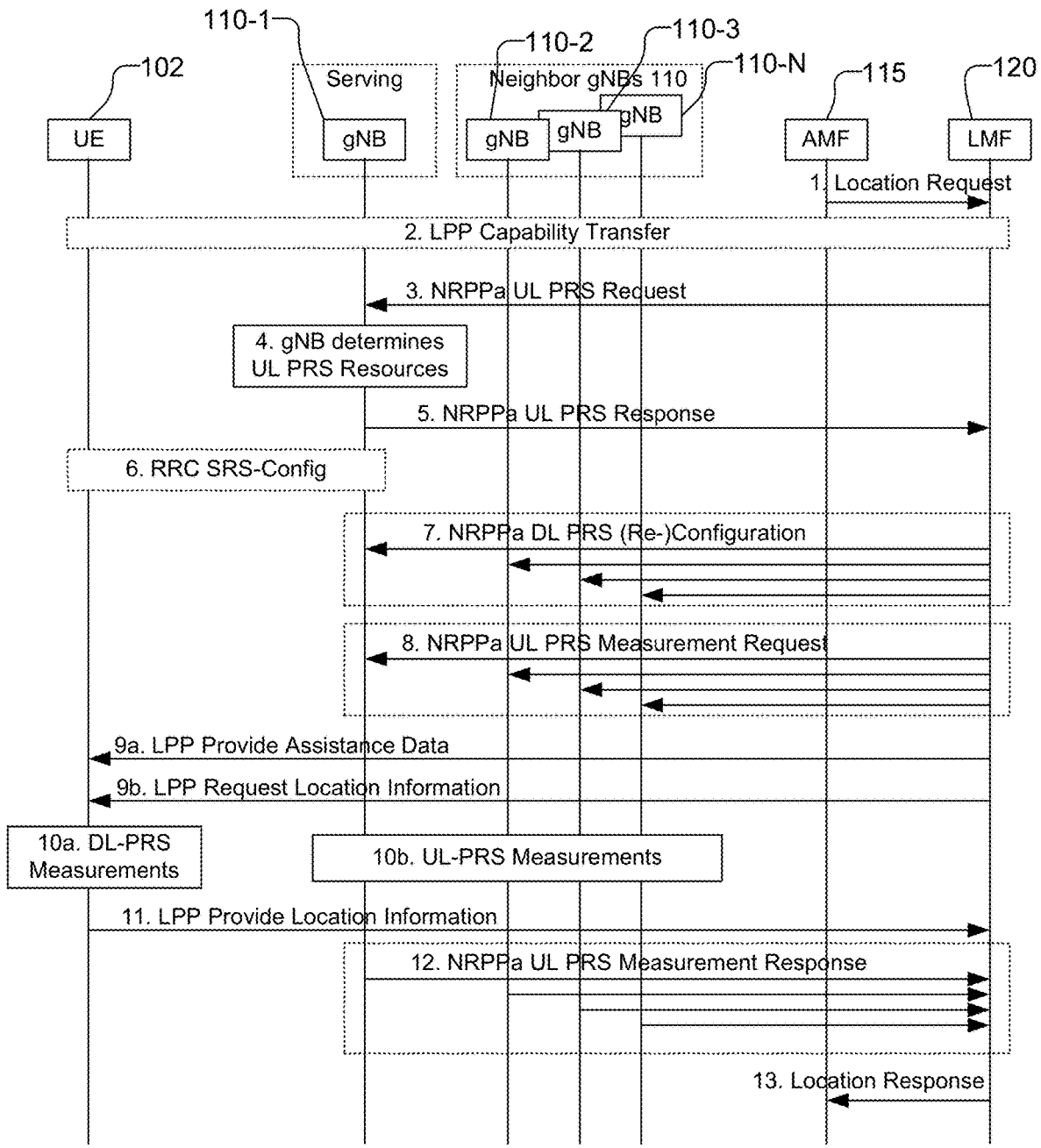
FIG. 9 illustrates uplink/downlink measurement procedures that are controlled and instigated by a Location Management Function.

FIG. 9 illustrates an uplink/downlink measurement procedure based on the positioning architectures illustrated in FIGS. 1A, 1B, and 2, where positioning procedures are controlled and instigated by the LMF 120. It should be understood that the overall procedure illustrated in FIG. 9 shows the main functionality, but not necessarily all signaling steps/possibilities. For example, a request for DL-PRS or UL-PRS measurements may have a specific response message indicating e.g. success or failure, etc. As a precondition to the procedure shown in FIG. 9, the LMF 120 knows (at least) the approximate timing of each involved gNB (e.g., SFN Initialization Time).

As illustrated, at stage 1 in FIG. 9, the AMF 115 requests the location of a target UE 102 (e.g., after AMF 115 receives a request for the location from GMLC 125, from UE 102 or after AMF 115 of an emergency call origination by UE 102).

At stage 2, the LMF 120 may request the positioning capabilities of the target UE 102 using an LPP Capability Transfer procedure.

At stage 3, the LMF 120 sends a NRPPa UL PRS Request message to the serving gNB 110-1 to request UL PRS configuration information. The request may include any desired UL PRS configuration (i.e., SRS required to fulfill the QoS); e.g. desired periodicity and time domain behavior (e.g. periodic, semi-persistent).

At stage 4, the serving gNB 110-1 determines the radio resources available for UL PRS for the UE 102 and determines UL PRS configuration information to be used for UL PRS transmission by UE 102 at stage 9b. The UL PRS configuration information may indicate the preferred or the maximum UL signaling resources (e.g. preferred or maximum transmission power, preferred or maximum bandwidth, available frequencies, preferred or minimum periodicity and/or preferred or maximum duration of transmission) available for UL PRS transmission by UE 102 at stage 9b.

At stage 5, the serving gNB 110-1 provides the UL PRS configuration information to the LMF 120 in a NRPPa UL PRS Response message. The LMF 120 may adjust the UL PRS configuration received at stage 5 (e.g. by increasing or reducing transmission power, UL PRS bandwidth, periodicity and/or duration) though may not exceed by going over or below any maximum or minimum values, respectively, indicated at stage 5.

At stage 6, the gNB 110-1 may configure the target UE 102 with the (e.g. preferred) UL PRS resources determined at stage 4. This stage may be included in stage 9 below, in which case stage 6 is not needed. Stage 6 may also be omitted for additional reasons, as discussed below.

At stage 7, the LMF 120 may determine the gNBs 110 nearby to the approximate location (e.g. as given by the serving cell for UE 102) of the target UE 102. If there are no or not sufficient DL PRS resources configured on these gNBs 110, the LMF 120 may initiate a NRPPa procedure to configure (or reconfigure) the DL-PRS transmission for the gNBs 110.

At stage 8, the LMF 120 provides the UL PRS configuration, as obtained or adjusted at stage 5, to the selected gNBs 110 in a NRPPa UL PRS Measurement Request message. The message includes all information required to enable the gNBs 110 to perform UL measurements of the UL PRS. The message may also include a start time when each gNB 110 should expect the UL transmissions from the target UE 102, and/or a search window for the UL measurements (e.g., RTOA or Rx-Tx).

At stage 9a, the LMF 120 sends a LPP Provide Assistance Data message to the target UE 102. The message includes any required assistance data for the target UE 102 to perform the necessary DL PRS measurements (e.g., cell-IDs, DL-PRS configuration, measurement search window, etc.) and, when stage 6 is not performed, any information necessary to transmit UL PRS (e.g., the UL PRS configuration obtained or adjusted at stage 5). Alternatively, and when stage 6 is not performed, the UL PRS configuration may be provided in the LPP Request Location Information message.

At stage 9b, the LMF 120 sends a LPP Request Location Information message to request DL PRS measurements as well as a request to transmit UL PRS according to the UL PRS configuration received in the assistance data at stage 9a (or included in the message at stage 9b, or provided at stage 6). The DL PRS measurements may comprise measurements of Rx-Tx for example. The target UE 102 begins the UL PRS transmission according to the time domain behavior of UL-PRS resource configuration (e.g., periodic, aperiodic, semi-persistent).

At stage 10a, the target UE 102 performs the DL-PRS measurements from all gNBs 110 provided in the assistance data at stage 9a.

At stage 10b, each gNB 110 configured at stage 8 measures the UL PRS transmissions from the target UE 102 (e.g. obtains measurements of Rx-Tx).

At stage 11, the target UE 102 reports the DL PRS measurements to the LMF 120 in a LPP Provide Location Information message. The message may also include an indication of successful completion of the UL PRS transmission.

At stage 12, each gNB 110 reports the UL PRS measurements to the LMF 120 in a NRPPa UL PRS Measurement Response message.

At stage 13, the LMF 120 determines the RTTs for each gNB 110 for which corresponding UL and DL measurements were provided at stages 11 and 12, calculates the position of the target UE 102 (e.g. as described for FIGS. 4-5B), and provides the location estimate to the AMF 115 in a Location Response message.

It can be seen that DL-only (e.g., OTDOA, AOD) or UL-only (e.g., UTDOA, AOA) positioning can be supported as subsets of the UL/DL measurement procedure shown in FIG. 9. For example, for DL-only positioning, stages 3, 4, 5, 6, 8, 10b, 12 would not be performed. For UL-only positioning, stages 7, 10a and optionally stages 9a and 11 would not be performed. Therefore, the procedure introduced in FIG. 9 above supports DL, UL, and DL+UL based NR positioning methods. Only the measurements made and/or reported would necessarily be different for the various methods, for example: for OTDOA, DL Reference Signal Time Difference (RSTD) can be measured at stage 10a; for UTDOA, UL Relative Time of Arrival (RTOA) can be measured at stage 10b; for UL-AoA, UL Angle of Arrival can be measured at stage 10b; for Multi-Cell RTT, UE Rx–Tx Time Difference can be measured at stage 10a and gNB Rx–Tx Time Difference can measured at stage 10b; for DL AOD, RSRP can be measured at stage 10a. For downlink E-CID positioning, stages 3-8 and 10b, 12 may not be needed.

While assistance data may also be different, there is a potential to share assistance data that is sent to a UE 102 (e.g. PRS configurations) for DL, UL and DL+UL position methods or that is sent to gNBs 110 (e.g. for UL PRS configuration). Such sharing of assistance data could be easier to accomplish with procedures and signaling messages (e.g. for LPP and NRPPa) which are common or overlapping for multiple position methods.

UL Sounding Reference Signals (SRS) for positioning (which may correspond to the UL-PRS referred to herein) can be configured for periodic, semi persistent, or aperiodic transmissions. For example, a periodic SRS may be transmitted with a certain configured periodicity and a certain configured slot offset within that periodicity. A semi-persistent SRS has a configured periodicity and slot offset in the same way as a periodic SRS. However, actual SRS transmission according to the configured periodicity and slot offset is activated and deactivated by means of MAC CE signaling. An aperiodic SRS may only be transmitted by a UE 102 when explicitly triggered by a serving gNB 110 at a Layer 1 level.

FIG. 9 considers the UL-PRS (SRS) configuration essentially as "assistance data" for both UE 102 and measuring gNBs 110; they determine the time/frequency/spatial information for the UE 102 to transmit and for the gNBs 110 to measure the UL-PRS. Similarly, the activation/deactivation/triggering could be equivalent to a "LPP location request".

This may support UE mobility. For example, the UE 102 could continue transmitting the configured/activated UL-PRS configuration at stage 9b in FIG. 9 during and after a handover to a new cell and/or new serving gNB 110, since this can be controlled by an LMF 120.

However, using LPP for SRS configuration and activation as described above for FIG. 9 when stage 6 is not included could result in colliding SRS configurations at the UE 102; i.e. multiple SRS resources could occur in the same symbol. E.g., a "normal" SRS usage for e.g. beamManagement may collide with the UL-PRS (e.g., conflicting pathloss reference or spatial relation). For semi-persistent or aperiodic UL-PRS, the collision should only happen when SRS is triggered to be transmitted, and not when it is just configured. However, since the serving gNB 110 can determine non-positioning specific SRS details at stage 4 in FIG. 9, the serving gNB would be aware of the UL-PRS resource sets. This may require reserving UL-PRS resources which cannot be used for other applications. However, this may be less of a concern, since the positioning SRS (UL-PRS) appears less useful for other purposes anyhow (e.g., given the pathloss reference or spatial relation) and the reuse of an existing SRS configuration/usage for positioning would still be possible with the procedure in FIG. 9 since this can be decided by the serving gNB 110-1 at stage 4 in FIG. 9. Otherwise (e.g. if collisions would happen after handover), some priority/collision handling rules could be specified.

It should be noted that a serving gNB 110-1 could be aware of the final UL-PRS configuration provided by the LMF 120 using LPP at stage 9a or 9b in FIG. 9 (e.g., by sending an UL PRS Measurement Request message to the serving gNB at stage 8 in UE-associated mode and/or including some additional information in this message). With the above approach, the serving gNB 110-1 provides the LMF 120 with SRS resources that are available for UL PRS at stage 4 in FIG. 9 and the LMF 120 determines the remaining (e.g. positioning specific) configuration parameters. The serving gNB 110-1 could then send this information to any new serving gNB 110 following handover in a handover request message to enable the new serving gNB 110 to similarly avoid potential conflicts with the UL PRS.

It is noted that in FIG. 9, the LMF 120 could control DL PRS transmission from gNBs 110 and/or from TPs 111 and/or TRPs within gNBs 110 at stage 7. Similarly, the LMF 120 could request and receive UL PRS measurements from gNBs 110 and/or from RPs 113 and/or TRPs within gNBs 110 at stages 8 and 12. Thus, in an embodiment, one or more of neighbor gNBs 110 in FIG. 9 (and serving gNB 110-1 for stages 7, 8 and 12) could each be replaced by a TP 111, an RP 113 or a TRP. In addition or instead, in some embodiments, LMF 120 in FIG. 9 may be replaced by an LMC 117, as described for FIG. 2. The same embodiments may be applicable to the signaling flows described below for FIGS. 10-15, where an LMF 120 and gNBs 110 are shown, but where replacement by an LMC 117 (for LMF 120) or by a TP 111, RP 113 or TRP (for a gNB 110) is also possible.

Alternative embodiments and additional examples, details and options for the combined UL and DL positioning procedure described above for FIG. 9 are provided below in association with FIGS. 10-15.

Figure 10:
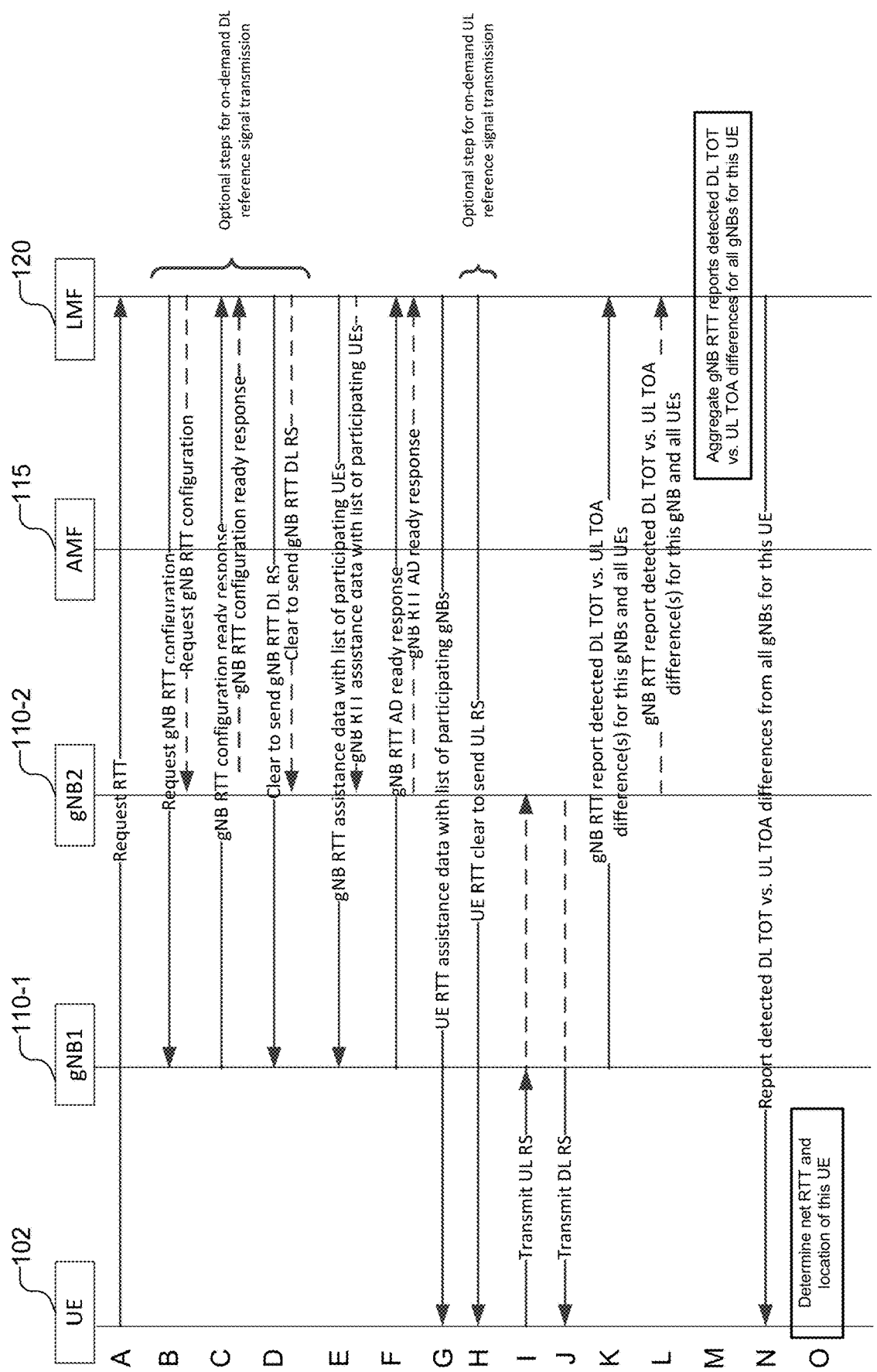
FIG. 10 illustrates a call flow of a Mobile Originated Location Request (MO-LR) for RTT measurements for a UE, where the location server is used to aggregate the measured signal data from the gNBs.

FIG. 10 illustrates a call flow of a Mobile Originated Location Request (MO-LR) for RTT measurements for a UE 102, where the location server 120 is used to aggregate the measured signal data from the gNBs 110 and send an aggregated report of the measured signal data to the UE 102. FIG. 10 illustrates, by way of example, the UE 102 initiating the RTT reference signal transmissions, where the UE 102 measures the total RTT and the gNBs 110 measure and send their respective processing delays to the location server 120. It should be understood, however, that if desired, the gNBs may initiate the RTT reference signal transmissions, where the gNBs 110 measure and send the total RTTs to the location server 120 and the UE 102 measures its processing delay Δ.

As illustrated, at stage A in FIG. 10, the UE 102 transmits a Request RTT message to the location server 120.

Stages B, C, and D are optional stages for on-demand downlink reference signal transmissions. For example, as illustrated at optional stage B, the location server 120 may send to gNBs 110 a Request for gNB RTT configuration message.

At optional stage C, the gNBs 110 may send a gNB RTT configuration ready response message to the location server 120.

At optional stage D, the location server 120 may send to gNBs 110 a Clear to send gNB RTT DL (downlink) RS (reference signal) message.

At stage E, the location server 120 may send to gNBs 110 a gNB RTT assistance data (AD) with participating UEs message. For example, there may be more than one UE for which RTT measurements are to be determined. The assistance data identifies the UEs with which the gNBs 110110 are to engage.

At stage F, the gNBs 110 send gNB RTT AD ready response message to the location server 120.

At stage G, the location server 120 sends to the UE 102 a UE RTT assistance data with list of participating gNBs message. For example, the assistance data identifies gNBs 110, as well as any other gNBs with which the UE 102 should engage for an RTT measurement. It should be understood, if there are multiple UEs, the location server 120 may send appropriate assistance data to each UE participating in the RTT determination, if there are multiple UEs.

At optional stage H, the location server 120 sends a UE RTT clear to send UL (uplink) RS message to the UE 102. Optional stage H, for example, may be performed when on-demand UL reference signal transmission.

At stage I, the UE 102 transmits an uplink RTT reference signal that is received by the gNBs 110.

At stage J, the gNBs 110 each transmit a downlink RTT reference signal, in response to the uplink RTT reference signal received in stage I, and after a processing delay Δ, e.g., between the TOA of the uplink RTT reference signal and the TOT of the downlink RTT reference signal, which is measured by the gNBs 110.

At stage K, gNBs 110-1 sends to the location server 107 a gNB RTT report of the detected DL TOT vs. UL TOA differences, i.e., the processing delay Δ, measured by gNBs 110-1 for all UEs for which RTT is being measured, including UE 102.

At stage L, gNBs 110-2 sends to the location server 107 a gNB RTT report of the detected DL TOT vs. UL TOA differences, i.e., the processing delay Δ, measured by gNBs 110-2 for all UEs for which RTT is being measured, including UE 102.

At stage M, the location server 120 aggregates the gNB RTT reports for the processing delays Δ measured by each gNBs 110 for all UEs, including UE 102.

At stage N, the location server 120 sends to the UE 102 the aggregated report of the processing delays Δ measured by each gNBs 110 for the UE 102.

At stage O, the UE 102 may determine the net RTT for each gNBs 110, e.g., using the total RTT measured by UE 102 for each gNBs 110, and the processing delays measured by each gNBs 110 received in the aggregated report received at stage N. The UE 102 may determine the location of the UE 102 using the net RTT for at least the gNBs 110 and known positions of the gNBs 110, e.g., received in the assistance data from stage G. It is understood that while FIG. 10 illustrates only two gNBs for sake of simplicity, for location determination using trilateration RTT measurements from three or more gNBs may be used.

As discussed above, if desired, the gNBs may initiate the RTT reference signal transmissions (e.g., stage J may occur before stage I), where the gNBs 110 measure and send the total RTTs to the location server 120 at stages K and L, and the UE 102 measures its processing delay Δ, which is used to determine the net RTT in stage O.

Figure 11:
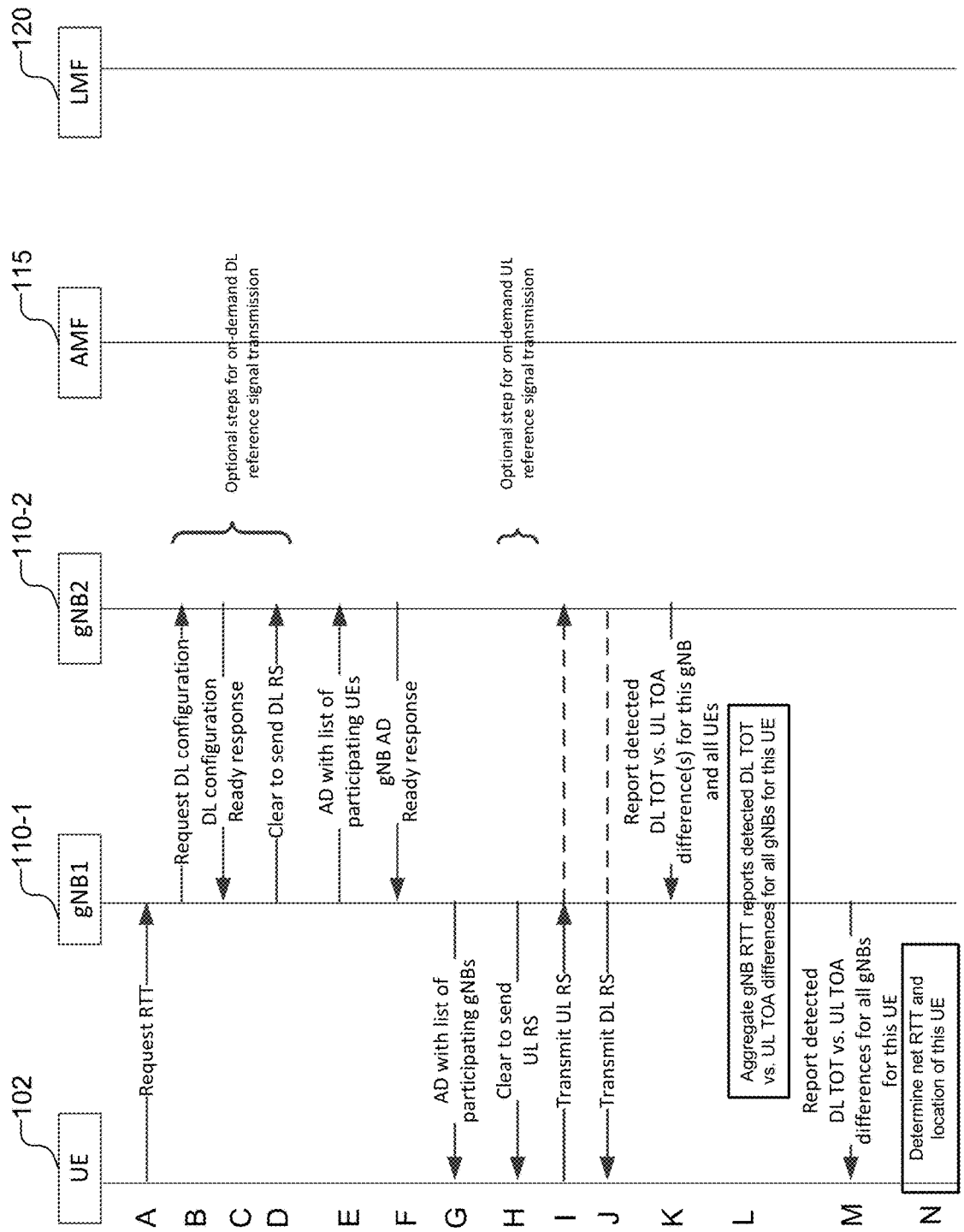
FIG. 11 illustrates a call flow of a Mobile Originated Location Request (MO-LR) for RTT measurements for a UE, where a gNBs is used to aggregate the measured signal data from the gNBs.

FIG. 11 illustrates a call flow of a Mobile Originated Location Request (MO-LR) for RTT measurements for a UE 102, where the serving gNBs 110-1 is used to aggregate the measured signal data from the gNBs 110 and send an aggregated report of the measured signal data to the UE 102. FIG. 11 illustrates, by way of example, the UE 102 initiating the RTT reference signal transmissions, where the UE 102 measures the total RTT and the gNBs 110 measure their respective processing delays Δ and gNBs 110-2 sends its processing delay Δ to serving gNBs 110-1. It should be understood, however, that if desired, the gNBs may initiate the RTT reference signal transmissions, where the gNBs 110 measure their respective total RTTs and gNBs 110-2 sends its total RTT to serving gNBs 110-1, and the UE 102 measures its processing delay Δ.

As illustrated, at stage A in FIG. 11, the UE 102 transmits a Request RTT message to the gNBs 110-1.

Stages B, C, and D are optional stages for on-demand downlink reference signal transmissions. For example, as illustrated at optional stage B, the gNBs 110-1 may send to gNBs 110-2 a Request for DL configuration message.

At optional stage C, the gNBs 110-2 may send a DL configuration ready response message to the gNBs 110-1.

At optional stage D, the gNBs 110-1 may send to gNBs 110-2 a Clear to send DL RS message.

At stage E, the gNBs 110-1 may send to gNBs 110-2 an assistance data (AD) with participating UEs message. For example, there may be more than one UE for which RTT measurements are to be determined. The assistance data identifies the UEs with which the gNBs 110 are to engage.

At stage F, the gNBs 110-1 sends a gNB AD ready response message to the gNBs 110-1.

At stage G, the gNBs 110-1 sends to the UE 102 an assistance data with list of participating gNBs message. For example, the assistance data identifies gNBs 110, as well as any other gNBs with which the UE 102 should engage for an RTT measurement. It should be understood, if there are multiple UEs, the gNBs 110-1 may send appropriate assistance data to each UE participating in the RTT determination, if there are multiple UEs.

At optional stage H, the gNBs 110-1 sends a Clear to send UL RS message to the UE 102. Optional stage H, for example, may be performed when on-demand UL reference signal transmission.

At stage I, the UE 102 transmits an uplink RTT reference signal that is received by the gNBs 110.

At stage J, the gNBs 110 each transmit a downlink RTT reference signal, in response to the uplink RTT reference signal received in stage I, and after a processing delay Δ, e.g., between the TOA of the uplink RTT reference signal and the TOT of the downlink RTT reference signal, which is measured by the gNBs 110.

At stage K, gNBs 110-2 sends to the gNBs 110-1 a gNB RTT report of the detected DL TOT vs. UL TOA differences, i.e., the processing delay Δ, measured by gNBs 110-2 for all UEs for which RTT is being measured, including UE 102.

At stage L, the gNBs 110-1 aggregates the gNB RTT reports for the processing delays Δ measured by each gNBs 110 for all UEs, including UE 102.

At stage M, the gNBs 110-1 sends to the UE 102 the aggregated report of the processing delays Δ measured by each gNBs 110 for the UE 102.

At stage N, the UE 102 may determine the net RTT for each gNBs 110, e.g., using the total RTT measured by UE 102 for each gNBs 110, and the processing delays Δ measured by each gNBs 110 received in the aggregated report received at stage N. The UE 102 may determine the location of the UE 102 using the net RTT for at least the gNBs 110 and known positions of the gNBs 110, e.g., received in the assistance data from stage G. It is understood that while FIG. 11 illustrates only two gNBs for sake of simplicity, for location determination using trilateration RTT measurements from three or more gNBs may be used.

As discussed above, if desired, the gNBs may initiate the RTT reference signal transmissions (e.g., stage J may occur before stage I), where the gNBs 110 measure and send the total RTTs to the location server 120 at stages K and L, and the UE 102 measures its processing delay Δ, which is used to determine the net RTT in stage N.

Figure 12:
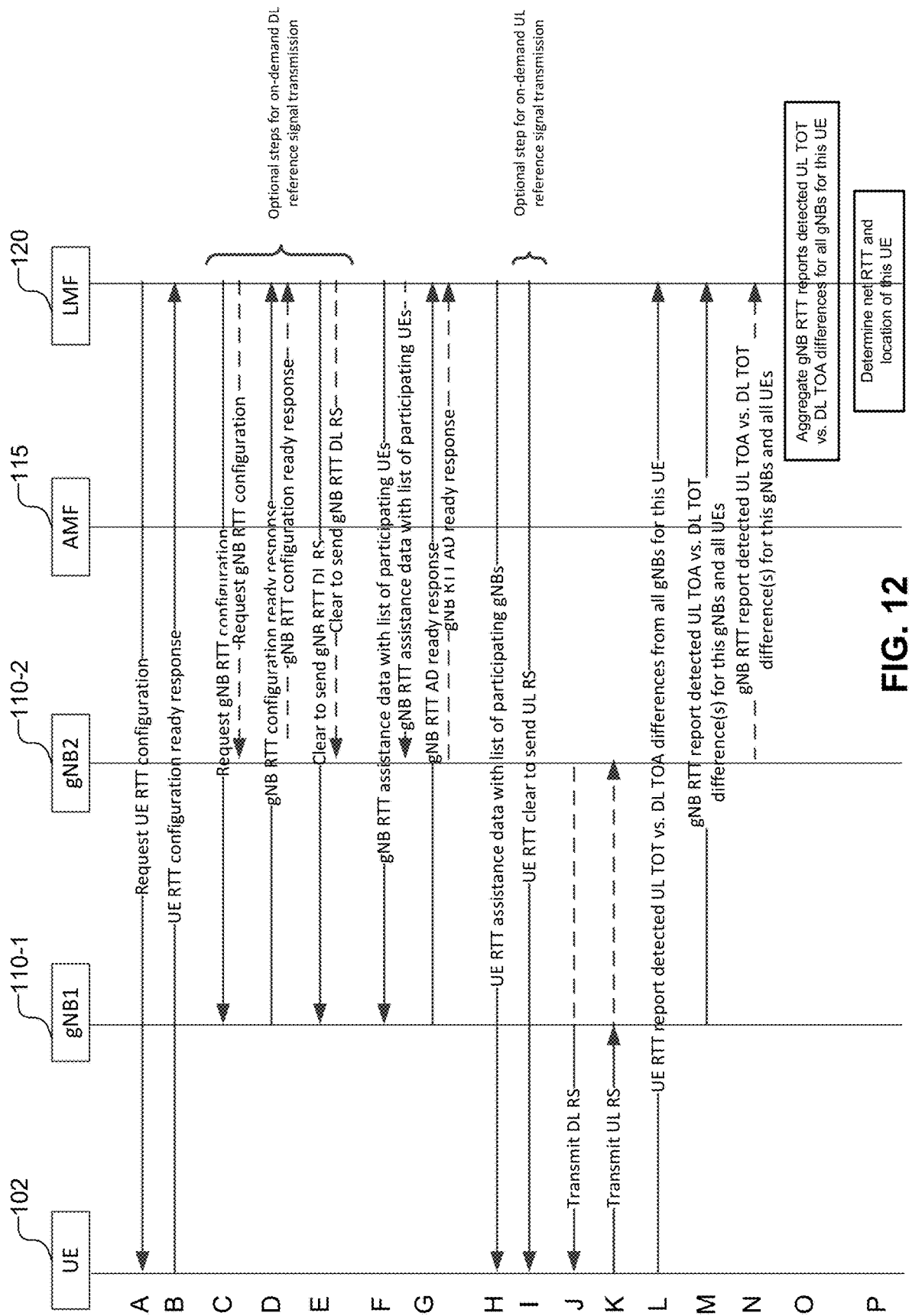
FIG. 12 illustrates a call flow of a Network Initiated Location Request (NI-LR) for RTT measurements for a UE, where the location server is used to request the RTT determination and to aggregate the measured signal data from the gNBs.

FIG. 12 illustrates a call flow of a Network Initiated Location Request (NI-LR) for RTT measurements for a UE 102, where the location server 120 is used to request the RTT determination and to aggregate the measured signal data from the gNBs 110. FIG. 12 illustrates, by way of example, the gNBs initiating the RTT reference signal transmissions, where the gNBs 110 measure and send the total RTTs to the location server 120 and the UE 102 measures and sends its processing delay Δ to the location server 120. It should be understood, however, that if desired, the UE 102 may initiate the RTT reference signal transmissions, where the UE 102 measures and sends the total RTT to the location server 120 and the gNBs 110 measure and send their respective processing delays Δ to the location server 120.

As illustrated, at stage A in FIG. 12, the location server 120 sends a Request UE RTT configuration message to the UE 102.

At stage B, the UE 102 sends a UE RTT configuration ready response message to the location server 120.

Stages C, D, and E are optional stages for on-demand downlink reference signal transmissions. For example, as illustrated at optional stage C, the location server 120 may send to gNBs 110 a Request for gNB RTT configuration message.

At optional stage D, the gNBs 110 may send a gNB RTT configuration ready response message to the location server 120.

At optional stage E, the location server 120 may send to gNBs 110 a Clear to send gNB RTT DL RS message.

At stage F, the location server 120 may send to gNBs 110 a gNB RTT assistance data (AD) with participating UEs message. For example, there may be more than one UE for which RTT measurements are to be determined. The assistance data identifies the UEs with which the gNBs 110 are to engage.

At stage G, the gNBs 110 send gNB RTT AD ready response message to the location server 120.

At stage H, the location server 120 sends to the UE 102 a UE RTT assistance data with list of participating gNBs message. For example, the assistance data identifies gNBs 110, as well as any other gNBs with which the UE 102 should engage for an RTT measurement. It should be understood, if there are multiple UEs, the location server 120 may send appropriate assistance data to each UE participating in the RTT determination, if there are multiple UEs.

At optional stage I, the location server 120 sends a UE RTT clear to send UL (uplink) RS message to the UE 102. Optional stage I, for example, may be performed when on-demand UL reference signal transmission.

At stage J, the gNBs 110 each transmit a downlink RTT reference signal to the UE 102.

At stage K, the UE 102 transmit uplink RTT reference signals to the gNBs 110, in response to the downlink RTT reference signals received in stage J, and after a processing delay Δ, e.g., between the TOA of the downlink RTT reference signal and the TOT of the uplink RTT reference signal, which is measured by the UE 102.

At stage L, the UE 102 sends a RTT report of the detected UL TOT vs. DL TOA differences, i.e., the processing delays Δ, for each gNBs 110 for the UE.

At stage M, gNBs 110-1 sends to the location server 107 a gNB RTT report of the detected UL TOT vs DL TOA differences, i.e., the total RTT, measured by gNBs 110-1 for all UEs for which RTT is being measured, including UE 102.

At stage N, gNBs 110-2 sends to the location server 107 a gNB RTT report of the detected UL TOT vs DL TOA differences, i.e., the total RTT, measured by gNBs 110-2 for all UEs for which RTT is being measured, including UE 102.

At stage O, the location server 120 aggregates the gNB RTT reports for the total RTTs measured by each gNBs 110 and the processing delays Δ for all UEs, including UE 102.

At stage P, the location server 120 may determine the net RTT for each gNBs 110, e.g., using the processing delays Δ measured by UE 102 for each gNBs 110, and the total RTT measured by each gNBs 110 from the aggregated report of stage O. The location server 120 may determine the location of the UE 102 using the net RTT for at least the gNBs 110 and known positions of the gNBs 110. It is understood that while FIG. 12 illustrates only two gNBs for sake of simplicity, for location determination using trilateration RTT measurements from three or more gNBs may be used.

As discussed above, if desired, the UE 102 may initiate the RTT reference signal transmissions (e.g., stage K may occur before stage J), where the gNBs 110 measure and send their processing delays Δ to the location server 120 at stages M and N, and the UE 102 measures the total RTTs, which is used to determine the net RTTs in stage P.

Figure 13:
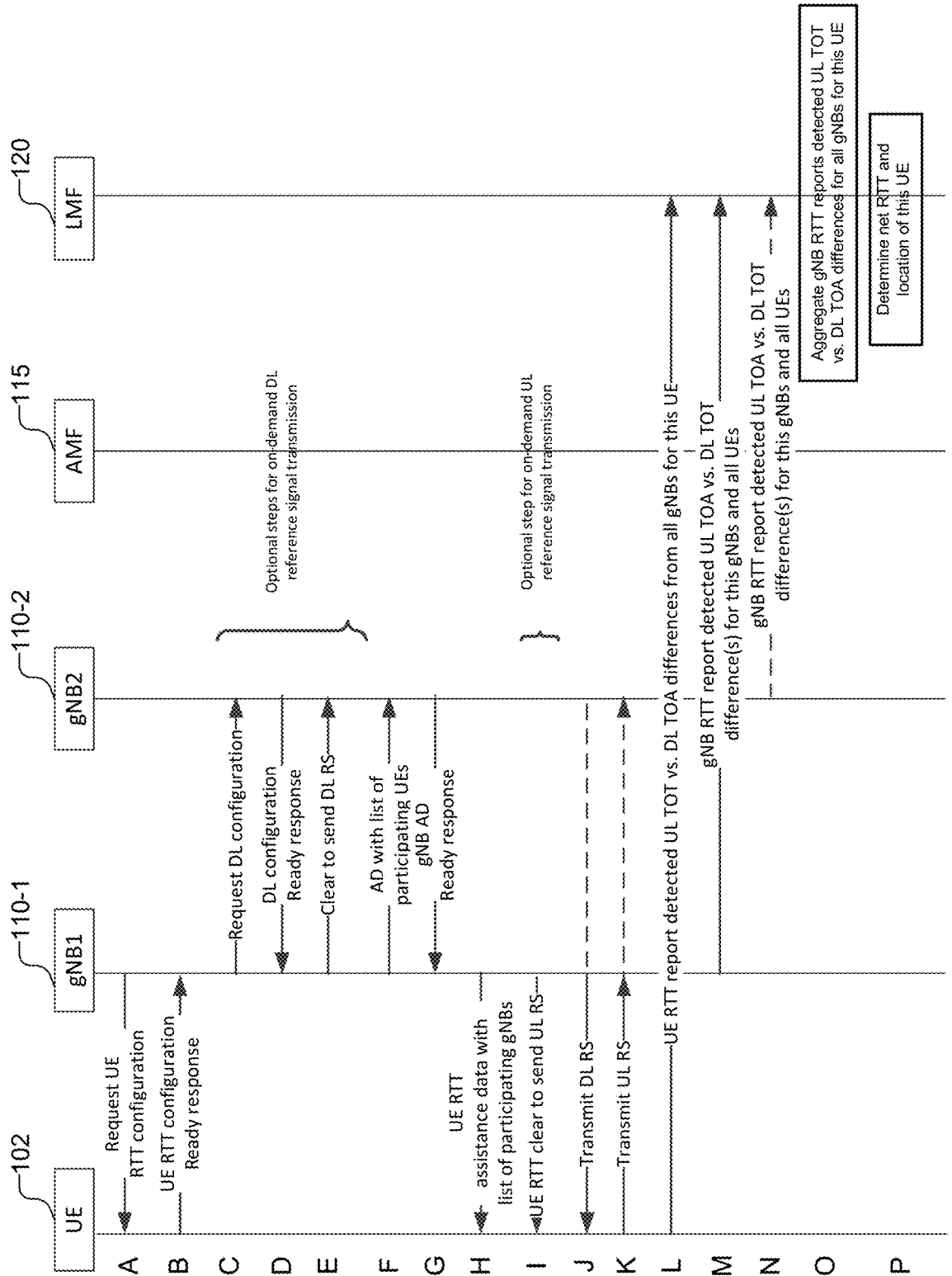
FIG. 13 illustrates a call flow of a Network Initiated Location Request (NI-LR) for RTT measurements for a UE, where the serving gNBs is used to request the RTT determination and the location server is used to aggregate the measured signal data from the gNBs.

FIG. 13 illustrates a call flow of a Network Initiated Location Request (NI-LR) for RTT measurements for a UE 102, where the serving gNBs 110-1 is used to request the RTT determination and the location server 120 is used to aggregate the measured signal data from the gNBs 110. Advantageously, by using the serving gNBs 110-1, as illustrated in FIG. 13, the end-to-end response time may be less than the implementation illustrated in FIG. 12 because there are fewer hops among the network entities. FIG. 13 illustrates, by way of example, the gNBs initiating the RTT reference signal transmissions, where the gNBs 110 measure and send the total RTTs to the location server 120 and the UE 102 measures and sends its processing delay Δ to the location server 120. It should be understood, however, that if desired, the UE 102 may initiate the RTT reference signal transmissions, where the UE 102 measures and sends the total RTT to the location server 120 and the gNBs 110 measure and send their respective processing delays Δ to the location server 120.

As illustrated, at stage A in FIG. 13, the gNBs 110-1 sends a Request UE RTT configuration message to the UE 102.

At stage B, the UE 102 sends a UE RTT configuration ready response message to the gNBs 110-1.

Stages C, D, and E are optional stages for on-demand downlink reference signal transmissions. For example, as illustrated at optional stage C, the gNBs 110-1 may send to gNBs 110-2 a Request DL configuration message.

At optional stage D, the gNBs 110-2 may send a DL configuration ready response message to the gNBs 110-1.

At optional stage E, the gNBs 110-1 may send to gNBs 110-2 a Clear to send DL RS message.

At stage F, the gNBs 110-1 may send to gNBs 110-2 a assistance data (AD) with participating UEs message. For example, there may be more than one UE for which RTT measurements are to be determined. The assistance data identifies the UEs with which the gNBs 110 are to engage.

At stage G, the gNBs 110-2 send gNB RTT AD ready response message to the gNBs 110-1.

At stage H, the gNBs 110-1 sends to the UE 102 a UE RTT assistance data with list of participating gNBs message. For example, the assistance data identifies gNBs 110, as well as any other gNBs with which the UE 102 should engage for an RTT measurement. It should be understood, if there are multiple UEs, the gNBs 110-1 may send appropriate assistance data to each UE participating in the RTT determination, if there are multiple UEs.

At optional stage I, the gNBs 110-1 sends a UE RTT clear to send UL (uplink) RS message to the UE 102. Optional stage I, for example, may be performed when on-demand UL reference signal transmission.

At stage J, the gNBs 110 each transmit a downlink RTT reference signal to the UE 102.

At stage K, the UE 102 transmit uplink RTT reference signals to the gNBs 110, in response to the downlink RTT reference signals received in stage J, and after a processing delay $\Delta$, e.g., between the TOA of the downlink RTT reference signal and the TOT of the uplink RTT reference signal, which is measured by the UE 102.

At stage L, the UE 102 sends a RTT report of the detected UL TOT vs. DL TOA differences, i.e., the processing delays $\Delta$, for each gNBs 110 for the UE.

At stage M, gNBs 110-1 sends to the location server 107 a gNB RTT report of the detected UL TOT vs DL TOA differences, i.e., the total RTT, measured by gNBs 110-1 for all UEs for which RTT is being measured, including UE 102.

At stage N, gNBs 110-2 sends to the location server 107 a gNB RTT report of the detected UL TOT vs DL TOA differences, i.e., the total RTT, measured by gNBs 110-2 for all UEs for which RTT is being measured, including UE 102.

At stage O, the location server 120 aggregates the gNB RTT reports for the total RTTs measured by each gNBs 110 and the processing delays $\Delta$ for all UEs, including UE 102.

At stage P, the location server 120 may determine the net RTT for each gNBs 110, e.g., using the processing delays $\Delta$ measured by UE 102 for each gNBs 110, and the total RTT measured by each gNBs 110 from the aggregated report of stage O. The location server 120 may determine the location of the UE 102 using the net RTT for at least the gNBs 110 and known positions of the gNBs 110. It is understood that while FIG. 12 illustrates only two gNBs for sake of simplicity, for location determination using trilateration RTT measurements from three or more gNBs may be used.

As discussed above, if desired, the UE 102 may initiate the RTT reference signal transmissions (e.g., stage K may occur before stage J), where the gNBs 110 measure and send their processing delays $\Delta$ to the location server 120 at stages M and N, and the UE 102 measures the total RTTs, which is used to determine the net RTTs in stage P.

The radio access technology (RAT) dependent position solution that are possible include downlink (DL) based solutions; downlink (DL) and uplink (UL) based solutions; and uplink (UL) based solutions.

An example of a DL based solution may be OTDOA positioning; an example of an UL based solution may be UTDOA. Round-Trip-Time (RTT) positioning is an example of a combined DL and UL based solution.

An NG-RAN positioning procedure may be applicable for DL based positioning methods, UL based positioning methods, and DL and UL based positioning methods, e.g., RTT based solutions. This procedure can be considered as a general case, where downlink-based (e.g., OTDOA) and uplink-based (e.g., UTDOA) could be supported as special cases of the proposed procedure.

OTDOA and UTDOA positioning methods are based on time-of-arrival (TOA) measurements performed on downlink signals or uplink signals, respectively. Although these methods have been shown to be effective, they require precise base station time synchronization, which is difficult to install and maintain. Round-Trip-Time (RTT) positioning uses two-way time-of-arrival measurements and requires in principle no time synchronization between base stations. However, a coarse base station time synchronization is desired in order to reduce interference and increase hearability from multiple transmission points. This time synchronization requirement is similar to the TDD synchronization requirements (e.g., micro-seconds level synchronization instead of nano-seconds as in case of OTDOA/UTDOA).

The principle of obtaining distance information from two-way time-of-arrival measurements (UL and DL measurements) is illustrated, e.g., in FIGS. 5A and 5B. Precise timing (TOA) measurements are required, similar to OTDOA/UTDOA location. RTT ranging measurements also rely on being able to compensate for any delays that the responding device may add in receiving and transmitting a signal. However, multiple responding devices (e.g., base stations) do not need to be precisely synchronized as in e.g., OTDOA/UTDOA location. The position of a device can then be determined based on distance (RTT) measurements to multiple base stations, e.g., as illustrated in FIG. 4.

The following positioning procedures may use, for example, the NG-RAN positioning architecture illustrated in FIG. 2. In particular, the positioning procedures may use a Location Management Component (LMC) 117 included in the gNBs 110. This allows the coordination of RTT measurements at a serving gNB 110-1 (e.g., configure DL-/UL-PRS and instruct neighbor gNBs performing the UL measurements, which would reduce latency and avoids knowledge of radio related parameter/information at the LMF in the core network).

It should be noted that the term UL-/DL positioning reference signal (PRS) is used herein. However, these may not necessarily be new NR reference signals; the "positioning signals" may also reuse existing NR signals and/or configurations, such as Synchronization Signal Blocks (SSB), Channel State Information Reference Signals (CSI-RS), Sounding Reference Signals (SRS), etc. The "positioning signals" may also be the same or similar to the RTT Measurement and Response Signals)

The "initiating device" for the positioning procedures may be the UE or the network. Therefore, network initiated, and UE initiated procedures are proposed below.

Figure 14:
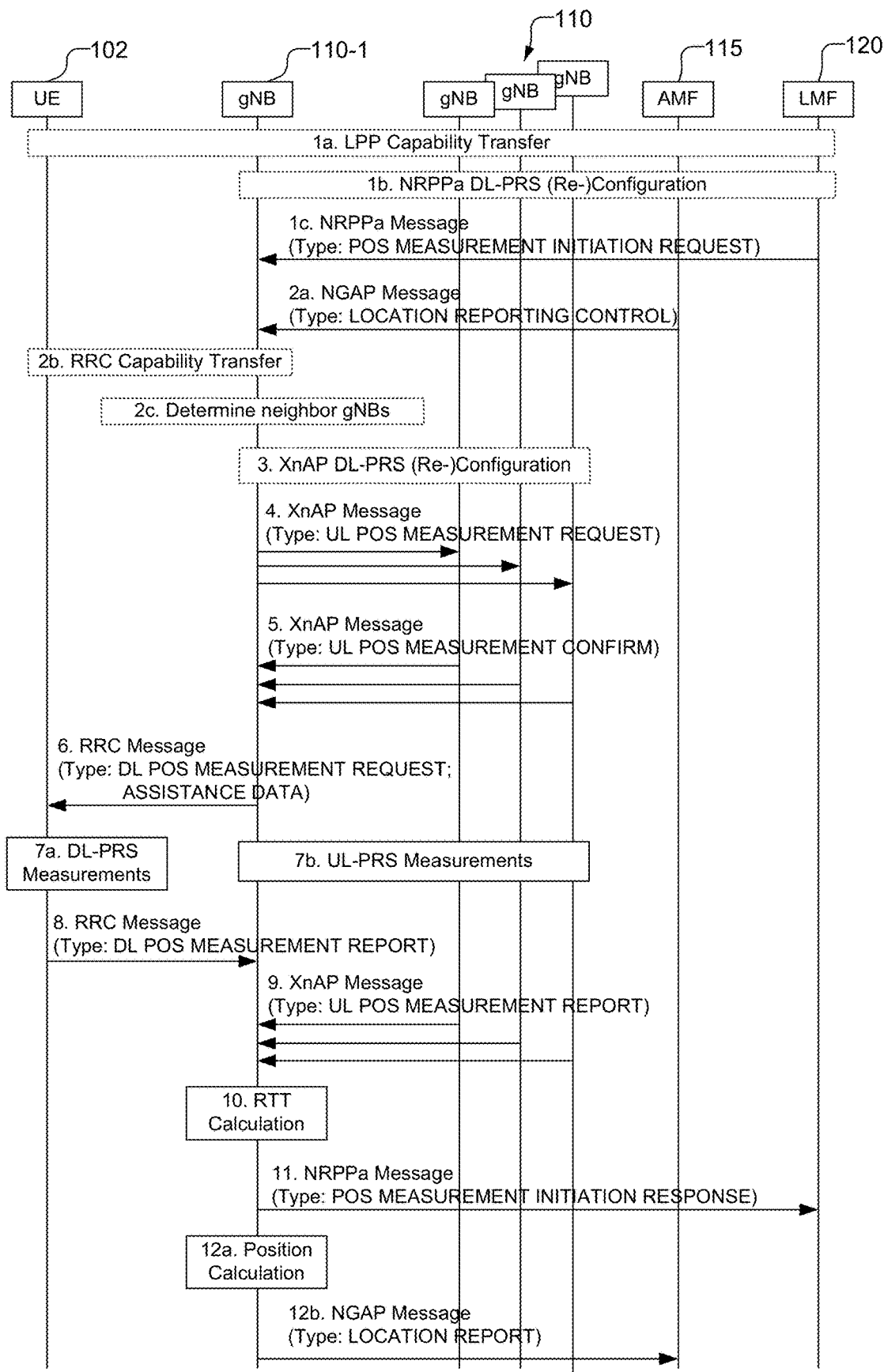
FIG. 14 illustrates a call flow of a network-centric UL/DL measurement procedure for a UE.

FIG. 14 illustrates a call flow of a network-centric UL/DL (RTT) measurement procedure for a UE 102. It should be understood that while the procedure is described as determining RTT measurements, in some implementations, DL measurements may be used for OTDOA, Angle of Arrival (AOA) or Angle of Departure (AOD), and/or UL measurements may be used for UTDOA or AOA.

The LMF 120 or AMF 115 may initiate the measurement procedure (e.g. after receiving a location request for UE 102 (also referred to here as a target device 102) from another entity). For example, where the LMF 120 initiates the measurement procedure, as illustrated, at stage 1*a* in FIG. 14, the LMF 120 may request the positioning capabilities of the target device 102 using the LPP Capability Transfer procedure or other appropriate positioning protocol.

At stage 1*b*, the LMF 120 may determine the gNBs nearby the approximate location of the target device 102 (e.g., as indicated by a serving cell for target device 102). If there are no or not sufficient DL PRS resources configured on these gNBs, the LMF may initiate a NRPPa procedure to configure (or reconfigure) the DL-PRS on the gNBs.

At stage 1*c*, the LMF 120 sends a NRPPa POS MEASUREMENT INITIATION REQUEST message to the serving gNB 110-1. The request includes an indication that RTT UL/DL measurements are requested for UE 102. It should be noted that the NRPPa message may be, e.g., the NRPPa E-CID MEASUREMENT INITIATION REQUEST message, or a different type of message may be used.

Where the AMF 115 initiates the measurement procedure, stages 1*a*, 1*b*, and 1*c* may be skipped. As illustrated, at stage 2*a*, the AMF 115 sends a LOCATION REPORTING CONTROL message to the serving gNB 110-1 to request the location of UE 102. The message may include, in addition to other parameters, the desired QoS and supported GAD shapes. The gNB 110-1, e.g., the LMC 117 in the gNB 110-1, decides to instigate the RTT method based on received QoS and UE/RAN supported positioning methods.

At stage 2*b* (e.g. which may occur when stages 1*a*-1*c* occur or when stage 2*a* occurs), if the target device 102 positioning capabilities are not known to the gNB 110-1, the gNB 110-1 may request the positioning capabilities of the target device 102 using the RRC UE Capability Transfer procedure. The LPP capability parameters, for example, may be copied or imported into RRC (generally, LPP parameter/messages may be defined as OCTET STRINGs in RRC). However, LPP capabilities supported at an RRC level could be distinct from capabilities supported at an LPP level (e.g. a target device 102 might provide support using LPP but not using RRC, or vice versa).

At stage 2*c*, the serving gNB 110-1 determines a set (or plurality) of neighboring gNBs 110 which can be used to transmit a DL PRS to be measured by UE 102 and/or can measure an UL PRS or other signal transmitted by UE 102.

At stage 3, if stage 1*b* is not performed and if there are no or not sufficient DL-PRS resources configured on the serving and neighboring gNBs (or the serving gNB is unaware of the DL-PRS configuration of neighbor gNBs), the serving gNB 110-1 initiates a XnAP DL-PRS Reconfiguration procedure to reconfigure (e.g. increase) DL PRS transmission from one or more of the neighboring gNBs determined at stage 2*c*. If a neighbor gNB 110 is not able to configure the requested DL-PRS, it may provide a list of possible alternative configurations in the response. The serving gNB 110-1 may then repeat the procedure with a different configuration request.

At stage 4, the serving gNB 110-1 decides on the desired UL-PRS configuration (e.g., SRS transmissions) and provides the UL PRS configuration to the neighbor gNBs 110 which were determined at stage 2*c* in a XnAP UL POS MEASUREMENT REQUEST message. The message may include all information required to enable the gNBs to perform the UL measurements. The message may also include a start time when the gNBs should expect the UL transmissions from the target device, and a search window for the UL (e.g., TOA) measurements.

At stage 5, if the neighbor gNBs 110 are able to accept the UL positioning measurement request in stage 4, the gNBs 110 respond with a XnAP UL POS MEASUREMENT CONFIRM message.

At stage 6, the serving gNB 110-1 sends a RRC DL POS MEASUREMENT REQUEST message to the target device 102. The message may include any required assistance data for the target device 102 to perform the necessary DL-PRS measurements (e.g., cell-IDs, DL-PRS configuration, measurement search window, etc.). The message may also include a request to start the UL-PRS transmission (e.g., SRS transmission) and provides the UL-PRS configuration parameter (possibly including a transmission start time and/or transmission duration).

At stage 7*a*, the target device 102 performs the DL-PRS measurements from all gNBs 110 provided in the assistance data at stage 6. The measurement may be a TOA measurement or a UE Rx–Tx Time Difference Measurement.

At stage 7*b*, each gNB configured at stages 4/5 measures the UL-PRS transmissions from the target device. The measurement may be a TOA measurement or a gNB Rx–Tx Time Difference Measurement.

At stage 8, the target device 102 reports the DL-PRS measurements to the serving gNB 110-1 in a RRC DL POS MEASUREMENT REPORT message.

At stage 9, each gNB 110 reports the UL-PRS measurements to the serving gNB 110-1 in a XnAP UL POS MEASUREMENT REPORT message.

At stage 10, the gNB 110-1, e.g., the LMC 117 in the gNB 110-1, calculates the RTTs for each gNB for which corresponding uplink (UL) and downlink (DL) measurements were provided at stages 8 and 9. Different types RTT calculations may be used. For example, the RTT could be based on a combination of gNB Rx–Tx Time Difference's and UE Rx–Tx Time Difference's (such as Tadv Type 1 in LTE), or may be based on a combination of TOA measurements, similar as used for the WLAN Fine Time Measurement procedure.

At stage 11, if stage 1*c* was performed, the serving gNB 110-1 sends a NRPPa POS MEASUREMENT INITIATION RESPONSE message to the LMF 120 containing the RTT measurements or containing the UL and DL PRS measurements. The NRPPa message may be, e.g., a NRPPa E-CID MEASUREMENT INITIATION RESPONSE message, or may be a different message.

At stage 12, if stage 2*a* was performed the serving gNB 110-1 calculates the target device 102 position at stage 12*a* using the RTT measurements from stage 10, and sends the location estimate in a NGAP LOCATION REPORT message to the AMF 115 at stage 12*b*.

An additional option, e.g., for the LMF 120 at stage 11, includes the serving gNB 110-1 providing one or both of the DL and UL measurements to the LMF 120 and an OTDOA, UTDOA or RTT calculation (stage 10) is performed at the LMF 120. Another option is that the gNB 110-1, e.g., the LMC 117 in the gNB 110-1, computes the location (stage 12*a*) and provides the location estimate to the LMF 120; i.e., stage 11 is performed after stage 12*a*. This may reduce the calculation load at the LMF 120.

Thus, it can be seen in FIG. 14 that OTDOA or UTDOA positioning can be supported as special cases of the UL/DL RTT procedure. For example, for OTDOA positioning, stages 4, 5, 7*b*, 9, 10 would not be performed. For UTDOA positioning: stages 1*b*/3, 7*a*, 8, 10 would not be performed.

Therefore, the NRPPa, XnAP and RRC messages introduced in FIG. 14 support DL, UL, and DL+UL based NR positioning methods.

Figure 15:
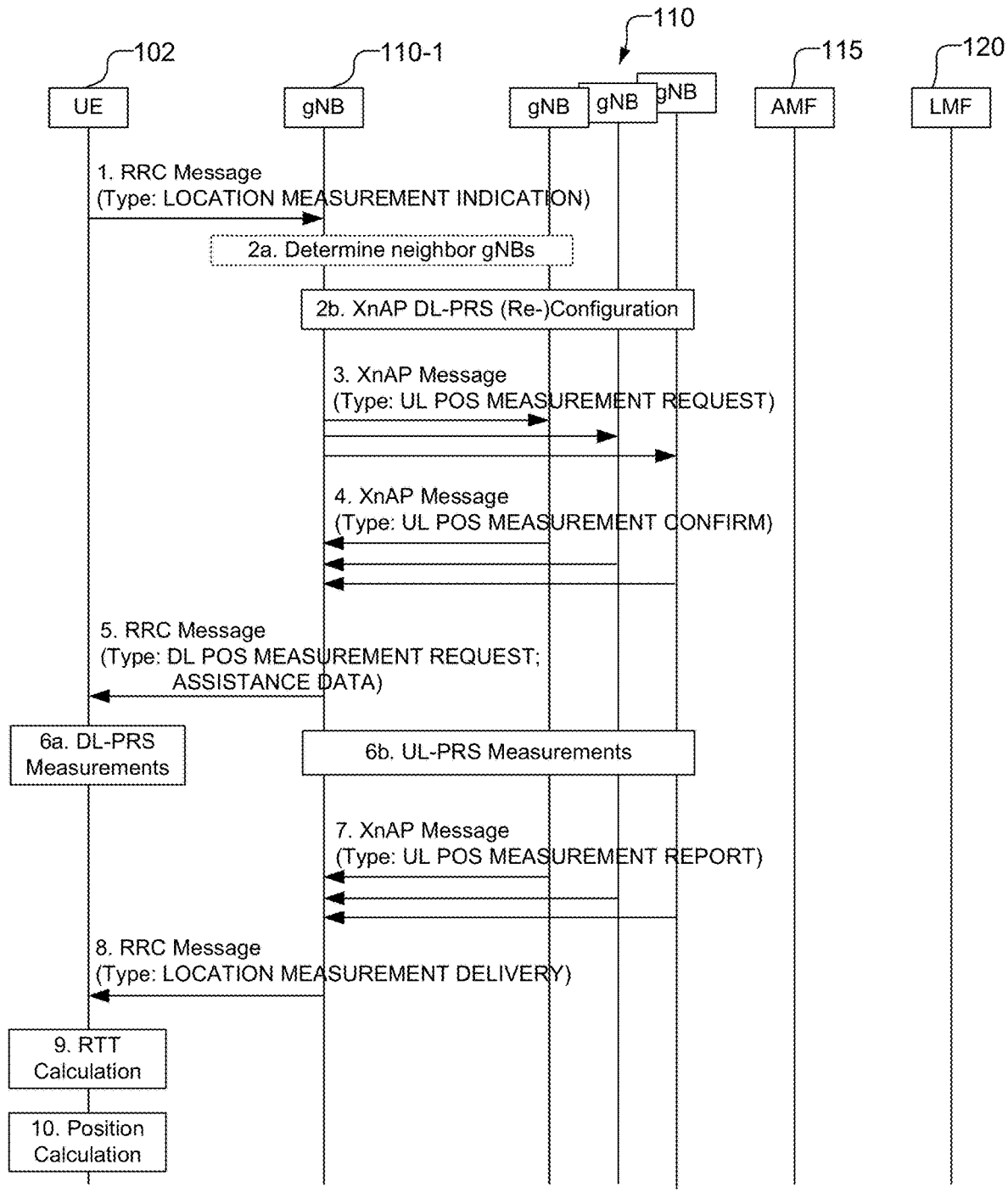
FIG. 15 illustrates a call flow of a UE-centric UL/DL measurement procedure for a UE.

FIG. 15 illustrates a call flow of a UE-centric UL/DL RTT measurement procedure for the UE 102. It should be understood that while the procedure is described as determining RTT measurements, in some implementations, DL measurements may be used for OTDOA or UL measurements may be used for UTDOA.

At stage 1 in FIG. 15, the target device 102 sends a RRC LOCATION MEASUREMENT INDICATION message to the serving gNB to request RTT measurements. The in 3GPP Release-15 existing Location Measurement Indication procedure may be reused for this purpose by adding an additional entry in the LocationMeasurementInfo CHOICE for RTT measurements. The UE 102 may start the timer $T_{pos}$. The UE stops $T_{pos}$ when the RRC message at stage 5 has been received. When the timer $T_{pos}$ expires (i.e., no RRC Message at stage 5 has been received), the UE 102 assumes the request cannot be granted.

At stage 2a, the serving gNB 110-1 determines a set (or plurality) of neighboring gNBs 110 which can be used to transmit a DL PRS to be measured by UE 102 and/or can measure an UL PRS or other signal transmitted by UE 102.

At stage 2b, the serving gNB 110-1 initiates a XnAP DL-PRS Reconfiguration procedure. If a neighbor gNB 110 is not able to configure the requested DL-PRS, it may provide a list of possible alternative configurations in the response. The serving gNB 110-1 may then repeat the procedure with a different configuration request.

At stage 3, the serving gNB 110-1 decides on the desired UL-PRS configuration (e.g., SRS transmissions) and provides the UL PRS configuration to the neighbor gNBs 110 in a XnAP UL POS MEASUREMENT REQUEST message. The message may include all information required to enable the gNBs to perform the UL measurements. The message may also include a start time when the gNBs should expect the UL transmissions from the target device, and a search window for the UL (e.g., TOA) measurements.

At stage 4, if the neighbor gNBs 110 are able to accept the UL positioning measurement request in stage 4, the gNBs 110 respond with a XnAP UL POS MEASUREMENT CONFIRM message.

At stage 5, the serving gNB 110-1 sends a RRC DL POS MEASUREMENT REQUEST message to the target device 102. The message may include any required assistance data for the target device 102 to perform the necessary DL-PRS measurements (e.g., cell-IDs, DL-PRS configuration, measurement search window, etc.). The message may also include a request to start the UL-PRS transmission (e.g., SRS transmission) and provides the UL-PRS configuration parameter (possibly including a transmission start time).

At stage 6a, the target device 102 performs the DL-PRS measurements from all gNBs 110 provided in the assistance data at stage 6. The measurement may be a TOA measurement or a UE Rx–Tx Time Difference Measurement.

At stage 6b, each gNB configured at stages 3/4 measures the UL-PRS transmissions from the target device. The measurement may be a TOA measurement or a gNB Rx–Tx Time Difference Measurement.

At stage 7, each gNB 110 reports the UL-PRS measurements to the serving gNB 110-1 in a XnAP UL POS MEASUREMENT REPORT message.

At stage 8, the serving gNB 110-1 forwards the UL-PRS measurements to the target device 102 in a RRC LOCATION MEASUREMENT DELIVERY message. The RRC messages (e.g., stages 5, 8) may just include an OCTET STRING container with parameters defined in LPP (assuming LPP is continued being used for NR positioning).

At stage 9, the UE 102 calculates the RTTs for each gNB for which measurements were provided at stages 8 and 6a.

At stage 10, the UE 102 calculates its location using the RTT measurements from stage 9 (possibly together with other measurements, e.g., from RAT-independent methods, such as GNSS, using the assistance data (gNB location, etc.) provided in stage 5 or available from broadcast messages.

Similar to the network centric UL/DL RTT measurement procedure in FIG. 14, the UE-centric OTDOA or UTDOA positioning can be supported as special cases of the RTT procedure in FIG. 15. For example, for OTDOA positioning, stages 3, 4, 6b, 7, 8, 9 would not be performed. For UTDOA positioning, stages 2, 6a, 9 would not be performed. Therefore, a UE-based UTDOA could be supported with this procedure as well, e.g., to allow hybridization of various positioning measurements at the target device.

Additionally, if desired, a UE centric UL/DL (RTT) measurement procedure may be supported using the normal MO-LR procedures. For example, the UE 102 may provide an MO-LR Request to the AMF 115 or LMF 120, and the procedure illustrated in FIG. 14 may be performed. The MO-LR result may then be provided to the UE 102 by the AMF 115 or LMF 120.

Figure 16:
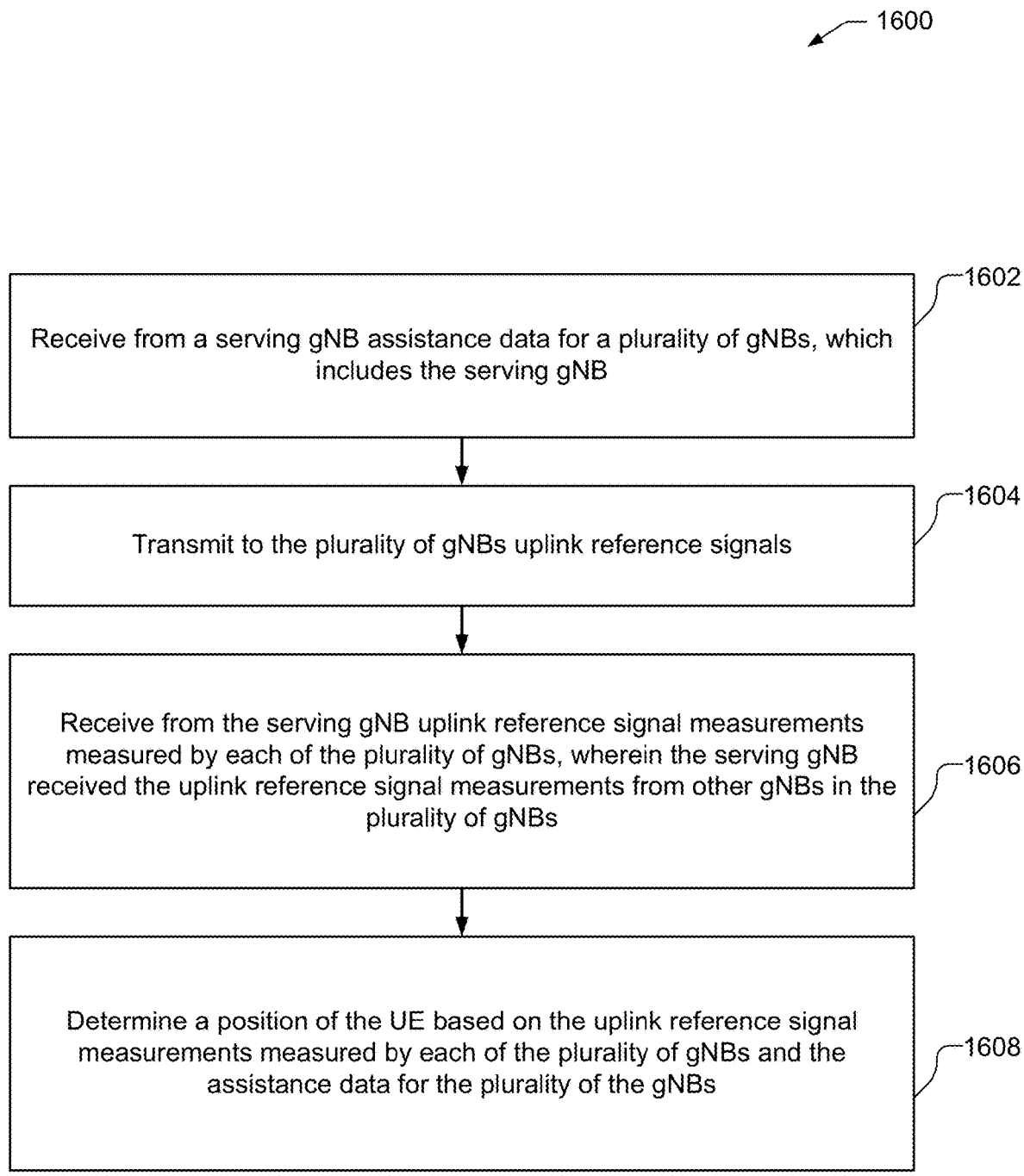
FIG. 16 illustrates an exemplary method for determining a position of a UE performed by a UE according to an aspect of the disclosure.

FIG. 16 illustrates an exemplary method 1600 for determining a position of a user equipment (UE) (e.g., UE 102) performed by the UE 102. The method 1600 may be performed by, for example, the communication system 100 illustrated in FIGS. 1B and 2 employing one or more of the call flows described herein, such as FIG. 15 or any of FIGS. 9-14.

At 1602, the UE receives from a serving gNB, such as gNBs 110-1, assistance data for a plurality of gNBs, which includes the serving gNBs, as illustrated at stage 5 in FIG. 15.

At 1604, the UE transmits to the plurality of gNBs uplink reference signals, e.g., as illustrated at stage 6B in FIG. 15.

At 1606, the UE receives from the serving gNBs uplink reference signal measurements measured by each of the plurality of gNBs, wherein the serving gNBs received the uplink reference signal measurements from other gNBs in the plurality of gNBs, as illustrated at stage 8 in FIG. 15.

At 1608, the UE determines a position of the UE based on the uplink reference signal measurements measured by each of the plurality of gNBs and the assistance data for the plurality of the gNBs, as illustrated at stages 9 and 10 in FIG. 15. For example, the UE may determine the position using Uplink Time Difference of Arrival (UTDOA).

In one aspect, the method may further include the UE obtains downlink reference signals measurements for downlink reference signals received from the plurality of gNBs, e.g., as illustrated at stage 6A in FIG. 15. The position of the UE may then be determined further based on the downlink reference signals measurements for the downlink reference signals received from the plurality of gNBs, as illustrated at stages 9 and 10 in FIG. 15. For example, the position may be determined based on one or more of UTDOA, OTDOA, AOD, AOA or RTT. Additionally, in one aspect, determining the position of the UE may include the UE determining a round trip time (RTT) for each gNBs in the plurality of gNBs using the uplink reference signal measurements measured by each of the plurality of gNBs and the downlink reference signals measurements for the downlink reference signals received from the plurality of gNBs, as illustrated at stage 9 in FIG. 15; and performing multilateration with the RTT for each gNBs and a location of each gNBs received in the assistance data, as illustrated at stage 10 in FIG. 15.

In one aspect, the method may further include the UE transmitting to the serving gNBs a request for location, where the serving gNBs generates and transmits to the UE the assistance data for the plurality of gNBs in response to the request for location, as illustrated at stages 1 and 2-5 in FIG. 15.

In a variant of the method 1600, the UE may receive the assistance data at 1602 and receive the UL reference signal measurements at 1606 from an LMF (e.g. LMF 120) or an LMC (e.g. LMC 117) instead of from the serving gNB, where the LMF or the LMC, respectively, receives the UL reference signal measurements from all gNBs in the plurality of gNBs.

Figure 17:
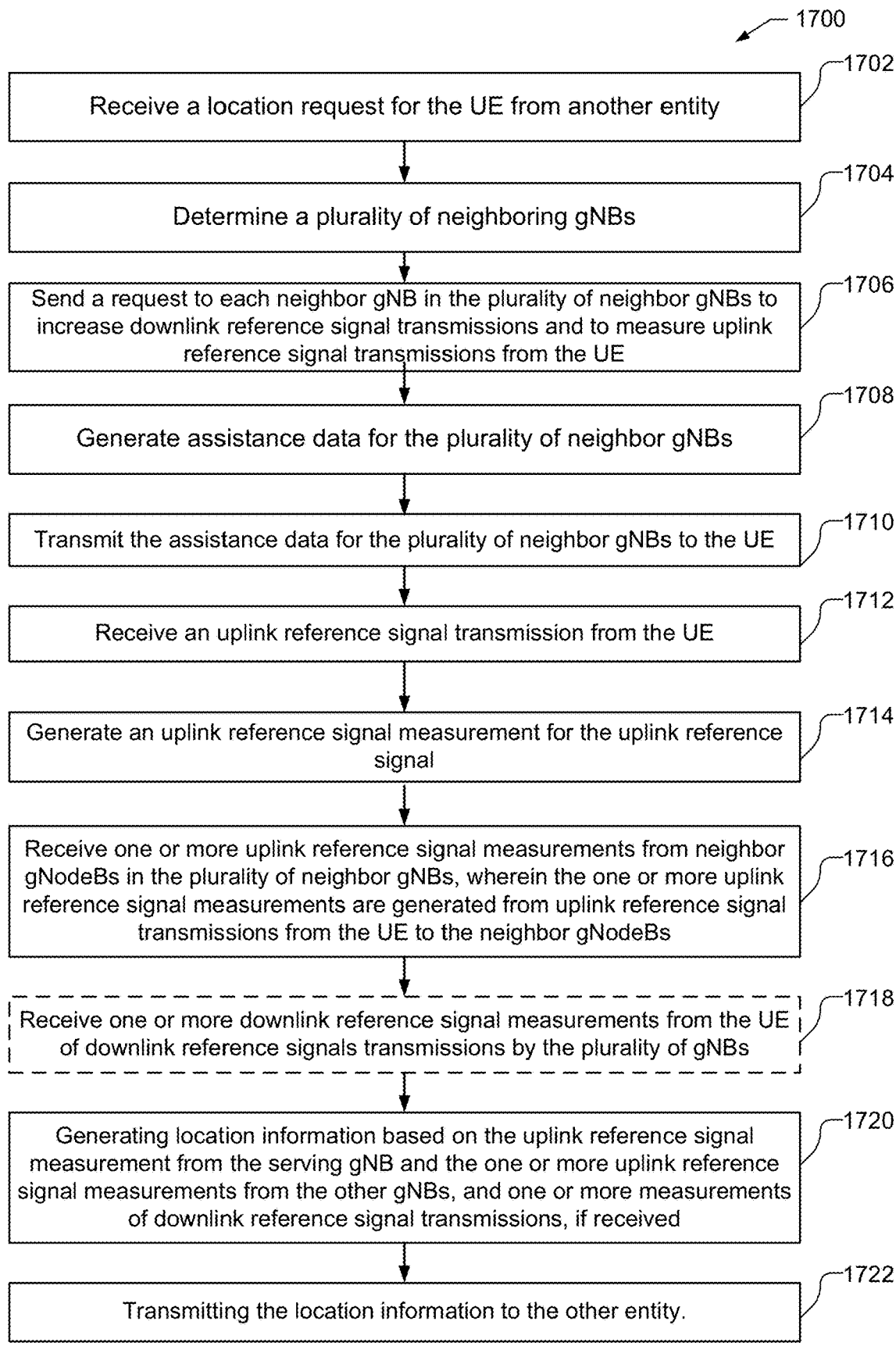
FIG. 17 illustrates an exemplary method for determining a position of a UE performed by a gNBs according to an aspect of the disclosure.

FIG. 17 illustrates an exemplary method 1700 for determining a position of a user equipment (UE) (e.g., UE 102) performed by a serving gNB (e.g., gNBs 110-1) for the UE. The method 1700 may be performed by, for example, the communication system 100 illustrated in FIGS. 1B and 2 employing one or more of the call flows described herein, such as FIGS. 14 and 15.

At 1702, the serving gNBs receives a location request for the UE from another entity, e.g., as illustrated at stage 1c and 2a in FIG. 14 and stage 1 in FIG. 15. The other entity may be the UE, a serving AMF for the UE (e.g. AMF 115) or an LMF (e.g. LMF 120).

At 1704, and in response to the request at 1702, the serving gNBs determines a plurality of neighboring gNBs (e.g. gNBs from which the UE may be able measure a downlink reference signal transmission and which may be able to measure an uplink reference signal transmission by the UE), e.g., as illustrated at stage 2c in FIG. 14 and stage 2a in FIG. 15.

At 1706, the serving gNBs sends a request to each neighbor gNB in the plurality of neighbor gNBs to increase downlink reference signal transmissions and to measure uplink reference signal transmissions (e.g. an UL PRS) from the UE. The serving gNBs may provide a start time and a duration for the uplink reference signal transmissions as well as configuration parameters for the uplink reference signal transmissions (e.g. frequency, bandwidth and coding), e.g., as illustrated at stage 3 and 4 in FIG. 14 and stages 2b and 3 in FIG. 15.

At 1708, the serving gNBs generates assistance data for the plurality of neighbor gNBs, e.g., as illustrated at stages 6 and 5 in FIGS. 14 and 15, respectively. The assistance data may include configuration parameters for a DL PRS transmitted by each gNB in the plurality and possibly an identity of each gNB.

At 1710, the serving gNBs transmits the assistance data for the plurality of neighbor gNBs in a message (e.g. an RRC message) to the UE, e.g., as illustrated at stages 6 and 5 in FIGS. 14 and 15, respectively. The serving gNBs may also include in the message a request for the UE to transmit an UL reference signal (e.g. an UL PRS signal) and may include a start time and a duration for this transmission as well as configuration parameters for the signal (e.g. frequency, bandwidth and coding).

At 1712, the serving gNBs receives the uplink reference signal transmission from the UE, e.g., as illustrated at stages 7b and 6b in FIGS. 14 and 15, respectively.

At 1714, the serving gNBs generates (e.g. obtains) an uplink reference signal measurement for the uplink reference signal transmission, e.g., as illustrated at stages 7b and 6b in FIGS. 14 and 15, respectively.

At 1716, the serving gNBs receives one or more uplink reference signal measurements from each neighbor gNBs in the plurality of neighbor gNBs, wherein the one or more uplink reference signal measurements are generated uplink reference signal transmissions from the UE to the neighbor gNBs, e.g., as illustrated at stages 9 and 7 in FIGS. 14 and 15, respectively.

At 1718, which is optional as indicated by the dotted lines, the serving gNB may receive one or more downlink reference signal measurements from the UE of downlink reference signals transmissions by the plurality of gNBs, e.g., as illustrated at stage 8 in FIG. 14.

At 1720, the serving gNBs generates location information (e.g. a location of the UE in the network-centric UL/DL (RTT) measurement procedure of FIG. 14 or UL-PRS measurements from the serving gNBs and the other gNBs in the UE centric UL/DL RTT measurement procedure of FIG. 15) based on the uplink reference signal measurement from the serving gNBs, the one or more uplink reference signal measurements from the other gNBs, and the downlink reference signal measurements if received from the UE at optional block 1718, e.g., as illustrated at stages 10 or 12a in FIG. 14 and stage 8 in FIG. 15.

At 1722, the serving gNBs transmits the location information to the other entity, e.g., as illustrated at stages 11 or 12b in FIG. 14 and stage 8 in FIG. 15.

In one aspect, the location information may be a location measurement message that includes the uplink reference signal measurement from the serving gNBs and the one or more uplink reference signal measurements from the neighbor gNBs, and the location measurement message, for example, may be is transmitted to the UE for determination of the position of the UE, e.g., as illustrated at stage 8 in FIG. 15. In one aspect, the determination of the position of the UE is performed by the UE using Uplink Time Difference of Arrival (UTDOA). The method may further include transmitting downlink reference signals to be measured by the UE, as illustrated at stage 6a in FIG. 15. The determination of the position of the UE may be performed by the UE using round trip time (RTT) for signals determined using the uplink reference signal measurements and downlink reference signals measurements measured by the UE from the downlink reference signals, e.g., as illustrated at stages 9 and 10 of FIG. 15. In one aspect, the other entity is the UE and the assistance data is generated and transmitted to the UE in response to the location request, e.g., as illustrated at stage 1 and 5 in FIG. 15.

In one aspect, the location information may be a location measurement message that includes the uplink reference signal measurement from the serving gNBs and the one or more uplink reference signal measurements from the neighbor gNBs, and wherein the location measurement message is transmitted to a network entity, such as AMF 115 or LMF 120, e.g., as illustrated at stage 11 in FIG. 14. The method may further include the serving gNBs transmitting downlink reference signals to be measured by the UE, e.g., as illustrated at stage 7a in FIG. 14, and receiving downlink reference signals measurements measured by the UE from downlink reference signals received by the UE, as illustrated at stage 8 in FIG. 14. The location measurement message, for example, may include the downlink reference signals measurements measured by the UE, e.g., as illustrated at stage 11 in FIG. 14.

In one aspect, generating the location information may include determining a position of the UE by the serving gNBs based on the uplink reference signal measurements measured by each of the plurality of neighbor gNBs, e.g., illustrated at 12a in FIG. 14. The method may further include the serving gNBs transmitting downlink reference signals to be measured by the UE, e.g., as illustrated at stage 7a in FIG. 14, and receiving from the UE downlink reference signals measurements measured by the UE from downlink reference signals received by the UE, as illustrated at stage 8 in FIG. 14. Determining the position of the UE, may be based on the downlink reference signals measurements measured by the UE. For example, determining the position of the UE may include determining a round trip time (RTT) for each gNBs using the uplink reference signal measurements measured by each gNBs and the downlink reference signals measurements measured by the UE, as illustrated at stage 10 in FIG. 14, and performing multilateration with the RTT for each gNBs and a known location of each gNBs, as illustrated at stage 12a in FIG. 14.

In one aspect, the serving gNBs may transmit downlink reference signals to be measured by the UE, as illustrated at stage 7a in FIG. 14, and receive downlink reference signals measurements measured by the UE from downlink reference signals received by the UE, as illustrated at stage 8 in FIG. 14. Generating location information may be comprise determining a round trip time (RTT) for each gNBs using the uplink reference signal measurements measured by each gNBs and the downlink reference signals measurements measured by the UE, e.g., as illustrated at block 10 in FIG. 14.

In a variant of the method 1700, an LMF (e.g. LMF 120) or an LMC (e.g. LMC 117) may perform one or more of the actions described above for the serving gNB at 1702, 1704, 1706, 1708, 1710, 1716 1718, 1720 and/or 1722 (e.g. as described for FIG. 9). In the same or another variant of the method 1700, an RP (e.g. RP 113) or a TRP may perform the actions described above for the serving gNB at 1712 and 1714.

Figure 18:
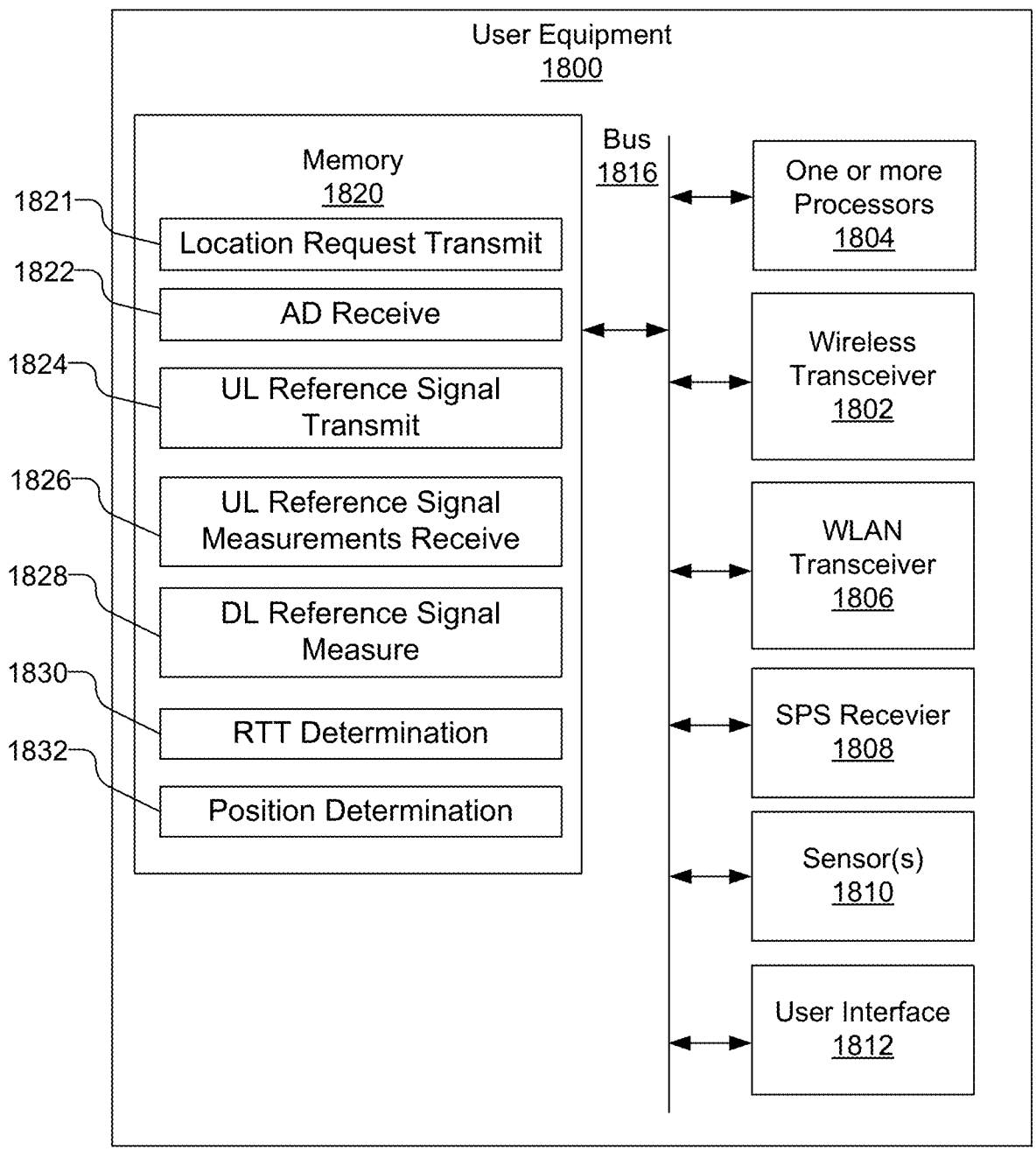
FIGS. 18 and 19 are simplified block diagrams of several sample aspects of apparatuses configured to support positioning and communication as taught herein.

FIG. 18 is a diagram illustrating an example of a hardware implementation of UE 1800, such as UE 102 shown in FIGS. 1A-4 and 8-15. The UE 1800 may include includes, e.g., hardware components such as a wireless transceiver 1802 to wirelessly communicate with an NG-RAN 135, e.g., base stations such as gNB 110 or ng-eNB 114 (shown in FIGS. 1B-2). The UE 1800 may also include additional transceivers, such a wireless local area network (WLAN) transceiver 1806, as well as an SPS receiver 1808 for receiving and measuring signals from SPS SVs 190 (shown in FIG. 1B). The UE 1800 may further include one or more sensors 1810, such as cameras, accelerometers, gyroscopes, electronic compass, magnetometer, barometer, etc. The UE 1800 may further include a user interface 1812 that may include e.g., a display, a keypad or other input device, such as virtual keypad on the display, through which a user may interface with the UE 1800. The UE 1800 further includes one or more processors 1804 and memory 1820, which may be coupled together with bus 1816. The one or more processors 1804 and other components of the UE 1800 may similarly be coupled together with bus 1816, a separate bus, or may be directly connected together or coupled using a combination of the foregoing. The memory 1820 may contain executable code or software instructions that when executed by the one or more processors 1804 cause the one or more processors to operate as a special purpose computer programmed to perform the methods and procedures disclosed herein (e.g. such as the process flow 1600 shown in FIG. 16).

As illustrated in FIG. 18, the memory 1820 may include one or more components or modules that may be implemented by the one or more processors 1804 to perform the methodologies described herein. While the components or modules are illustrated as software in memory 1820 that is executable by the one or more processors 1804, it should be understood that the components or modules may be firmware or dedicated hardware either in the one or more processors 1804 or off the processors.

As illustrated, the memory 1820 may include a location request transmit module 1821 that when implemented by the one or more processors 1804 configures the one or more processors 1804 to transmit a location request via the wireless transceiver 1802, e.g., as discussed in FIG. 16. An assistance data receive module 1822 when implemented by the one or more processors 1804 configures the one or more processors 1804 to receive from a serving gNBs via the wireless transceiver 1802 and process assistance data for a plurality of gNBs, e.g., as discussed at block 1602 in FIG. 16. An uplink reference signal transmit module 1824 when implemented by the one or more processors 1804 configures the one or more processors 1804 to transmit, via the wireless transceiver 1802, uplink reference signals to the plurality of gNBs, e.g., as discussed at block 1604 in FIG. 16. An uplink reference signal measurements receive module 1826 when implemented by the one or more processors 1804 configures the one or more processors 1804 to receive from the serving gNBs, via the wireless transceiver 1802, uplink reference signal measurements measured by the plurality of gNBs, e.g., as discussed at block 1606 in FIG. 16. A downlink reference signal measure module 1828 when implemented by the one or more processors 1804 configures the one or more processors 1804 to receive via the wireless transceiver 1802 and to measure downlink reference signals transmitted by the plurality of gNBs, e.g., as discussed in FIG. 16. A Round Trip Time (RTT) determination module 1830 when implemented by the one or more processors 1804 configures the one or more processors 1804 to determine the RTT for signals between the UE 1800 and each gNBs in the plurality of gNBs using the received uplink reference signal measurements and the measured downlink reference signal measurements, e.g., as discussed in FIG. 16. A position determination module 1832 when implemented by the one or more processors 1804 configures the one or more processors 1804 to determine a position of the UE 1800 using the determined RTT and positions of the gNBs provided in the assistance data, or using Uplink Time Difference of Arrival (UTDOA), e.g., if downlink reference signal measurements are not made, e.g., as discussed at block 1608 in FIG. 16.

The methodologies described herein may be implemented by various means depending upon the application. For example, these methodologies may be implemented in hardware, firmware, software, or any combination thereof. For a hardware implementation, the one or more processors 1804 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1800 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1820) and executed by one or more processors 1804, causing the one or more processors 1804 to operate as a special purpose computer programmed to perform the techniques disclosed herein. Memory may be implemented within the one or processors 1804 or external to the one or more processors 1804. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1800 may be stored as one or more instructions or code on a non-transitory computer-readable storage medium such as memory 1820. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1800 may be provided as signals on transmission media included in a communication apparatus. For example, a communication apparatus comprising part or all of UE 1800 may include a transceiver having signals indicative of instructions and data. The instructions and data are stored on non-transitory computer readable media, e.g., memory 1820, and are configured to cause the one or more processors 1804 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE, such as UE 1800, capable of determining a position of the UE, may include a means for receiving from a serving gNBs assistance data for a plurality of gNBs, which includes the serving gNBs, which may be, e.g., the wireless transceiver 1802 and one or more processors 1804 with dedicated hardware or implementing executable code or software instructions in memory 1820, such as the AD receive module 1822. A means for transmitting to the plurality of gNBs uplink reference signals may be, e.g., the wireless transceiver 1802 and one or more processors 1804 with dedicated hardware or implementing executable code or software instructions in memory 1820, such as the uplink reference signal transmit module 1824. A means for receiving from the serving gNBs uplink reference signal measurements measured by each of the plurality of gNBs, wherein the serving gNBs received the uplink reference signal measurements from other gNBs in the plurality of gNBs may be, e.g., the wireless transceiver 1802 and one or more processors 1804 with dedicated hardware or implementing executable code or software instructions in memory 1820, such as the uplink reference signal measurements receive module 1826. A means for determining the position of the UE based on the uplink reference signal measurements measured by each of the plurality of gNBs and the assistance data for the plurality of the gNBs may be, e.g., the one or more processors 1804 with dedicated hardware or implementing executable code or software instructions in memory 1820, such as the position determination module 1832.

In one aspect, the UE 1800 may further include a means for generating downlink reference signals measurements for downlink reference signals received from the plurality of gNBs, wherein determining the position of the UE is further based on the downlink reference signals measurements for the downlink reference signals received from the plurality of gNBs, which may be, e.g., the wireless transceiver 1802 and one or more processors 1804 with dedicated hardware or implementing executable code or software instructions in memory 1820, such as the downlink reference signal measure module 1828. The means for determining the position of the UE may include a means for determining a round trip time (RTT) for each gNBs in the plurality of gNBs using the uplink reference signal measurements measured by each of the plurality of gNBs and the downlink reference signals measurements for the downlink reference signals received from the plurality of gNBs, which may be, e.g., the one or more processors 1804 with dedicated hardware or implementing executable code or software instructions in memory 1820, such as the RTT determination module 1830, and a means for performing multilateration with the RTT for each gNBs and a location of each gNBs received in the assistance data, which may be, e.g., the one or more processors 1804 with dedicated hardware or implementing executable code or software instructions in memory 1820, such as the position determination module 1832.

In one aspect, the UE 1800 may further include a means for transmitting to the serving gNBs a request for location, wherein the serving gNBs generates and transmits to the UE the assistance data for the plurality of gNBs in response to the request for location, which may be, e.g., the wireless transceiver 1802 and one or more processors 1804 with dedicated hardware or implementing executable code or software instructions in memory 1820, such as the location request transmit module 1821.

Figure 19:
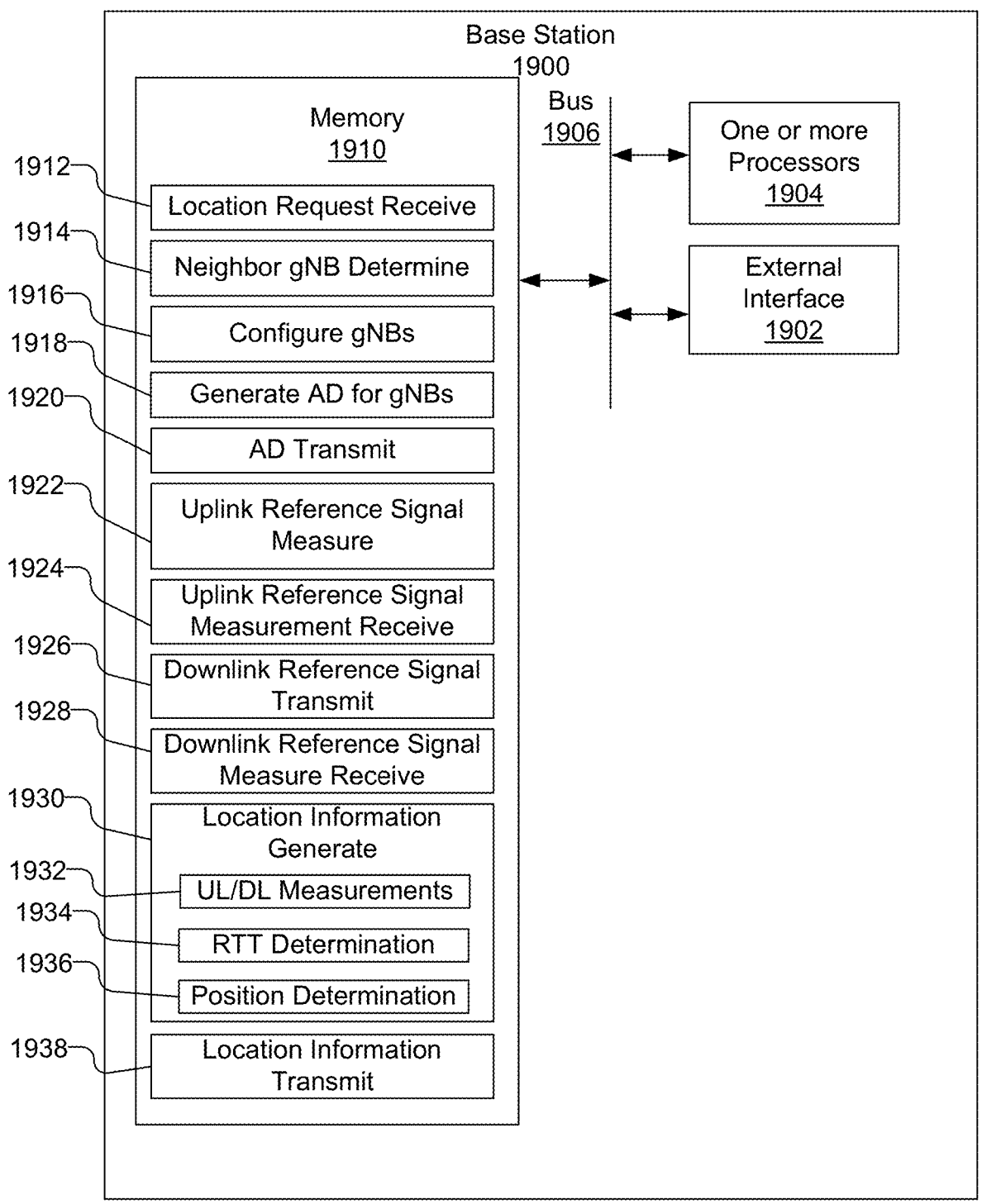

FIG. 19 is a diagram illustrating an example of a hardware implementation of a base station 1900, such as any of gNBs 110, illustrated in FIGS. 1, 2, 4, and 9-15. The base station 1900 may perform the process flow 1700 of FIG. 17. The base station 1900 includes, e.g., hardware components such as an external interface 1902, which may comprise one or more wired and/or wireless interfaces capable of connecting to and communicating with a user equipment, such as UE 102, other base stations, such as gNBs 110-2 and 110-3, and entities within a wireless network, such as AMF 115 or LMF 120, and to other elements in a wireless network directly or through one or more intermediary networks and/or one or more network entities, as shown in FIGS. 1A and 1B. The external interface 1902 may include one or more antennas (not shown in FIG. 19) to support a wireless interface to UE 102 and/or a wireless backhaul to elements in the wireless network. The base station 1900 includes one or more processors 1904 and memory 1910, which may be coupled together with a bus 1906. The memory 1910 may contain executable code or software instructions that when executed by the one or more processors 1904 cause the one or more processors 1904 to operate as a special purpose computer programmed to perform the techniques disclosed herein (e.g. such as the process flow 1700 shown in FIG. 17).

As illustrated in FIG. 19, the memory 1910 may include one or more components or modules that may be implemented by the one or more processors 1904 to perform the methodologies as described herein. While the components or modules are illustrated as software in memory 1910 that is executable by the one or more processors 1904, it should be understood that the components or modules may be firmware or dedicated hardware either in the one or more processors 1904 or off the processors.

As illustrated, the memory 1910 may include a location request receive module 1912 that when implemented by the one or more processors 1904 configures the one or more processors 1904 to receive via the external interface 1902 a location request, e.g., a UE (UE 102), a serving AMF for the UE (e.g. AMF 115) or an LMF (e.g. LMF 120), e.g., as discussed at block 1702 in FIG. 17. The memory 1910 may include neighbor gNBs determine module 1914 that when implemented by the one or more processors 1904 configures the one or more processors 1904 to determine a plurality of neighboring gNBs, e.g., gNBs from which the UE may be able measure a downlink reference signal transmission and/or which may be able to measure an uplink reference signal transmission by the UE, e.g., as discussed at block 1704 in FIG. 17. A configure gNBs module 1916 when implemented by the one or more processors 1904 configures the one or more processors 1904 to send, via external interface 1902, a request to each neighbor gNBs to increase downlink reference signal transmissions and to measure uplink reference signal transmissions from the UE, as discussed at block 1706 in FIG. 17. A generate AD for gNBs module 1918 when implemented by the one or more processors 1904 configures the one or more processors 1904 to generate assistance data for the neighbor gNBs, as discussed at block 1708 in FIG. 17. An assistance data transmit module 1920 when implemented by the one or more processors 1904 configures the one or more processors 1904 to transmit, via the external interface 1902, the assistance data neighbor gNBs to the UE, as discussed at block 1710 in FIG. 17. An uplink reference signal measure module 1922 when implemented by the one or more processors 1904 configures the one or more processors 1904 to receive, via the external interface 1902, and to generate a measurement of an uplink reference signal transmission from the UE, as discussed at blocks 1712 and 1714 in FIG. 17. An uplink reference signal measurement receive module 1924 when implemented by the one or more processors 1904 configures the one or more processors 1904 to receive one or more uplink reference signal measurements from each neighbor gNBs, which are generated from uplink reference signal transmissions from the UE to each neighbor gNBs, as discussed at block 1716 in FIG. 17. A downlink reference signal transmit module 1926 when implemented by the one or more processors 1904 configures the one or more processors 1904 to transmit, via the external interface 1902, downlink reference signals to be measured by the UE, as discussed in FIG. 17. A downlink reference signal measure receive module 1928 when implemented by the one or more processors 1904 configures the one or more processors 1904 to receive from the UE, via the external interface 1902, downlink reference signals measurements measured by the UE as discussed in block 1718 in FIG. 17. A location information generate module 1930 when implemented by the one or more processors 1904 configures the one or more processors 1904 to generate location information based on the measured uplink reference signal measurement and the received uplink reference signal measurements from the neighbor gNBs, as discussed at block 1720 in FIG. 17. The location information generate module 1930 may include uplink/downlink measurements module 1932 that when implemented by the one or more processors 1904 configures the one or more processors 1904 to combine the measured uplink reference signal measurement and the received uplink reference signal measurements from the neighbor gNBs and/or the received downlink reference signal measurements, as discussed in FIG. 17. The location information generate module 1930 may include an RTT determination module 1934 that when implemented by the one or more processors 1904 configures the one or more processors 1904 to determine a round trip time (RTT) for each gNBs using the uplink reference signal measurements and the downlink reference signals measurements measured by the UE, as discussed in FIG. 17. The location information generate module 1930 may include a position determination module 1936 that when implemented by the one or more processors 1904 configures the one or more processors 1904 to determine a position of the UE based on the uplink based solution or downlink based solution, e.g., in a UTDOA, or ODOA based solution or combined uplink and downlink based solution, e.g., RTT, e.g., using trilateration with the RTT for each gNBs and a known location of each gNBs, as discussed in FIG. 17. A location information transmit module 1938 when implemented by the one or more processors 1904 configures the one or more processors 1904 to transmit, via the external interface 1902, the location information to the other entity, as discussed at block 1722 of FIG. 17.

The methodologies described herein may be implemented by various means depending upon the application. For example, these methodologies may be implemented in hardware, firmware, software, or any combination thereof. For a hardware implementation, the one or more processors 1904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of base station 1900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1910) and executed by one or more processors 1904, causing the one or more processors 1904 to operate as a special purpose computer programmed to perform the techniques disclosed herein. Memory may be implemented within the one or processors 1904 or external to the one or more processors 1904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by base station 1900 may be stored as one or more instructions or code on a non-transitory computer-readable storage medium such as memory 1910. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for base station 1900 may be provided as signals on transmission media included in a communication apparatus. For example, a communication apparatus comprising part or all of base station 1900 may include a transceiver having signals indicative of instructions and data. The instructions and data are stored on non-transitory computer readable media, e.g., memory 1910, and are configured to cause the one or more processors 1904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a base station 1900 may include a means for receiving a location request for the UE from another entity, which may be, e.g., the external interface 1902 and one or more processors 1904 with dedicated hardware or implementing executable code or software instructions in memory 1910 such as the location receive module 1912. A means for determining a plurality of neighbor gNBs may be, e.g., the one or more processors 1904 with dedicated hardware or implementing executable code or software instructions in memory 1910 such as the neighbor gNBs determine module 1914. A means for sending a request to each neighbor gNBs in the plurality of neighbor gNBs to increase downlink reference signal transmissions and to measure uplink reference signal transmissions from the UE may be, e.g., the external interface 1902 and one or more processors 1904 with dedicated hardware or implementing executable code or software instructions in memory 1910 such as the configure gNBs module 1916. A means for generating assistance data for the plurality of neighbor gNBs may be, e.g., the one or more processors 1904 with dedicated hardware or implementing executable code or software instructions in memory 1910 such as the generate AD for gNBs module 1918. A means for transmitting the assistance data for the plurality of neighbor gNBs to the UE may be, e.g., the external interface 1902 and one or more processors 1904 with dedicated hardware or implementing executable code or software instructions in memory 1910 such as the AD transmit module 1920. A means for receiving an uplink reference signal transmission from the UE may be, e.g., the external interface 1902 and one or more processors 1904 with dedicated hardware or implementing executable code or software instructions in memory 1910 such as the uplink reference signal measure module 1922. A means for generating an uplink reference signal measurement for the uplink reference signal transmission may be, e.g., the external interface 1902 and one or more processors 1904 with dedicated hardware or implementing executable code or software instructions in memory 1910 such as the uplink reference signal measure module 1922. A means for receiving one or more uplink reference signal measurements from each neighbor gNBs in the plurality of neighbor gNBs, wherein the one or more uplink reference signal measurements are generated from uplink reference signal transmissions from the UE to the neighbor gNBs may be, e.g., the external interface 1902 and one or more processors 1904 with dedicated hardware or implementing executable code or software instructions in memory 1910 such as the uplink reference signal measurement receive module 1924. A means for generating location information based on the uplink reference signal measurement from the serving gNBs and the one or more uplink reference signal measurements from the neighbor gNBs may be, e.g., the external interface 1902 and one or more processors 1904 with dedicated hardware or implementing executable code or software instructions in memory 1910 such as the location information generate module 1930. A means for transmitting the location information to the other entity may be, e.g., the external interface 1902 and one or more processors 1904 with dedicated hardware or implementing executable code or software instructions in memory 1910 such as the location information transmit module 1938.

In some implementations of the base station 1900 the location information is a location measurement message that includes the uplink reference signal measurement from the serving gNBs and the one or more uplink reference signal measurements from the neighbor gNBs, and the location measurement message is transmitted to the UE for determination of the position of the UE. The determination of the position of the UE may use is performed by the UE using Uplink Time Difference of Arrival (UTDOA). The base station 1900, for example, may further include a means for transmitting downlink reference signals to be measured by the UE, which may be, e.g., the external interface 1902 and one or more processors 1904 with dedicated hardware or implementing executable code or software instructions in memory 1910 such as the downlink reference signal transmit module 1926, where the determination of the position of the UE is performed by the UE using round trip time (RTT) for signals determined using the uplink reference signal measurements and downlink reference signals measurements measured by the UE from the downlink reference signal transmissions. The other entity may be the UE and the assistance data may be generated and transmitted to the UE in response to the location request.

In some implementations of the base station 1900 the location information is a location measurement message that includes the uplink reference signal measurement from the serving gNBs and the one or more uplink reference signal measurements from the neighbor gNBs, and the location measurement message is transmitted to a network entity. The base station 1900, for example, may include a means for transmitting downlink reference signals to be measured by the UE, which may be, e.g., the external interface 1902 and one or more processors 1904 with dedicated hardware or implementing executable code or software instructions in memory 1910 such as the downlink reference signal transmit module 1926; and a means for receiving from the UE downlink reference signals measurements measured by the UE from downlink reference signals received by the UE, which may be, e.g., the external interface 1902 and one or more processors 1904 with dedicated hardware or implementing executable code or software instructions in memory 1910 such as the downlink reference signal measure receive module 1928. The location measurement message may further include the downlink reference signals measurements measured by the UE. In some implementations, the means for generating the location information may include a means for determining a round trip time (RTT) for each gNBs using the uplink reference signal measurements measured by each gNBs and the downlink reference signals measurements measured by the UE, which may be, e.g., the external interface 1902 and one or more processors 1904 with dedicated hardware or implementing executable code or software instructions in memory 1910 such as the RTT determination module 1934.

In some implementations, the means for generating the location information may include a means for determining the position of the UE by the serving gNBs based on the uplink reference signal measurements measured by each of the plurality of neighbor gNBs, which may be, e.g., the external interface 1902 and one or more processors 1904 with dedicated hardware or implementing executable code or software instructions in memory 1910 such as the position determination module 1936. The base station 1900, for example, may include a means for transmitting downlink reference signals to be measured by the UE, which may be, e.g., the external interface 1902 and one or more processors 1904 with dedicated hardware or implementing executable code or software instructions in memory 1910 such as the downlink reference signal transmit module 1926; and a means for receiving from the UE downlink reference signals measurements measured by the UE from downlink reference signals received by the UE, which may be, e.g., the external interface 1902 and one or more processors 1904 with dedicated hardware or implementing executable code or software instructions in memory 1910 such as the downlink reference signal measure receive module 1928. The determining the position of the UE may be further based on the downlink reference signals measurements measured by the UE. For example, the means for determining the position of the UE may include a means for determining a round trip time (RTT) for each gNBs using the uplink reference signal measurements measured by each gNBs and the downlink reference signals measurements measured by the UE, which may be, e.g., the external interface 1902 and one or more processors 1904 with dedicated hardware or implementing executable code or software instructions in memory 1910 such as the RTT determination module 1934; and a means for performing multilateration with the RTT for each gNBs and a known location of each gNBs, which may be, e.g., the external interface 1902 and one or more processors 1904 with dedicated hardware or implementing executable code or software instructions in memory 1910 such as the position determination module 1936.

The functionality of the modules of FIGS. 18-19 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 18-19, as well as other components and functions described herein, may be implemented using any suitable means. Such means also may be implemented, at least in part, using corresponding structure as taught herein. For example, the components described above in conjunction with the "module for" components of FIGS. 18-19 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm stages described in connection with the aspects disclosed herein may be implemented as electronic hardware, computer software, or combinations of both. To clearly illustrate this interchangeability of hardware and software, various illustrative components, blocks, modules, circuits, and stages have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for determining a position of a user equipment (UE) performed by the UE, the method comprising:
   receiving, from a serving gNB, assistance data for a plurality of gNBs, which includes the serving gNB;
   transmitting, to the plurality of gNBs, uplink reference signals;
   receiving, from the serving gNB, uplink reference signal measurements measured by each of the plurality of gNBs, wherein the serving gNB received the uplink reference signal measurements measured by other gNBs in the plurality of gNBs;
   determining a round trip time (RTT) for each gNB in the plurality of gNBs using the uplink reference signal measurements measured by each of the plurality of gNBs and downlink reference signals measurements performed by the UE upon downlink reference signals received from the plurality of gNBs; and
   determining the position of the UE based on performing multilateration with the RTT for each gNB and a location of each gNB received in the assistance data.

2. The method of claim 1, wherein determining the position for the UE uses Uplink Time Difference of Arrival (UTDOA), and wherein the reference signal measurements measured by each of the plurality of gNBs is one of a Time of Arrival (TOA) measurement or a gNB Rx-Tx Time difference measurement.

3. The method of claim 1, further comprising:
   transmitting to the serving gNB a request for location;
   wherein the serving gNB generates and transmits to the UE the assistance data for the plurality of gNBs in response to the request for location.

4. A user equipment (UE) configured for determining a position of the UE, the UE comprising:
   a transceiver configured to communicate with gNBs;
   at least one memory; and
   at least one processor coupled to the transceiver and the at least one memory, the at least one processor configured to:
      receive, via the transceiver from a serving gNB, assistance data for a plurality of gNBs, which includes the serving gNB;
      transmit, via the transceiver to the plurality of gNBs, uplink reference signals for each of the plurality of gNBs to perform an uplink reference signal measurement;
      receive, via the transceiver from the serving gNB, uplink reference signal measurements measured by each of the plurality of gNBs, wherein the serving gNB received the uplink reference signal measurements measured by other gNBs in the plurality of gNBs;
      determine a round trip time (RTT) for each gNB in the plurality of gNBs using the uplink reference signal measurements measured by each of the plurality of gNBs and downlink reference signals measurements performed by the UE upon downlink reference signals received from the plurality of gNBs; and
      determine the position of the UE based on performing multilateration with the RTT for each gNB and a location of each gNB received in the assistance data.

5. The UE of claim 4, wherein the at least one processor is configured to determine the position for the UE using Uplink Time Difference of Arrival (UTDOA) and wherein the uplink reference signal measurement performed by each of the plurality of gNBs is one of a Time of Arrival (TOA) measurement or a gNB Rx-Tx Time difference Measurement.

6. The UE of claim 4, wherein the at least one processor is further configured to:
   transmit via the transceiver to the serving gNB a request for location;
   wherein the serving gNB generates and transmits to the UE the assistance data for the plurality of gNBs in response to the request for location.

7. A method for determining a position of a user equipment (UE) performed by a serving gNB for the UE, the method comprising:
   receiving a location request for the UE from another entity;
   determining a plurality of neighbor gNBs;
   sending a request to each neighbor gNB in the plurality of neighbor gNBs to increase downlink reference signal transmissions and to measure uplink reference signal transmissions from the UE;

generating assistance data for the plurality of neighbor gNBs;

transmitting the assistance data for the plurality of neighbor gNBs to the UE;

receiving an uplink reference signal transmission from the UE;

generating an uplink reference signal measurement for the uplink reference signal transmission;

receiving one or more uplink reference signal measurements measured by each neighbor gNB in the plurality of neighbor gNBs, wherein the one or more uplink reference signal measurements are generated from uplink reference signal transmissions from the UE to the neighbor gNBs;

determining a round trip time (RTT) for each gNB using the uplink reference signal measurements measured by each gNB and downlink reference signals measurements measured by the UE;

determining the position of the UE based on performing multilateration with the RTT for each gNB and a known location of each gNB; and transmitting location information to the other entity.

8. The method of claim 7, wherein the location information is a location measurement message that includes the uplink reference signal measurement from the serving gNB and the one or more uplink reference signal measurements from the neighbor gNBs, and wherein the location measurement message is transmitted to the UE for determination of the position of the UE.

9. The method of claim 8, wherein the determination of the position of the UE is performed by the UE using Uplink Time Difference of Arrival (UTDOA).

10. The method of claim 8, wherein the other entity is the UE and wherein the assistance data is generated and transmitted to the UE in response to the location request.

11. The method of claim 7, wherein the location information is a location measurement message that includes the uplink reference signal measurement from the serving gNB and the one or more uplink reference signal measurements from the neighbor gNBs, and wherein the location measurement message is transmitted to a network entity.

12. A gNB configured for determining a position of a user equipment (UE), wherein the gNB is a serving gNB for the UE, comprising:

at least one external interface configured to communicate with the UE, with other gNBs and with entities in a wireless network;

at least one memory; and at least one processor coupled to the at least one external interface and the at least one memory, the at least one processor configured to:

receive a location request for the UE from another entity;

determine a plurality of neighbor gNBs;

send a request to each neighbor gNB in the plurality of neighbor gNBs to increase downlink reference signal transmissions and to measure uplink reference signal transmissions from the UE;

generate assistance data for the plurality of neighbor gNBs;

transmit via the at least one external interface the assistance data for the plurality of neighbor gNBs to the UE;

receive via the at least one external interface an uplink reference signal transmission from the UE;

generate an uplink reference signal measurement for the uplink reference signal transmission;

receive via the at least one external interface one or more uplink reference signal measurements measured by each neighbor gNB in the plurality of neighbor gNBs, wherein the one or more uplink reference signal measurements are generated from uplink reference signal transmissions from the UE to the neighbor gNBs;

determine a round trip time (RTT) for each gNB using the uplink reference signal measurements measured by each gNB and downlink reference signals measurements measured by the UE;

determine the position of the UE based on performing multilateration with the RTT for each gNB and a known location of each gNB; and transmit via the at least one external interface location information of the UE to the other entity.

13. The gNB of claim 12, wherein the location information is a location measurement message that includes the uplink reference signal measurement from the serving gNB and the one or more uplink reference signal measurements from the neighbor gNBs, and wherein the location measurement message is transmitted to the UE for determination of the position of the UE.

14. The gNB of claim 13, wherein the determination of the position of the UE is performed by the UE using Uplink Time Difference of Arrival (UTDOA).

15. The gNB of claim 13, wherein the other entity is the UE and wherein the assistance data is generated and transmitted to the UE in response to the location request.

16. The gNB of claim 12, wherein the location information is a location measurement message that includes the uplink reference signal measurement from the serving gNB and the one or more uplink reference signal measurements from the neighbor gNBs, and wherein the location measurement message is transmitted to a network entity.

* * * * *